(12) United States Patent
Krafft

(10) Patent No.: US 10,676,251 B2
(45) Date of Patent: Jun. 9, 2020

(54) SMART DRINK CONTAINER

(71) Applicant: Fredrik Krafft, Santa Clara, CA (US)

(72) Inventor: Fredrik Krafft, Santa Clara, CA (US)

(73) Assignee: Krafft Industries LLC, Los Angeles, CA (US)

( * ) Notice: Subject to any disclaimer, the term of this patent is extended or adjusted under 35 U.S.C. 154(b) by 0 days.

(21) Appl. No.: 15/771,446

(22) PCT Filed: Oct. 27, 2016

(86) PCT No.: PCT/US2016/059237
§ 371 (c)(1),
(2) Date: Apr. 27, 2018

(87) PCT Pub. No.: WO2017/075298
PCT Pub. Date: May 4, 2017

(65) Prior Publication Data
US 2018/0305091 A1    Oct. 25, 2018

Related U.S. Application Data

(60) Provisional application No. 62/320,311, filed on Apr. 8, 2016, provisional application No. 62/266,471, filed
(Continued)

(51) Int. Cl.
*B65D 43/26* (2006.01)
*B65D 47/06* (2006.01)
(Continued)

(52) U.S. Cl.
CPC ......... *B65D 43/26* (2013.01); *A47G 19/2227* (2013.01); *A47G 19/2272* (2013.01);
(Continued)

(58) Field of Classification Search
CPC .... B65D 43/26; B65D 47/06; B65D 77/0493; A47G 19/2227; A47G 19/2272; A47G 2019/225; G65D 51/24; G01K 2207/08
(Continued)

(56) References Cited

U.S. PATENT DOCUMENTS 5,255,819 A * 10/1993 Peckels ............... B67D 3/0041
222/1
6,036,055 A * 3/2000 Mogadam ............ B67D 3/0006
222/23
(Continued)

FOREIGN PATENT DOCUMENTS

CN    101472832 A    7/2009
EP    2086853 B1    2/2011
WO    2015153598 A1    10/2015

OTHER PUBLICATIONS

International Search Report for PCT/US2016/059237 dated Jan. 26, 2017.
(Continued)

*Primary Examiner* — Benjamin R Shaw
(74) *Attorney, Agent, or Firm* — K&L Gates LLP

(57) ABSTRACT

A container for storing a liquid for consumption. The container may comprise temperature and volume sensors, processors, energy source and a communication device to transmit the recorded temperature and volume data to a remote human interface. The container may also provide for various notifications and alerts to the user if the data falls outside predetermined variable ranges.

20 Claims, 36 Drawing Sheets

Related U.S. Application Data on Dec. 11, 2015, provisional application No. 62/247,080, filed on Oct. 27, 2015.

(51) Int. Cl.
| | |
|---|---|
| *B65D 51/24* | (2006.01) |
| *G01K 1/14* | (2006.01) |
| *B65D 23/12* | (2006.01) |
| *A47G 19/22* | (2006.01) |
| *B65D 23/10* | (2006.01) |
| *B65D 77/04* | (2006.01) |

(52) U.S. Cl.
CPC ............. *B65D 23/12* (2013.01); *B65D 47/06* (2013.01); *B65D 51/24* (2013.01); *G01K 1/14* (2013.01); *A47G 2019/225* (2013.01); *B65D 23/104* (2013.01); *B65D 77/0493* (2013.01); *G01K 2207/08* (2013.01)

(58) Field of Classification Search
USPC .......................................................... 222/52
See application file for complete search history.

(56) References Cited

U.S. PATENT DOCUMENTS

| | | | | |
|---|---|---|---|---|
| 6,123,225 | A * | 9/2000 | Peckels .................. | B65D 39/06 222/1 |
| 6,409,046 | B1 * | 6/2002 | Peckels ................ | B67D 3/0041 222/1 |
| 7,743,796 | B1 * | 6/2010 | Schooley ........... | B65D 39/0052 141/351 |
| 7,900,799 | B2 * | 3/2011 | Kuzar .................. | B67D 3/0006 222/40 |
| 8,796,610 | B2 | 8/2014 | Williams et al. | |
| 9,022,257 | B2 * | 5/2015 | Keating ............... | B67D 3/0003 222/207 |
| 9,212,041 | B2 * | 12/2015 | Keating ............... | B67D 3/0041 |
| 10,155,651 | B2 * | 12/2018 | Keating ............... | B67D 3/0041 |
| 2008/0112459 | A1 * | 5/2008 | Salkeld .............. | A47G 19/2272 374/141 |
| 2008/0195251 | A1 * | 8/2008 | Milner ................. | B67D 3/0035 700/237 |
| 2009/0277931 | A1 * | 11/2009 | Zapp .................... | B67D 3/0006 222/504 |
| 2010/0170918 | A1 | 7/2010 | Achrainer | |
| 2011/0180563 | A1 * | 7/2011 | Fitchett ................ | B67D 3/0051 222/1 |
| 2012/0211516 | A1 * | 8/2012 | Zapp ...................... | B65D 25/48 222/20 |
| 2013/0056502 | A1 * | 3/2013 | Zapp ...................... | G01F 11/263 222/500 |
| 2014/0034686 | A1 * | 2/2014 | Guerette ............. | B67D 3/0003 222/504 |
| 2014/0091935 | A1 * | 4/2014 | Rosenfeld ........... | A47J 41/0027 340/584 |
| 2014/0263430 | A1 * | 9/2014 | Keating ............... | B67D 3/0051 222/54 |
| 2015/0122688 | A1 * | 5/2015 | Dias ..................... | A47G 19/025 206/459.1 |
| 2015/0284163 | A1 * | 10/2015 | Manwani ............. | B67D 3/0067 222/105 |
| 2015/0360927 | A1 * | 12/2015 | Sweeney ................ | A47G 23/16 222/41 |
| 2016/0023804 | A1 * | 1/2016 | Tuyls ................... | B67D 3/0041 222/573 |
| 2018/0125276 | A1 * | 5/2018 | Tsai ..................... | G01L 9/0002 |

OTHER PUBLICATIONS

Written Opinion of the International Searching Authority for PCT/US2016/059237 dated Jan. 26, 2017.

* cited by examiner

SECTION A-A

SMART DRINK CONTAINER

CROSS REFERENCE TO RELATED APPLICATIONS

This application claims the benefit under 35 U.S.C. § 119(e) of the earlier filing date of U.S. Provisional Patent Application No. 62/247,080, filed on Oct. 27, 2015, entitled CONTAINER WITH SENSOR, United States Provisional Patent Application No. 62/266,471, filed on Dec. 11, 2015, entitled SMART DRINK CONTAINER WITH AUTOMATIC LID, and U.S. Provisional Patent Application No. 62/320,311, filed on Apr. 8, 2016, entitled INTELLIGENT BOTTLE, the entire disclosures of which are hereby incorporated by reference.

TECHNICAL FIELD

This specification generally relates to containers and more particularly to beverage containers comprising sensors, motors, and communication equipment to permit desired user functionality.

BACKGROUND

The information described in this background section is not admitted to be prior art. Containers and beverage containers have been used for many purposes throughout history from jugs to gather water from wells to containers to store wine. There are many numerous containers available that can be used to hold various items such as liquids, solids, and gases. Containers can come in various shapes and sizes. In addition, containers can be made of various materials. However, many containers lack additional functionality and appear. While technology has evolved over the years, containers have remained mostly unchanged. Therefore there is a need to provide users with containers that allow the users to remotely monitor the contents conditions within a container through wirelessly communicating and transmitting signals from the container to devices such as mobile phones. Some examples of containers are provided in U.S. Patent Publication No. 2012/0137892 A1 and U.S. Patent Publication No. 2015/0245743 A1, which are hereby incorporated herein by reference in their entirety.

SUMMARY

This specification describes containers having various electronic and technological features to enhance user functionality. The present disclosure relates to containers for storing various items and measuring characteristics of the items within the container. The containers may contain lids, spouts, handles, and may be insulted to maintain the temperature of the items within the container. The containers may also be configured to wirelessly transmit information pertaining to the contents within the container to a mobile device. In one embodiment, the container may comprise a temperature sensor, a lid, a volume level sensor, a processor, a power source and a wireless transmitter. The container may be configured to transmit the temperature and volume data of the contents of the container to a mobile device. In some embodiments, the mobile device may be configured to control an aspect of the container to adjust a condition of the contents. In other embodiments, the mobile device may be a computer and the computer may be able to record the temperature data within the container over a time interval. In one general aspect a container may contain a temperature sensor in its lid. In another general aspect, the present disclosure is directed to a method of using a mobile phone application to monitor various measured characteristics from contents within the container. In one embodiment the container may use Bluetooth/3 g for communications between the various sensors and the mobile phone application. In one embodiment a temperature sensor may be used to measure the temperature of a liquid within a container. The temperature value may be monitored to determine if it is within a predetermined range. Upon meeting certain criteria, an alert or notification may be sent to a dashboard wirelessly. In another embodiment the sensors may measure both temperature and pressure for the container.

In another embodiment, a drink container may comprise a lid that is programmed to automatically operate upon meeting a set condition. A controller may be wirelessly connected or connected via a wire to provide the inputs to program and set the desired operating parameters of the container. The container may also operate manually when the automatic features are suppressed or turned off. In one example, the set of conditions to automatically operate the lid of the container may be that the user is holding the container and it is positioned at a right angle for drinking. Once the conditions are met, the lid will automatically open and allow the user to access the contents within the container.

Embodiments within the scope of the application may comprise a container with an automatic lid. The lid of the container can be operated to open automatically when a set of conditions are met. In one example, these conditions are the angle of the container, capacitive sensing, and a time delay. For the lid of the container to open automatically, all of the aforementioned conditions must be met. The specific conditions may vary based upon the size, shape, and contents of the container and the size and shape of the lid. According to embodiments, when using a container to store a liquid or a beverage, for example a thermos or water bottle, it may be desirable to have the container that is capable of automatically opening. The opening of the container maybe conditioned on different parameters and the container may open or close automatically when a set of conditions are met. The various parameters and conditions may be controlled through wireless or hard-wired connections to the container and may be controlled by a device that has the software for controlling, communication and reading the status for the containers. For example, a smart phone device may have an application that permits the phone to communicate with the container through a wireless communication. Such wireless communications may be through Wi-Fi, NFC, cellular or other wireless communication methods.

In one example, a container with liquid within it has fallen over. The condition with respect to a titled angle would have been met, but the other conditions of a user's hand causing capacitance and the time delay after the other conditions have been met has not occurred, so the lid would remain closed. Next, when the user goes to pick up the container, the angle and the capacitance may have been met. Since the capacitance was not the first condition to be met, the delay condition must be met before the lid will open. This delay condition allows the user can pick up and stand the container upright without the lid automatically opening. The delay condition which has not been met is met after the capacitance is met, i.e. after 3 seconds, and therefore the delay condition is dependent on the other conditions being first met. This allows the user to handle the container with the lid closed when the container may be in a position that could allow the liquid within it to spill out undesirably.

After the user stands the container upright, the user next decides to pour liquid from the container. The user grabs the container, and thus meets the capacitance condition. The user then can move the container to a desired angle (i.e. the opening condition). Here, the delay condition is only dependent on the capacitance when the capacitance is not the first step. Therefore, the delay condition does not need to be met where the capacitance condition is first met and subsequently the angel condition is met. This is the desired sequence of steps and allows the user to pour from the container when the lid automatically opens. Now that the conditions are met, the lid operates and opens at a determined speed. For example, the lid opening speed may be set at 50% per second and can be limited to 70% maximum opening of the container lid. After the user is done pouring a desired amount of liquid from the container, the user lifts the container and changes the angle. This causes the angle condition to no longer be met and the lid automatically closes. The user can then set the container down where none of the conditions are met and the container will remain closed.

Another example may be where the container is being stored within a user's backpack, purse or other carrying case. When the container is within the backpack, it may have the angle condition met, but the other conditions have not yet been met and the lid remains closed since there is no material in contact with the container to cause the capacitance condition to be met. Next, the user may pick the container out of the bag. The capacitance and angle condition may be met, but the delay condition, which would be required in this case since the capacitance condition was not the first condition to be met has not been met. The lid would therefore remain closed. The user next desires to pour liquid out of the container and meets the delay condition while the other conditions remain being met. The lid will then automatically open at a set parameter rate. When the user is done pouring, the user will put the container in an upright condition and the lid will automatically close as the angle condition will no longer be met. The user then places the container down on the container upright and the lid remains closed as the conditions are not met.

In addition to the automatic control of the container, the container may also comprise a manual override. The manual override may be beneficial in instances where the control device is not within range, the power to the control device or the container is low or for other various reasons. In addition, the software may be used to turn off the manual override, for example to make the container "child-proof". The override and controls may be beneficial in other situations. For example, where inventory controls is important, the smart containers may be used for example at a bar. The Point of Service (POS) system may communicate with the smart container or lid to permit the owner to track the sales of certain beverages, such as liquor sales. The POS system may be designed to automatically track the sales when the container lid is opened and may also comprise a flow measurement to measure the sales volume of the contents of each container. This may be beneficial in terms of managing the inventory as well as helping to track customer checks/bills when the service is busy.

One of the aspects of the smart or intelligent container is the ability to control the lid of the container, such as, opening the lid of the container when the user desires to use it. For example the user may lift the container up from the table and starts pouring even if the lid was closed when the user lifted it up. The lid will be closed until some specified conditions are met, for example, the following conditions are met: the container has the right angle and the user is holding it. The drink container can be a cup or any other container used for drinking, including a Thermos or any thermally insulated container. In addition, the container can be used to contain various liquids or other materials. For example, the container may be for alcohol, or cleaning supplies, or painting supplies or any other liquid where it may be desirable to assist in the operation and use of these items.

In another embodiment, disclosed herein is a drink container that opens when a specific set of conditions are met. These conditions may be programmable from software accessible to a user though there is also a standard set of conditions such that a software/interface is not needed by a user to configure the container. A CPU gets the data from the sensors to check the conditions and when the conditions are met in the right order, it sends a signal to an electromagnetic switch or motor to open the lid. When the conditions are no longer met a signal is sent to the same electromagnetic switch or motor to close the lid. The software/interface can be accessible and controllable from either a wire or wireless connection, e.g. a button or in the form of a screen mounted on the container or external interface such as a screen on a phone. For example, if the interface is a screen on the container then this screen can also be the sensor for the capacitive condition. When the lid is open there can also be a signal so send to a switch/light/indicator on the container showing the user that the lid is now open. Other embodiments may include a lid that comprises all of the various sensors and devices. For example, a lid may comprise the temperature sensors, level sensors, flow sensors, movement sensors, proximity sensors, conductivity sensors, or resistance sensors or combinations thereof. The lid may comprise various wired or wireless communication modules and may include a power module, such as a battery. The lid may be configured to be retrofit or designed for existing containers.

According to embodiments of the present disclosure, for opening/closing the lid the following conditions can be checked to see if they are fulfilled and also the order they are fulfilled may determine whether the lid opens or closes. There is a standard set of conditions and how they may be fulfilled, though they can also be set by the user either from an interface on the container or from an external interface. There may also be a manual switch on the lid to open the lid when the user wants to bypass the smart control of the lid. Additionally, an override for preventing the manual override may be available in software: this condition inactivates the manual override on the lid. E.g. to make it child safe, to prevent people from misappropriating the contents of the container, etc.

According to embodiments, the container may include at least one sensor on the container. A pressure sensor may be included on the exterior surface of the container. The pressure sensor may send parameters including specific location of the pressure, area of the pressure, how hard to push (pressure) to activate the sensor. This may allow the container to be able to not only sense that someone is pressing on the container but also how they press and from there on give data to the processing unit to decide if the condition is met. Therefore, the container may be able to learn a user's preference or specific tendencies and adapt accordingly. Other sensors may include electrical sensor (capacitivity or resistance) on the container. Capacitive sensor, similar to smart phone screen, resistance, similar to resistive screens, and/or conductivity (e.g. +,−) sensors, such that the sides of the container are at different potential, may be present on the container.

Furthermore, a sensor may be included to determine when an inside liquid pushes against the lid. Having a sensor feeling when the liquid is pushing on the lid from the inside may be used as a parameter in the control of the lid. A sensor may be provided for determining an angle of the container or lid. Having a sensor that measure what angle the container is held at may be used as a parameter. A specific movement sensor, such as an accelerometer, may provide a valuable measurement. An accelerometer or other movement measurement sensor may measure the movements of the container and use a pouring movement as condition. In addition, other movement sensors can be used as well. For example, a gyro may be used to determine the various conditions of the container. Also, the accelerometer or the gyro or other similar devices may be used to determine the amount of substance, i.e. liquid, that is inside the container. For example, the container may be shaken and the accelerometer or the gyro can be used to calculate the amount of liquid within the container.

According to embodiments, the container may include speech/voice recognition control. Accordingly, using a microphone connected to the processing unit the user can voice/sound prompt/direct the container to open/close. Furthermore, when the specified conditions are fulfilled a delay for opening can be used to prevent spillage or allow the user the ability to prepare for the opening of the container. This may be beneficial so that the liquid contents do not start to flow out right away if the user picks up the container when it is laying down with liquid in it. The user can specify so that this delay is only active if the bottle has an angle such that the flow would come out right away or active when other conditions are met. In one embodiment, the delay works such that it counts down from when all other specified required conditions are met in the order required. For example, the container may only activate a delay if the angle of the container is above 45 degree and then the last condition is whether a user grabs (i.e. via conductivity or other method of sensing user holding to container) the container condition is met. For example when the user grabs the container when it is on the floor, the container can determine when it is desirable to open the lid once certain conditions are met to prevent unwanted spillage of the container.

The reason for the delay may be for the following case. The bottle is in such a position that all the conditions are met for opening the lid except the user holding it, so if the user would grab it, it would open and start pouring out right away without the delay. The user might just be lifting up a bottle that has fallen over and is not interested in letting any liquid out. Thus, in the present scenario, the delay condition is activated when the last condition to be fulfilled is the user grabbing the container, which prevents the lid from opening and spilling the liquid within.

In addition, a sensor may be included to determine a speed of opening the lid. For the mechanical design of the lid where the speed of opening the lid can be chosen the user can set this parameter. For example when there is a delay in opening the lid, the lid can be set to open slowly such that liquid does not pour out at full capacity at once. Another sensor may be provided determining an amount or degree to which the container is open. For the mechanical design that can set how much the lid can be open, the user may also set this. Such that if there is a small container to pour the liquid into, then this flow is smaller if the lid is open less. The lid and/or the container may also contain a heater to keep the contents of the bottle at a desired temperature or to heat up the contents of the container.

In addition, an ultrasound sensor may be included to sensing when a user closes the container, to sense specific movements by user, and/or to identify/signature of reflection to human body relative to specific distance from the container.

In one embodiment, the container may be configured so that it only opens once while holding it, i.e., if a person pours and holds it then when making the angle less than the conditional angle for opening, then it closes. If the user tries to pour again it will not open without the user activating one of the conditions again. The user would, for example, have to put it down and up again.

The container may also include interface control from virtual reality and/or augmented reality. It is within the scope of the disclosure for virtual reality and augmented reality control interfaces to be used with the container and the various controls.

The above examples are to provide an understanding of some of the capacities and parameters of the smart container. It is envisioned that the lid controls as well as the temperature controls as well as potentially other parameters may be useful alone or in combination. For example, a container may comprise various temperature sensors, lid controls, communication devices, liquid flow sensors or other sensors and devices such as accelerometers or gyros or that may be useful in meeting specific criteria of the user. Also, the containers may be used in various industries, for example food service, bars/beverage industry, consumer products and sports equipment and accessories. The various examples should not be considered limiting and are for illustrative purposes.

Also, various power sources are envisioned and may include various batteries, heat sinks, kinetic energy systems, etc. Also, recharging of the battery may be completed through various means such as wired and wireless charging, for example inductive charging or through a USB cable.

The various embodiments and examples provided above should not be considered limiting to the scope of the present disclosure. It is also envisioned that the various aspects of the embodiments can be used in other capacities. In one example, the containers having various temperature and volume sensor may be used in the food service industry to monitor the temperature and amounts of food in various containers. The data may be recorded and kept on a mobile device or a computer. The data may be used for reports for various regulatory inspectors and may allow the user to reduce the employees needed to comply with various regulations for recording the temperature of foods to be served to customers. The system may also be able to notify the user when a temperature or an amount of items within a container falls outside a predetermined value. In one embodiment, a warning may be provided when the amount within the container may need to be replenished or when a temperature is outside the safe temperatures for storage of food to be served to customers. However, other embodiments are also envisioned.

One embodiment is having a mug or drink container monitored with temperature and liquid level. Other embodiments may include a smaller personal mug (the lid beverage container) and a bigger drinks container (the tap drinks container), each embodiment may have various feature, as shown below. However, these features should not be limiting to the described device and may be interchanged between the various non-limiting embodiments.

It is understood that the various aspects of the containers described in this specification are not limited to the example aspects summarized in this Summary.

BRIEF DESCRIPTION OF THE DRAWINGS

Various features and characteristics of a container described in this specification may be more thoroughly understood by reference to the accompanying figures, in which.

The reader will appreciate the foregoing features and characteristics, as well as others, upon considering the following detailed description of the container according to this specification.

DETAILED DESCRIPTION

This specification is generally directed to beverage containers and lids having user programmable and selectable features. However, they are not limited to such extemporary environments.

In various embodiments, the present disclosure embraces the notion of viewing various characteristics of contents within a container such as temperature data and volume data remotely. In some embodiments an insulated beverage container may have a temperature sensor and a liquid level gauge to remotely view the temperature and level of your beverage. In some instances, the beverage may be a hot beverage such as coffee or tea or may also be a cold beverage such as soda or beer. The temperature and level recording devices may be self contained and have a power source, processor and wireless transmitter. The data may be transmitted through various wireless communication signals such as NFC, Wi-Fi, Bluetooth, etc. The container may communicate with a mobile device such as a phone or table or computer.

Figure 1:
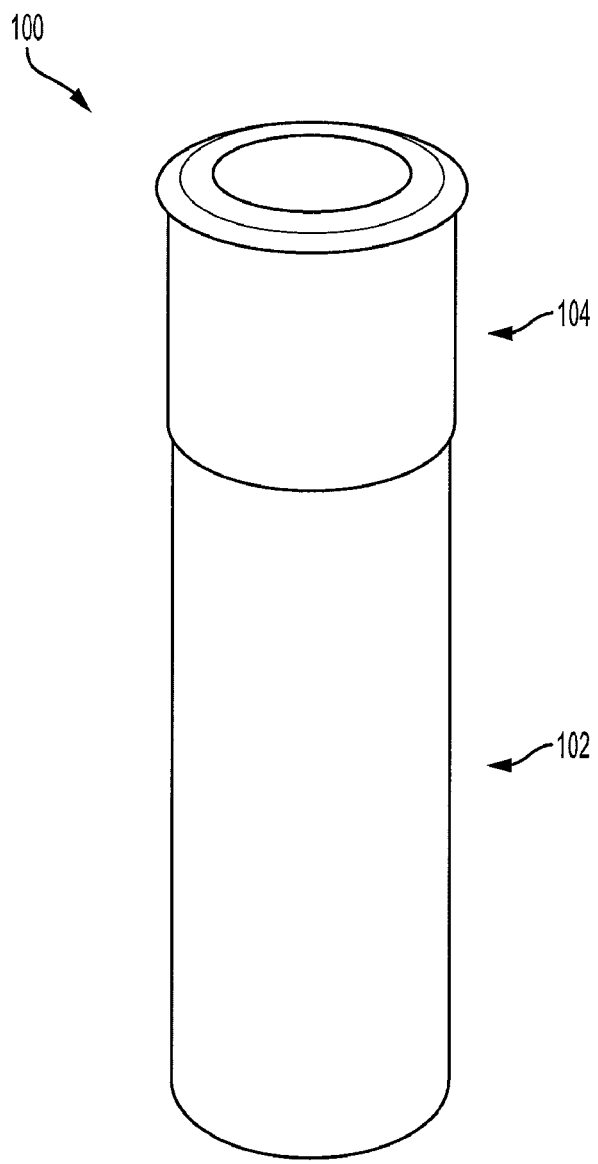
FIG. 1 illustrates a perspective view of a drink container and lid.

FIG. 1 displays a container 100 for storing liquids. The container comprises a body portion 102 comprising an internal cavity, wherein the internal cavity is configured to store and retain liquids therein, and a lid portion 104. According to embodiments, the lid portion 104 may be an automatic lid, such that the lid portion 104 is programmable. The lid portion 104 may be controlled via a processor so that the opening of the lid portion 104 of the container 100 maybe conditioned on parameters and the container may open or close automatically when a predetermined set of conditions are met. The various parameters and conditions may be controlled through wireless or hard-wired connections to the container 100 and may be controlled by a control device that can communicate with the container 100 to receive information from the container 100, such as the status of sensors regarding parameters of the container, or to transmit information to the container 100, such as commands for opening or closing the lid portion 104 of the container. In one embodiment, a smart phone device may have an application that permits the smart phone to communicate with the container 100 through a wired or wireless communication network. Such wireless communications may be through WIFI, NFC, cellular or other wireless communication methods. When using the container 100 to store a liquid or a beverage, for example a thermos or water bottle, the container 100 therefore may be capable of opening automatically.

In addition to the automatic control of the lid portion of the container, the container may also comprise a device or mechanism for manually overriding the automatic control. The device or mechanism for manual override may be beneficial in instances where the control device is not within range, the power to the control device or the container is low or for other various reasons. In one embodiment, a manual switch may be present on the lid portion 104 to open the lid portion 104 when a user wants to bypass automatic control of the lid portion 104.

In one embodiment, the container 100 may be programmed such that the manual override switch may be turned off. This may be desirable in certain situations, for example to make the container "child-proof". The automatic control and override may be beneficial in other situations. For example, where inventory controls is important, the smart containers may be used for example at a bar or restaurant. A Point of Service (POS) system may communicate with the container 100 to permit an owner to track the sales of certain beverages, such as liquor sales. The POS system may be designed to receive a communication from the container 100 to automatically track sales when the lid portion 104 of the container 100 is opened and may also comprise a flow measurement device to measure the sales volume of the contents of a container 100. This may be beneficial in terms of managing the inventory as well as helping to track and confirm customer invoices when service at the location is busy.

Figure 2:
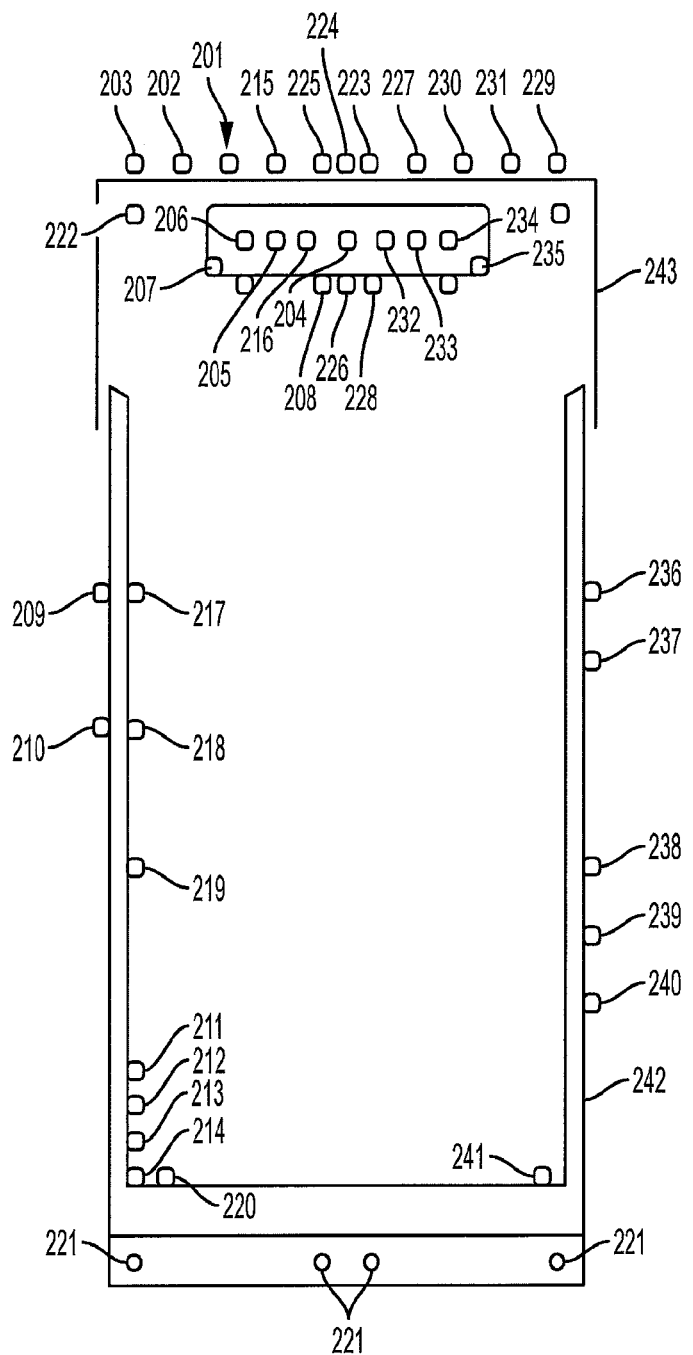
FIG. 2 illustrates a cross-sectional view of a drink container and lid.

FIG. 2 displays an embodiment of a container 200 having a body portion 242, a lid portion 243, and a plurality of sensors disposed at various positions on the body portion 242 and the lid portion 243. The plurality of sensors includes Capacity or capacitance sensor 201, Pressure sensors 202, Electro conductive sensor 203, CPU Logic 204, Gyroscope sensor 205, Electro magnets 206, Wireless charging 207, Movable piston membrane 208, Capacity sensor 209, Finger print sensor 210, Gyroscope sensor 211, accelerometer 212, CPU/logic 213, Unit for wireless charging 214, Humidity and temp sensor 215, Accelerometer 216, Thermo electric module 217, Electro conductive sensor 218, Heat/cold sink 219, Charging unit 220, Electro Mechanical Movable Stabilizers 221, Seal with mechanics to open manually or automatically 222, Heat/cold sink 223, Fingerprint sensor 224, Interface 225, Pressure sensor 226, USB Charge 227, Heat/cold sink 228, Capacity sensor 229, Solar cells 230, Capacitance sensor 231, Energy units 232, Thermo electric module 233, Electro magnets 234, RF communication ex Wi-Fi/Bluetooth 235, Interface 236, Capacity sensor 237, Heat/cold sink 238, Solar cells 239, Pressure sensor 240, Pressure sensors 241.

The various sensors, processors and units described in FIG. 2 above can be located within the lid portion 243 or the body portion 242. The various sensors, processors and units can communicate wirelessly or wired to a processor, a user interface or a remote user interface. The various sensors can be incorporated in the embodiments discussed below. The sensors can communicate with the lid closure mechanism to cause a lid closure mechanism to move the seals from the closed or sealed position to an open condition. Various sensors can communicate with a processor which can in turn control the lid closure mechanism. In one embodiment, the lid portion or the body portion may include a sensor to detect the user's touch or swipe across the bottle and send a signal to the lid closure mechanism to move the seals from the closed position to the open position. In another embodiment, a temperature sensor may act as a lockout feature for the lid closure mechanism and prevent the user from drinking from the opening or orifice of the container if the contents of the container are too hot. Additional sensors may include optical sensors, lasers, and LIDAR which can detect when the user is close to the container apparatus and send a signal to a processor or the lid closure mechanism to cause the lid closure mechanism to move the seals to the open position.

Figure 3:
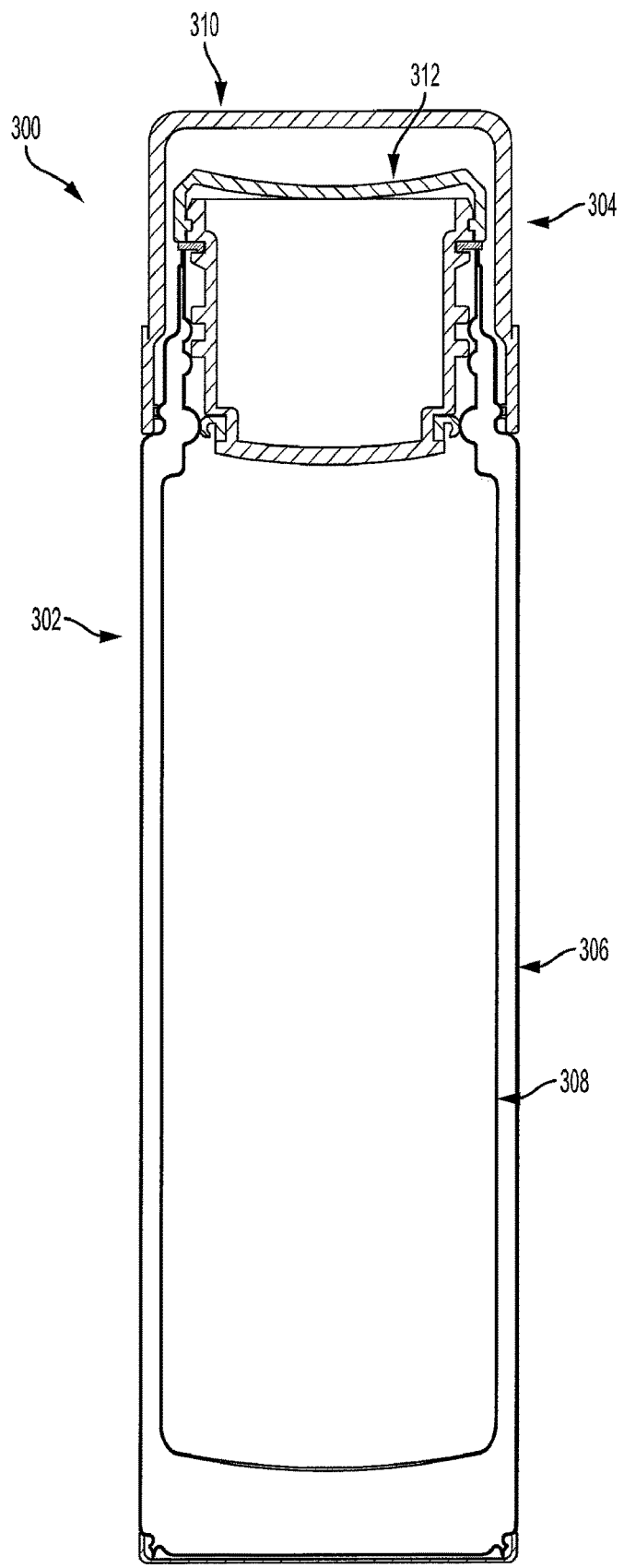
FIG. 3 illustrates a cross-sectional view of an alternative drink container and lid.

FIG. 3 displays an embodiment of a container 300 that comprises a body portion 302 and a lid portion 304. The body portion 302 comprises an outer shell 306 and an inner shell 308. The lid portion 304 comprises an outer lid 310 and an inner lid 312. According to embodiments, the space within the inner lid 312 may be at least partially filled with an insulating material.

Figure 4:
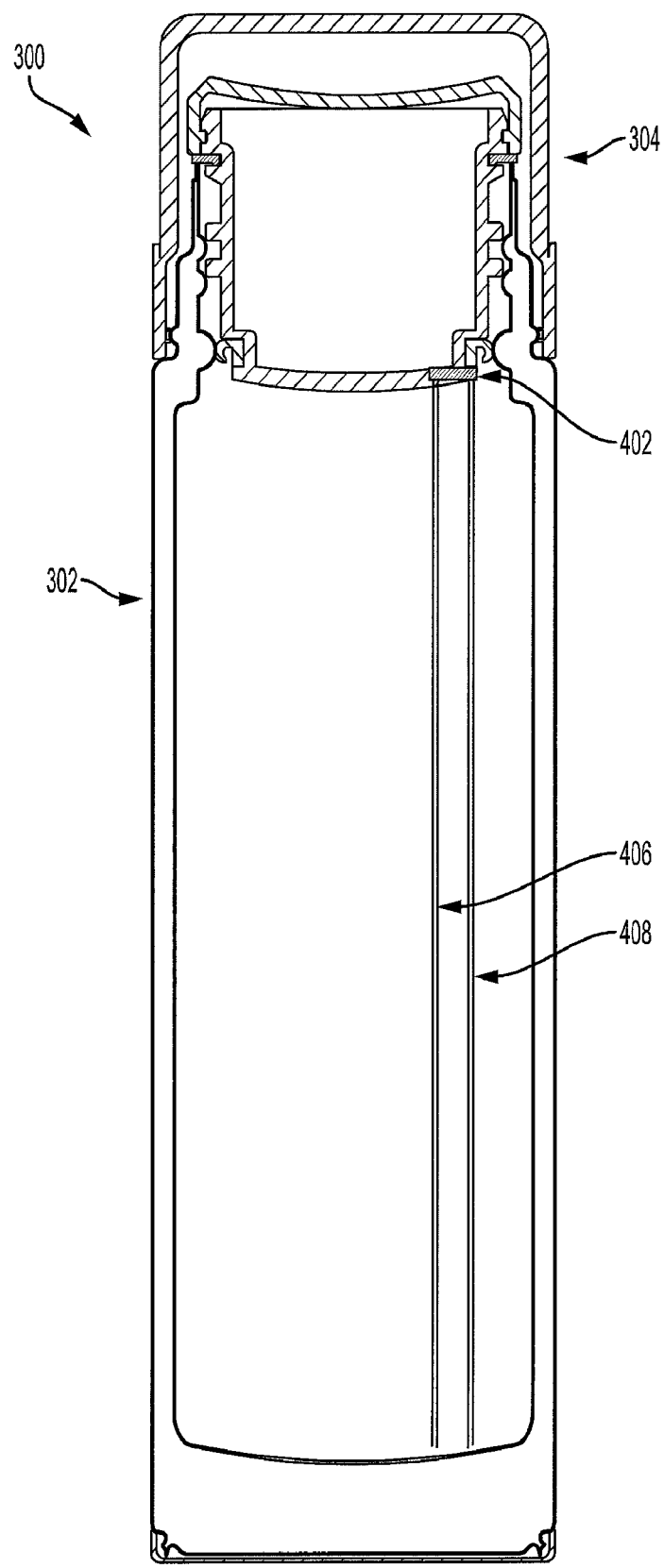
FIG. 4 illustrates a cross-sectional view of an alternative drink container and lid.

FIG. 4 displays an embodiment of container 300, which includes a circuit 402 for determining a fluid level in the container 300. As shown in FIG. 4, to measure the level of the liquid inside the mug, the circuit 402 may comprise two cables 406, 408 may be attached to the inner shell 308 of the body portion 302. When the lid portion 304 is in the closed state, the lid portion 304 will have a connector 410 that will close the circuit 402 formed by the cables 406, 408. Therefore, when the lid portion 304 is closed the cables 406, 408 will form a circuit with the connector and the connector may comprise a measurement device that can determine a fluid level in the container 300 based on the resistance of the circuit 402 formed by the cables 406, 408. The measurement device may comprise an ohmmeter for measuring the resistance of the circuit 402. Upon measuring the resistance of the circuit 402 with the fluid in the container, the measurement device is able to send the fluid level information to a main control device of the container 300. The main control device of the container 300 may then send the fluid level information to an application on a remote device, such as a smart phone, such that the application can display a fluid level of the container 300 to a user of the smart phone. The circuit 402 may be powered by a power source that is onboard the container 300 and directly connected to the circuit 402, such as a battery, or it may be powered indirectly through wireless power transfer. In another embodiment, the circuit 402 may be powered via a thermocouple device that generates electricity based on heat collected from the container.

Figure 5:
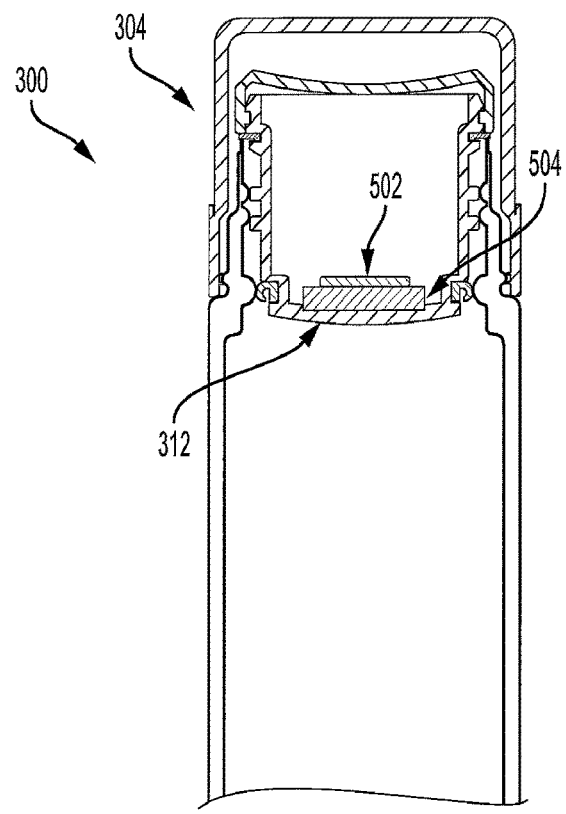
FIG. 5 illustrates a cross-sectional view of an alternative drink container and lid.

FIG. 5 displays an embodiment of the lid portion 304 of container 300, where the lid portion 304 comprises a power source 502 and chip 504 with a sensor element built into the chip 504 and placed within the lid portion 304. According to the embodiment of FIG. 5, the sensor element comprises a temperature sensor located on the bottom of the inner lid 312. A power source described herein, such as, for example, power source 502, may be a battery sized and configured accordingly. The power source 502 may be located on top of the chip 504 and attached to the chip 504. The sensor element may measure the temperature of the interior of the container or a substance that comes into contact with the sensor element.

Figure 6:
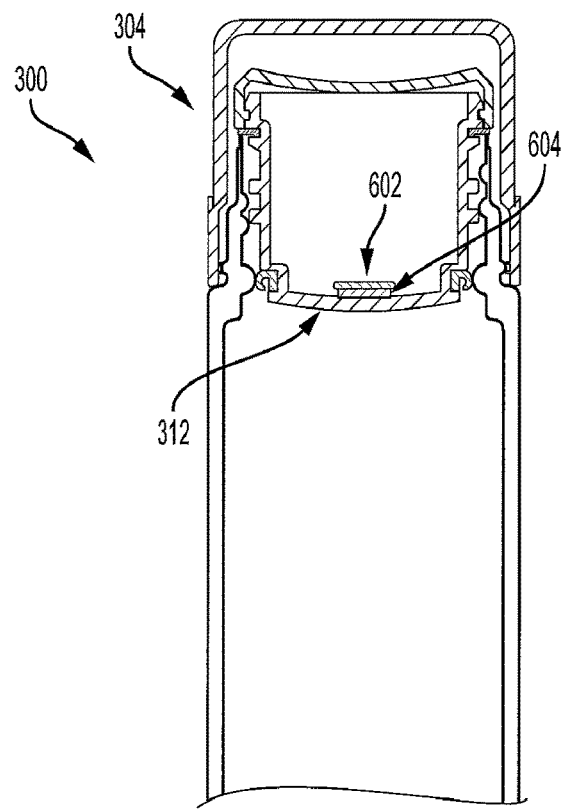
FIG. 6 illustrates a cross-sectional view of an alternative drink container and lid.

FIG. 6 displays an embodiment of the lid portion 304 of container 300, where the lid portion 304 comprises a chip 602 with a battery and a temperature sensor 604 attached to the chip 602. The temperature sensor 604 is attached to inner lid 312 of the lid portion 304 and the chip 602 is attached to the temperature sensor 604, such that the chip 604 is attached to the temperature sensor 604. The temperature sensor 604 may measure the temperature of the interior of the container 300 or a substance that comes into contact with the temperature sensor 604.

Figure 7:
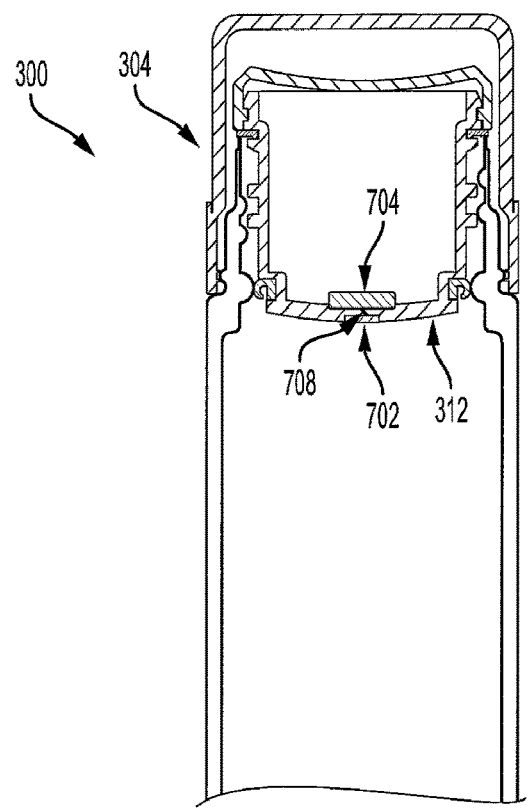
FIG. 7 illustrates a cross-sectional view of an alternative drink container and lid.
Figure 8:
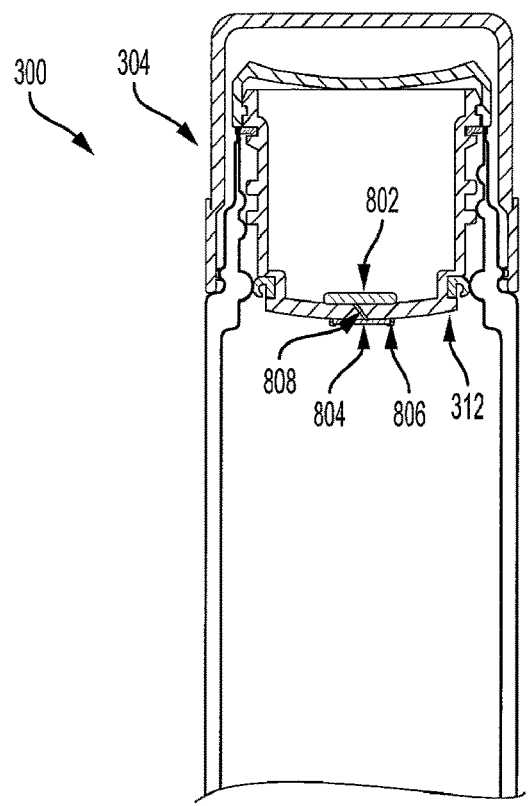
FIG. 8 illustrates a cross-sectional view of an alternative drink container and lid.

FIG. 7 shows a further embodiment of the lid portion 304 of container 300, where the lid portion 304 comprises a chip 702 with a power source attached to a bottom, interior surface of the inner lid 312 and a temperature sensor 704 attached to the inner lid 312, on a bottom, exterior surface of the inner lid 312. The temperature sensor 704 may attached to or formed integrally with the exterior surface of the inner lid 312. A connecting cable 708 may pass through an aperture in the inner lid 312 to connect the chip 702 and the temperature sensor 704. FIG. 8 shows a further embodiment of the lid portion 304 of container 300, where the lid portion 304 comprises a chip 802 with a power source attached to a bottom, interior surface of the inner lid 312 and a temperature sensor 804 attached to the inner lid 312, on a bottom, exterior surface of the inner lid 312. The temperature sensor 804 may held in place on the inner lid 312 via a sensor holder 806 on the inner lid 312. The sensor holder 806 may be a component attached to the inner lid 312 or it may be formed integrally with the inner lid 312. A connecting cable 808 may pass through an aperture in the inner lid 312 to connect the chip 802 and the temperature sensor 804.

Figure 9:
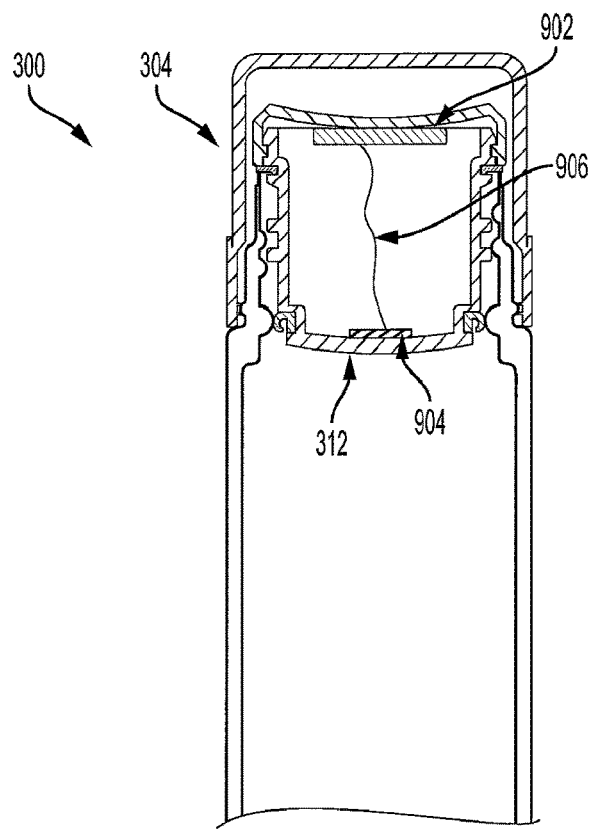
FIG. 9 illustrates a cross-sectional view of an alternative drink container and lid.
Figure 10:
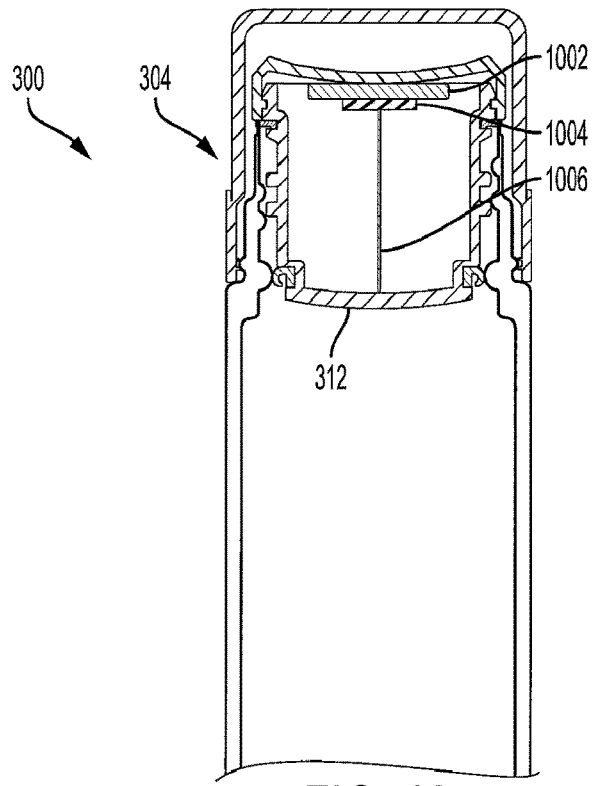
FIG. 10 illustrates a cross-sectional view of an alternative drink container and lid.

FIG. 9 shows yet a further embodiment of the lid portion 304 of container 300, where the lid portion 304 comprises a chip 902 with a power source attached to the top, interior surface of the inner lid 312 and a temperature sensor 904 attached to the bottom, interior surface of the inner lid 312. A connecting cable 906 connects the chip 902 and the temperature sensor 904. FIG. 10 shows another embodiment of the lid portion 304 of container 300, where the lid portion 304 comprises a chip 1002 with a power source and a temperature sensor 1004 located on a top, interior surface of the inner lid 312. The temperature sensor 1004 is attached to the chip 1002, and the chip 1002 is attached to the top, interior surface of the inner lid 312. A rod 1006 is included that connects to the bottom, interior surface of the inner lid 312 and to the temperature sensor 1004. The temperature sensor is configured to determine the temperature of the interior surface of the container or a liquid in the container based on the temperature of the rod 1006.

Figure 11:
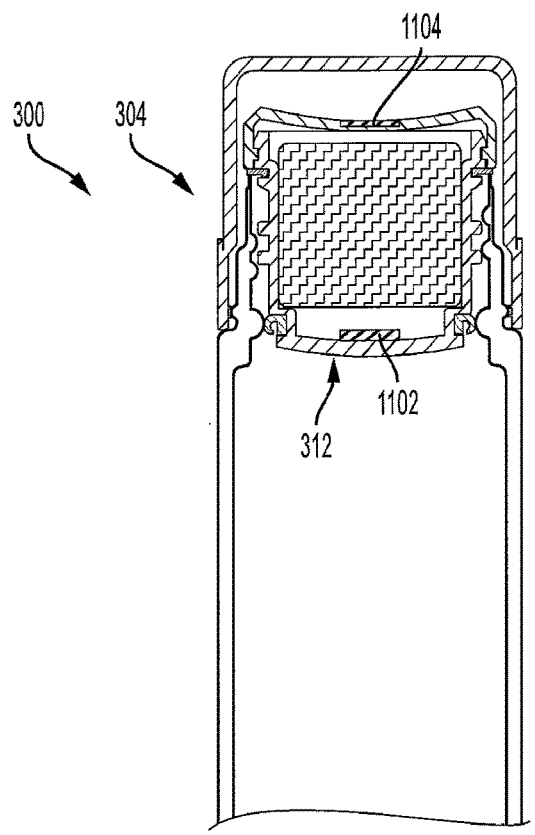
FIG. 11 illustrates a cross-sectional view of an alternative drink container and lid.
Figure 12:
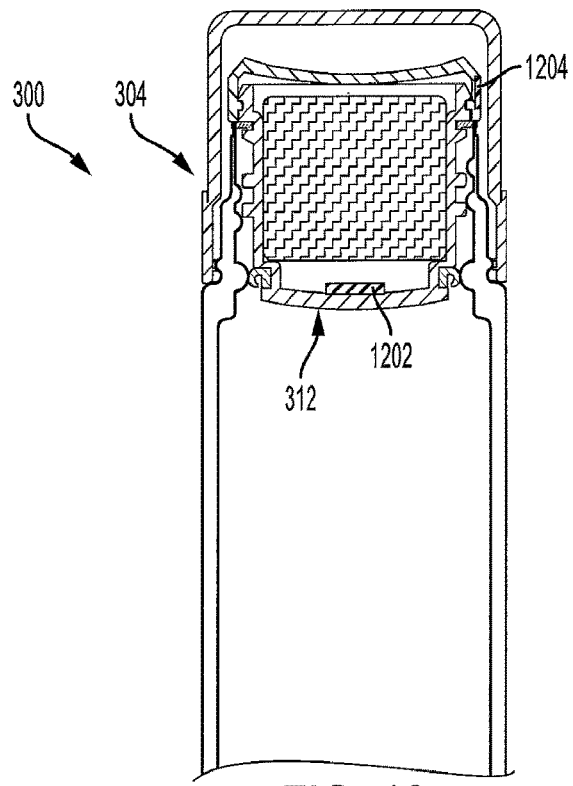
FIG. 12 illustrates a cross-sectional view of an alternative drink container and lid.

FIG. 11 shows still a further embodiment of the lid portion 304 of container 300, where the lid portion 304 comprises a first temperature sensor 1102 and a second temperature sensor 1104. The first temperature sensor 1102 is attached to the bottom, interior surface of the inner lid 312 while the second temperature sensor 1104 is attached or formed integrally with a top, exterior surface of the inner lid 312. The first temperature sensor 1102 is configured to measure the temperature of the interior surface of the container or a liquid in the container and the second temperature sensor 1104 is configured to measure the ambient temperature of an environment adjacent the second temperature sensor 1104. In addition, a cavity of the inner lid 312 is filled with a material that acts as an insulator to minimize heat loss from the container. Similar to FIG. 11, FIG. 12 displays an embodiment of the lid portion 304 of container 300, where the lid portion 304 comprises a first temperature sensor 1202 and a second temperature sensor 1204. The first temperature sensor 1202 is attached to the bottom, interior surface of the inner lid 312 while the second temperature sensor 1204 is attached or formed integrally with a side, exterior surface of the inner lid 312. The first temperature sensor 1202 is configured to measure the temperature of the interior surface of the container or a liquid in the container and the second temperature sensor 1204 is configured to measure the ambient temperature of an environment adjacent the second temperature sensor 1204. In addition, a cavity of the inner lid 312 is filled with a material that acts as an insulator to minimize heat loss from the container.

Figure 13:
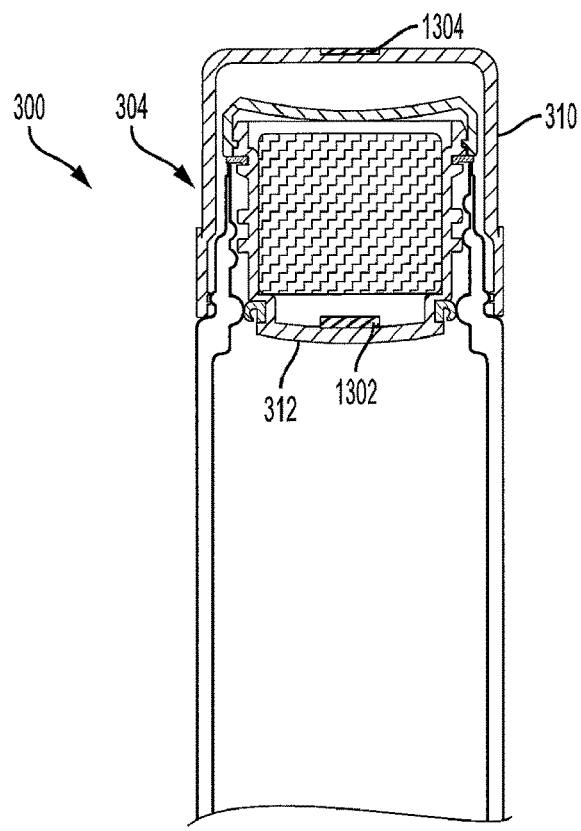
FIG. 13 illustrates a cross-sectional view of an alternative drink container and lid.
Figure 14:
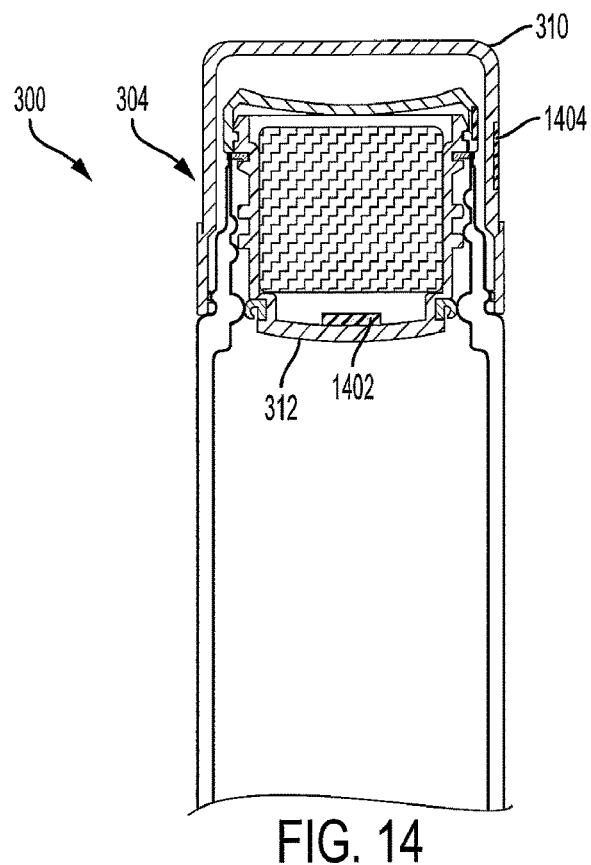
FIG. 14 illustrates a cross-sectional view of an alternative drink container and lid.

FIG. 13 shows still a further embodiment of the lid portion 304 of container 300, where the lid portion 304 comprises a first temperature sensor 1302 and a second temperature sensor 1304. The first temperature sensor 1302 is attached to the bottom, interior surface of the inner lid 313 while the second temperature sensor 1304 is attached or formed integrally with a top, exterior surface of the outer lid 310. The first temperature sensor 1302 is configured to measure the temperature of the interior surface of the container or a liquid in the container and the second temperature sensor 1304 is configured to measure the ambient temperature of an environment adjacent the second temperature sensor 1304. In addition, a cavity of the inner lid 312 is filled with a material that acts as an insulator to minimize heat loss from the container. Similar to FIG. 13, FIG. 14 displays an embodiment of the lid portion 304 of container 300, where the lid portion 304 comprises a first temperature sensor 1402 and a second temperature sensor 1404. The first temperature sensor 1402 is attached to the bottom, interior surface of the inner lid 312 while the second temperature sensor 1404 is attached or formed integrally with a side, exterior surface of the outer lid 310. The first temperature sensor 1402 is configured to measure the temperature of the interior surface of the container or a liquid in the container and the second temperature sensor 1404 is configured to measure the ambient temperature of an environment adjacent the second temperature sensor 1404. In addition, a cavity of the inner lid 312 is filled with a material that acts as an insulator to minimize heat loss from the container.

Figure 15:
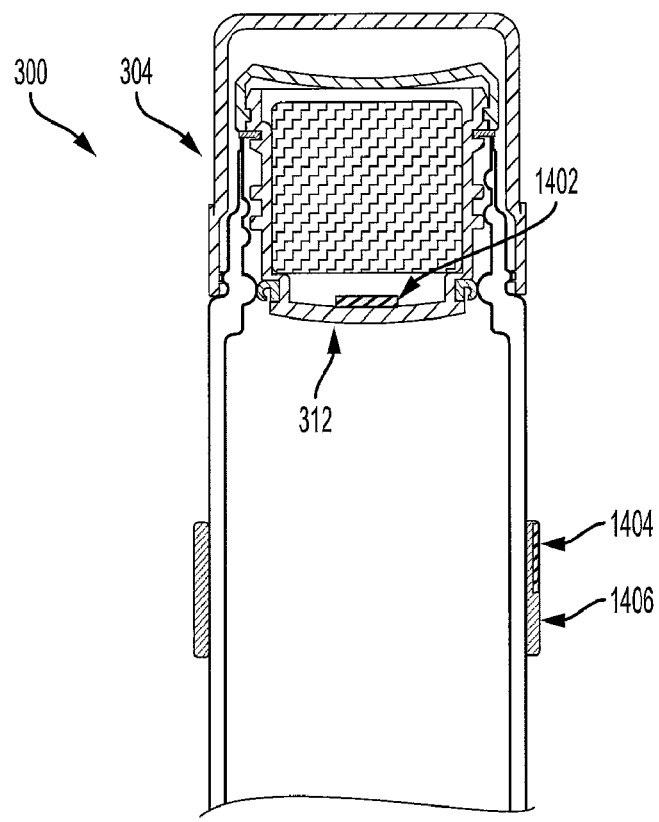
FIG. 15 illustrates a cross-sectional view of an alternative drink container and lid.
Figure 16:
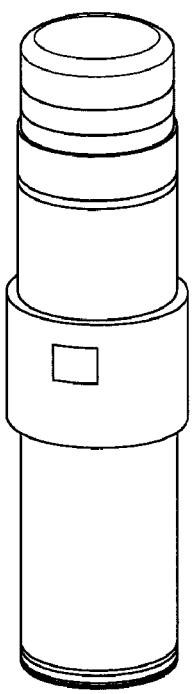
FIG. 16 illustrates a top perspective view of an alternative drink container and lid.

FIGS. 15-16 display another embodiment of the container 300, where the lid portion 304 comprises a first temperature sensor 1402 attached to a bottom, interior surface of the inner lid 312 and a second temperature sensor 1404 is attached to an exterior surface of the container. As shown in FIGS. 15-16, the second temperature sensor 1404 is attached to a grip 1406 that is formed around the circumference of the container 300. The first temperature sensor 1402 is configured to measure the temperature of the interior surface of the container or a liquid in the container and the second temperature sensor 1404 is configured to measure the ambient temperature of an environment adjacent the second temperature sensor 1404. Similar to the embodiments of FIGS. 10-13, a cavity of the inner lid 312 is filled with a material that acts as an insulator to minimize heat loss from the container.

Figure 17:
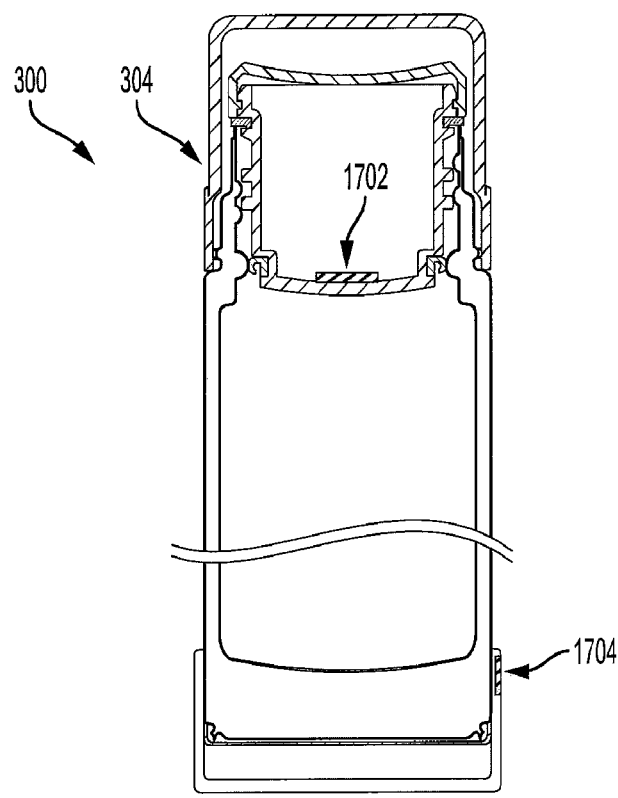
FIG. 17 illustrates a cross-sectional view of an alternative drink container and lid.

FIG. 17 shows another embodiment of the container 300, where the lid portion 304 comprises a first temperature sensor 1702 attached to a bottom, interior surface of the inner lid 312 and a second temperature sensor 1704 is attached to an exterior surface of the container. As shown in FIG. 17, the second temperature sensor 1704 is attached to or formed integrally with an exterior surface of the container 300. The first temperature sensor 1702 is configured to measure the temperature of the interior surface of the container or a liquid in the container and the second temperature sensor 1704 is configured to measure the ambient temperature of an environment adjacent the second temperature sensor 1704.

Figure 18:
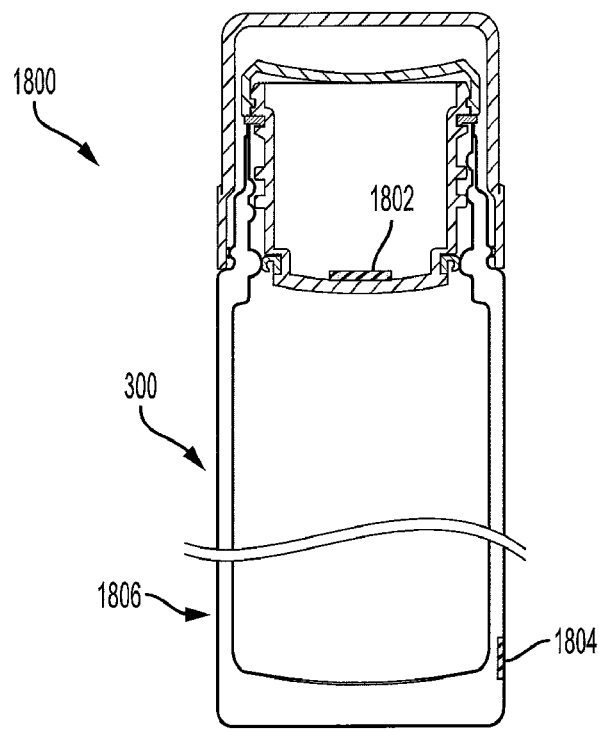
FIG. 18 illustrates a cross-sectional view of an alternative drink container and lid.

FIG. 18 shows a container monitoring system 1800 that comprises container 300 as described above and a base 1806. The container monitoring system 1800 comprises a first temperature sensor 1802 and a second temperature sensor 1804. The first temperature sensor 1802 is attached to a bottom, interior surface of the inner lid and the second temperature sensor 1804 is attached to or formed integrally with an exterior surface of the base 1806. The first temperature sensor 1802 is configured to measure the temperature of the interior surface of the container or a liquid in the container and the second temperature sensor 1804 is configured to measure the ambient temperature of an environment adjacent the second temperature sensor 1804.

Figure 19:
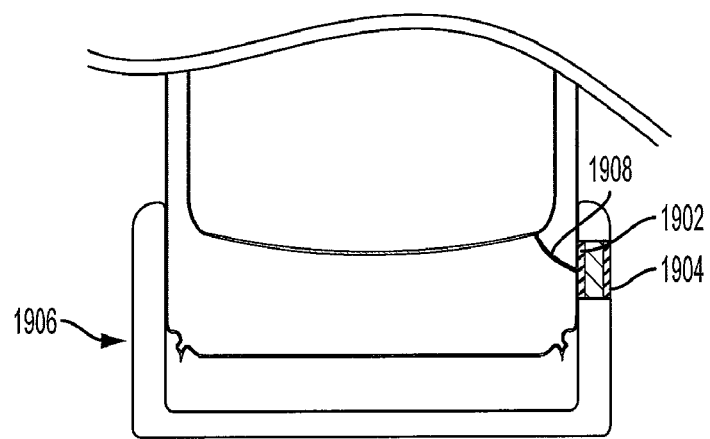
FIG. 19 illustrates a cross-sectional view of a drink container and base.

FIG. 19 shows another embodiment of a container monitoring system 1800 that comprises container 300 as described above and base 1906. The container monitoring system 1800 comprises a first temperature sensor 1902 and a second temperature sensor 1904. The first temperature sensor 1902 is attached to a bottom, interior surface of the base such that a rod 1908 in the container 300 is configured to transmit a temperature of the interior of the container to the first temperature sensor 1902 in the base 1906. The second temperature sensor 1904 is attached to or formed integrally with an exterior surface of the base 1906. The first temperature sensor 1902 is configured to measure the temperature of the interior surface of the container or a liquid in the container and the second temperature sensor 1904 is configured to measure the ambient temperature of an environment adjacent the second temperature sensor 1904. For the embodiments shown and described in FIGS. 11-19, by measuring the interior temperature of the container with a first temperature sensor and the ambient temperature with a second sensor, the container may be able to provide a user with an estimate as to the time at which a liquid within the interior or the interior of the container will be heated or cooled to a specific temperature. Additionally, for the container 300 and embodiments described in FIGS. 1-19, information from a sensor, such as the temperature sensors mentioned herein, may be communicated to a remote device, such as a computer or smartphone, via a wired or wireless connection.

Figure 20:
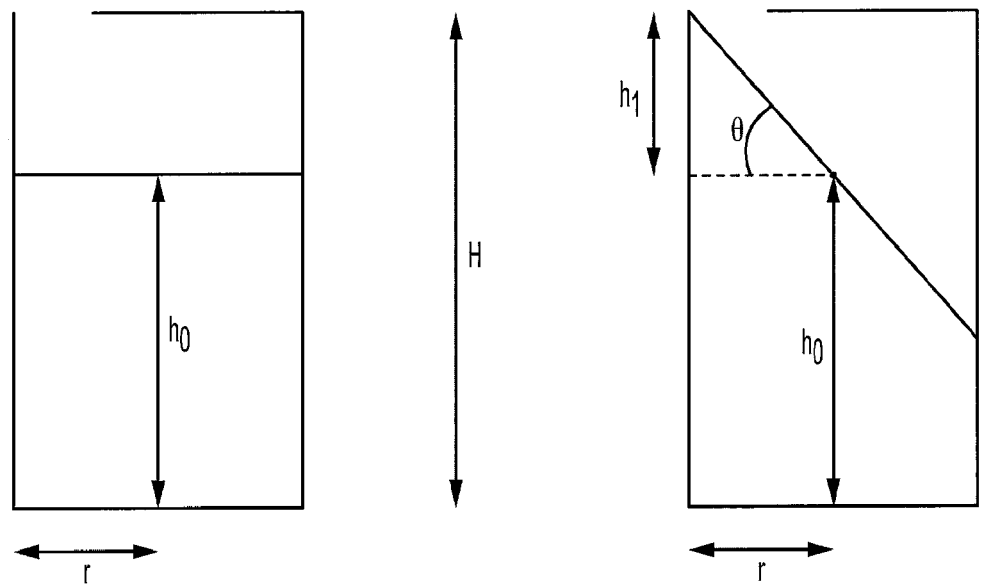
FIG. 20 illustrates a cross-sectional view of a drink container is a vertical position and a tiled position.
Figure 21:
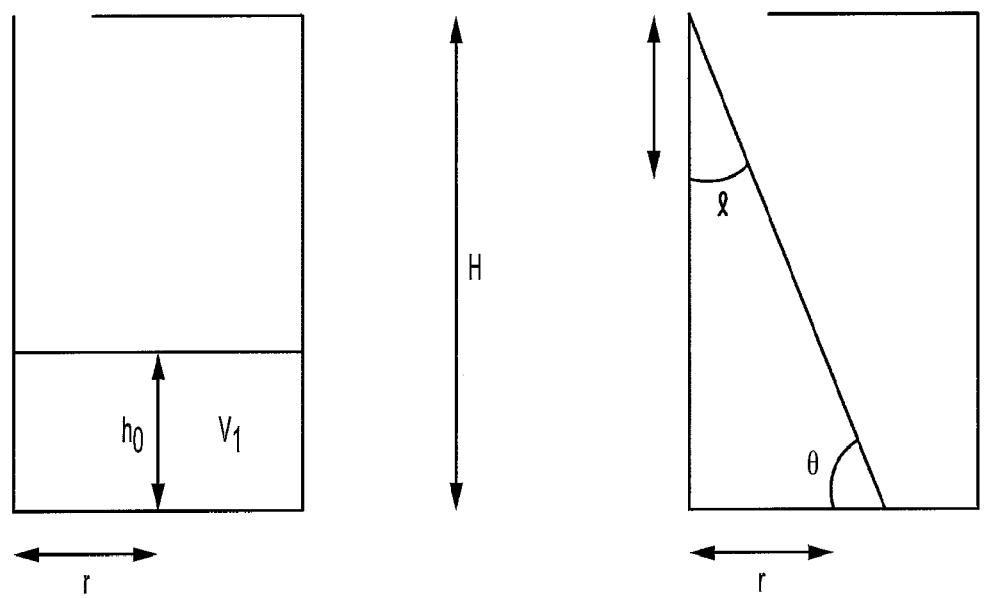
FIG. 21 illustrates a cross-sectional view of a drink container in a vertical position and a tilted position.

FIGS. 20-21 show diagrams for determining a particular angle condition at which a container, such as any of containers described herein, may be tilted before an angle condition for opening or closing a lid portion of the container is met. The examples of FIGS. 20-21 assume that the container is a cylinder having a height, H, and a radius, r, both of which are known. According to embodiments, the container may have different size configurations and similar calculations may obtain desired angles for operating an automated lid portion of the container. By measuring the height of liquid in a container continuously or at specific times, a condition of acceptable angle of the liquid in the container for opening a lid portion of the container can be updated to fit the amount of liquid in the drink container, i.e., the condition relating to what angle of liquid that is acceptable can be variable relating to how much liquid there is in the drink container. Other conditions such as that the container stays within an angle range for a certain time can also be a condition for when the angle condition is met.

The acceptable liquid angle condition of the liquid for opening the lid can be variable. Further, the liquid angle condition can be used as a default condition that has to be met before opening the lid portion. Additionally, in one embodiment, the liquid angle condition can be set in an on or off state from an interface of the container. The settings for the liquid angle condition may be such that the lid can be opened a predetermined number of degrees/radians before the liquid can be poured out. In one embodiment, the container may be configured for full liquid angle conditions or basic liquid angle conditions to be met before a lid portion of the container is opened. The basic liquid angle condition specifies the angle of the liquid in the container for which liquid would be able to pour out if the container was open. There are many ways to find at what angle liquid will be able to flow out of the container if the seal is open. In one embodiment, a sensor, such as, for example, a level sensor may be used to determine an angle of the liquid within the container. In other embodiments, experimental testing may be used to see at what angle for different liquid levels liquid would be able to pour out or the liquid angle may be calculated it depending on the shape of the container.

Furthermore, full liquid angle conditions cover more than a specific angle that should be reached to allow for a lid portion to be opened and allow liquid to flow out. Full liquid angle conditions also cover factors such as, for example, the total time the angle of the liquid is fulfilled and whether the angle of the liquid stays within a range of angles for a specific time, how much the angle of liquid varies within a specific timeframe, or how much elevation change within a specific timeframe, or any combination thereof. Each of the full angle conditions may be in addition to the basic angle condition described below. Any condition regarding the angle of the liquid in the container can be active independent of each other or in any combination. The liquid angle conditions can also be active in combination with the other conditions described in the previous examples and the opening conditions in this disclosure.

Described below is a method for calculating a liquid angle for a cylindrical container with a flow opening in the lid portion at a top side of the cylinder. The hole for the flow opening can of course be located at position other than the top side of the container, and if the location is different then a calculation may require modification using the equation below. Also if the shape of the container is different than a cylinder, the equation can be adjusted accordingly within the scope of this disclosure to fit that form and location of the hole. Additionally, the drink container may even change shape during the usage and the equation may be adapted to match that change in the container. For example, the container may be made of a material that is able to shrink when there is less liquid inside it. The equations can be updated to match the desired shape of the container. These various equations and shapes of containers, such as round, oval, square, rectangle, polygonal, etc. are within the scope of this disclosure.

Depending on if the container is half-full and more or if the container is less than half full, there are two different ways of calculating the liquid angle of a liquid in the container. The values described below can be pre calculated and stored in a memory unit for checking or they can be calculated, for example by a processor, when needed. Below is an algorithm for calculating the liquid angle for a container having a cylindrical shape.

In the example of FIG. 21, a container is half-full or more, such that the height of the liquid in the container when the container is at level or zero degrees from a horizontal, referred to as $h_0$, is greater than or equal to half the height of the container, referred to as H, and $h_1$ equals H minus the height of the liquid in the container when the container is level. A predetermined angle, $\Theta$, will be the angle created between a horizontal line parallel to the base of the container and the line formed by the liquid when the liquid would reach a top edge of the open end of the container. In one embodiment, this predetermined angle $\Theta$ is a condition to be met, i.e. the container must be held at this angle, before the lid portion of the container may be opened.

In one embodiment, $\Theta$ may be calculated by measuring the height of the liquid, $h_0$ from the bottom of the container. The height of the liquid may be measured either from the center at any angle or off center when the liquid is leveled horizontally (i.e., the container is standing up vertically). $\Theta$ may then be calculated as the angle for which liquid will reach the opening in the lid portion:

$$\theta' = \tan^{-1}((H-h_0)/r)$$

In another embodiment, a calculation of the height that the liquid currently reaches to on the side of the container may be made to see if that height reaches above the location of the opening where the liquid would flow out of. In essence, if $h_1+h_0 \geq H$, where $h_1$ is the height to the edge of the container from the center point at $h_0$, and $h_0$ is the height of the liquid from the bottom of the cylinder; then if the condition $h_1+h_0 \geq H$ is true, then the part of the angle condition that has to do with when liquid can reach such a height that it can flow out is fulfilled. A method of determining whether the liquid angle condition is met, includes measuring liquid level, $h_0$, when the container is tilted, measuring $\Theta$, and for current $\Theta$, calculating $h_1$ using the formula:

$$\tan(\theta) = \frac{h_1}{r}$$
$$h_1 = r * \tan(\theta)$$

The method may then include checking if $h_1+h_0 \geq H$, if this is true then the liquid angle condition is fulfilled. This method could also be used to iterate though different $h_1$ until an angle is reached where liquid would contact the opening.

In another embodiment shown in FIG. 21, for a liquid level below half of the cylinder, $$h_0 < \frac{H}{2},$$

the angle for when liquid can flow out at the top of the cylinder is calculated based on the known volume of container. A method for determining whether the liquid angle condition is met includes calculating an angle of the container for which a liquid in the container would start flowing out. Accordingly, the method involves calculating the volume $V_1$ that the liquid has occupied in the container:

$$V_1 = \pi r^2 h_0$$

The volume is constant so $V_1 = V_2$ and from that the angle $\Theta$ at which liquid would flow out can be calculated. $\Theta$ can be solved for analytically from the equations (a) and (b) below, or it can be solved using an iterative method.

$$\theta = 90 - \alpha \quad \text{(a)}$$

$$V_1 = V_2 = \int_0^H r^2 * \cos^{-1}\left(1 - \left(x * \frac{\tan(\alpha)}{r}\right)\right) - \quad \text{(b)}$$
$$(r - x * \tan(\alpha)) * \sqrt{2 * r * (r - x * \tan(\alpha)) - (x * \tan(\alpha))^2} \, dx$$

Figure 22:
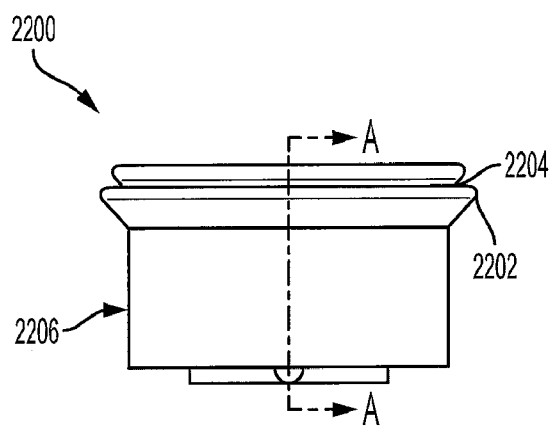
FIG. 22 illustrates a side view of a lid for a container.

FIG. 22 discloses an embodiment of a lid 2200. The lid can attach to a container or other vessel. The lid may be attached to a container through various means, for example, a friction lock, a threaded connection, or a magnetic connection just to name a few. The lid 2200 can comprise a flared edge 2202 and an opening 2204. In an embodiment of a beverage container, the flared edge 2202 may matingly correspond to the mouth of a user. When tilted, the container and lid 2200 assembly may pour a liquid contained within the container through the opening 2204 and the liquid may be received by a user's mouth. In addition, the opening 2204 may be used to permit a liquid within the container and lid 2200 assembly to be poured into another vessel, container, or onto the ground. The lid 2200 can include a body 2206. The body 2206 can be cylindrical, oval, square, or other shape. The shape of the body 2206 of the lid 2200 can correspond to the shape of the container of vessel that the lid 2200 is configured to correspond with.

Figure 23:
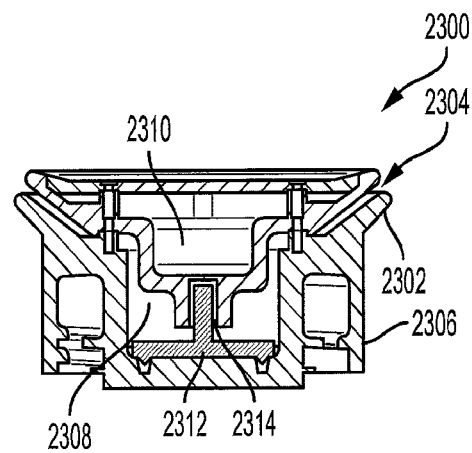
FIG. 23 illustrates a cross-section view of the lid for a container of FIG. 22 taken along dashed line A-A.

FIG. 23 illustrates lid 2300 which is a cross-section view of the lid 2200 depicted in FIG. 22 along line A-A. The lid 2300 can include flared edge 2302, opening 2304, and body 2306 which correspond to the similar elements as describe with respect to FIG. 22. The cross-sectional view of FIG. 23 depicts one embodiment of a lid closure mechanism 2308 incorporated in lid 2300. The lid closure mechanism 2308 may be manually operated, automatically operated, or combinations thereof. The lid closure mechanism 2308 can comprise a magnet 2310, a rod 2312 and a spring 2314. In one embodiment the magnet 2310 may be an electromagnet. The lid closure mechanism 2308 can operate to permit the opening and closure of the opening 2304. The lid closure mechanism 2308 can be used to permit a seal (not shown) to seal the opening 2304 when the lid closure mechanism 2308 is in a closed configuration. The lid closure mechanism 2308 can be used to release the seal (not shown) to permit communication through the opening 2304 when the lid closure mechanism 2308 is in an opened configuration. In one embodiment the lid closure mechanism 2308 operates by use of an electromagnet 2310 which is permitted to attract/release the rod 2312, which is attracted to magnetism. In addition, the spring 2314 may operate to bias the electromagnet 2310 and the rod 2312.

In one embodiment, the electromagnet 2310 can attract the rod 2312 to position the seal in the closed position to seal the opening 2304. The spring 2314 would be a compression spring and compress when the electromagnet 2310 attracts the rod 2312 and moves the rod 2312 and seal to the closed and sealed position. Then the electromagnet 2310 is set to repel the rod 2314 or is turned off, the compressed spring 2314 acts between the electromagnet 2310 and the rod 2312 to move the seal to the open position to permit communication between the interior of the container and the environment through the opening 2304. In another embodiment, the spring 2314 can be a tension spring and when the electromagnet 2310 is turned off can cause the rod 2312 to be moved into the closed position to seal the opening 2304. When the electromagnet 2310 is turned on to repel the rod 2312, the rod 2312 is moved to the open position and the seal is moved away from the opening 2304 and permits fluid communication through the opening 2304. Other variations are also within the scope of the disclosure, for example multiple electromagnets can operate to position the seal between the open and closed position to seal the opening 2304. In additional or alternatively, a system of springs can be used in combination to move the seal between the open and closed positions to permit/block liquid communication through the opening 2302. In addition, the lid closure mechanism 2308 may be controlled and operated automatically through a CPU or processor. The processor can receive signals from a user input of various sensors and operative conditions to cause the lid closure mechanism 2308 to move between an open and closed position.

Figure 24:
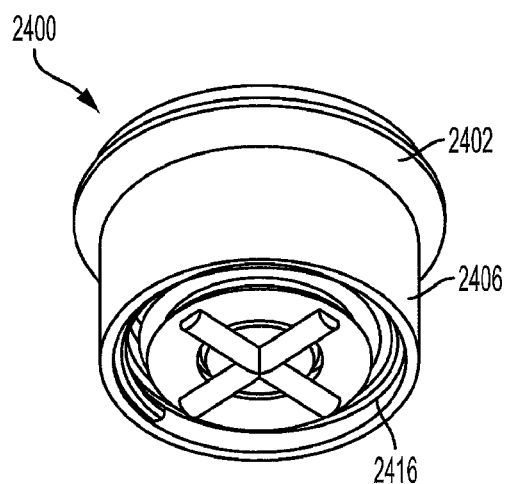
FIG. 24 illustrates a bottom perspective view of the lid for a container of FIG. 22.
Figure 25:
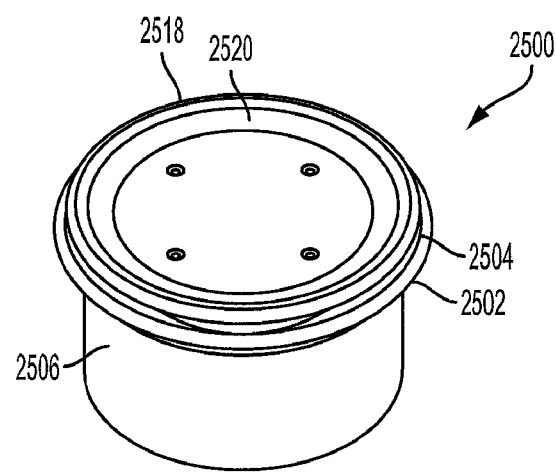
FIG. 25 illustrates a top perspective view of the lid for a container of FIG. 22.

FIGS. 24 and 25 depict other views of the lid 2200 depicted in FIG. 22. The lid 2400 of FIG. 24 comprises flared edge 2402 and cylindrical body 2406. The lid 2400 also includes a threaded connection 2416. The threaded connection 2416 may correspond to the threaded connection of a bottle, container or vessel. The lid 2500 of FIG. 25 comprises a flared edge 2502, opening 2504 and cylindrical body 2506. In one embodiment, the lid 2500 may comprise a top portion 2518 and a beveled portion 2520. The beveled portion 2520 may facilitate to communication of fluid between the internal cavity of a bottle and the exterior environment, for example a user's mouth. The beveled portion 2520 can operate similar to a funnel or spout and be used to direct the contents of the container in a particular manner or direction.

Figure 26:
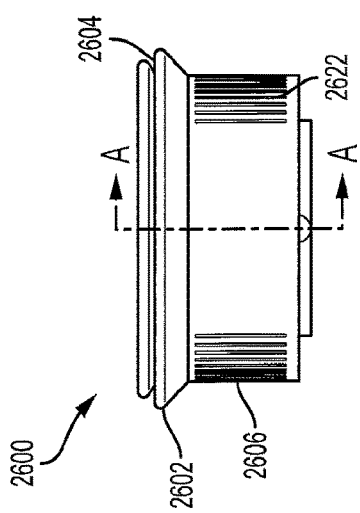
FIG. 26 illustrates a perspective view of an aspect of a container and lid.

FIGS. 26-31 illustrate another embodiment of a lid. FIG. 26 discloses an embodiment of a lid 2600. The lid can attach to a container or other vessel. The lid 2600 may be attached to a container through various means, for example, a friction lock, a threaded connection, or a magnetic connection just to name a few. The lid can comprise a flared edge 2602 and an opening 2604. In an embodiment of a beverage container, the flared edge 2602 may matingly correspond to the mouth of a user. When tilted, the container and lid 2600 assembly may pour a liquid contained within the container through the opening 2604 and the liquid may be received by a user's mouth. In addition, the opening 2604 may be used to permit a liquid within the container and lid 2600 assembly to be poured into another vessel, container, or onto the ground. The lid 2600 can include a body 2606. The body 2606 can be cylindrical, oval, square, or other shape. The shape of the body 2606 of the lid 2600 can correspond to the shape of the container of vessel that the lid 2600 is configured to correspond with. The body 2600 may also include grooves or friction grips 2622. The grooves 2622 may be used to facilitate the grip of a user when attaching the lid 2600 to a container. The grooves 2622 may also assist the user when detaching the lid 2600 from a container by permitting the user to have a better grip of the lid 2600. In additional, or alternatively, the corresponding container may have grooves or friction grips to facilitate the attachment and detachment of the container and lid 2600.

Figure 27:
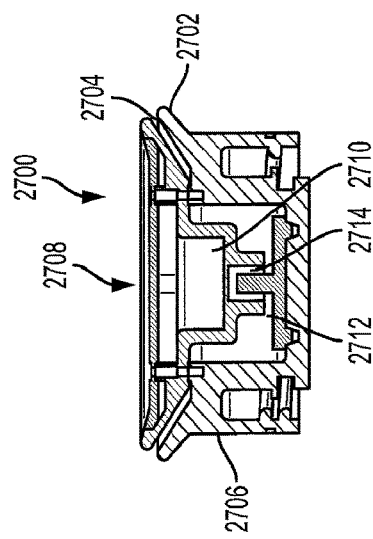
FIG. 27 illustrates a front elevation view of the container and lid of FIG. 26.

FIG. 27 illustrates lid 2700 which is a cross-section view of the lid 2600 depicted in FIG. 26 along line A-A. The lid 2700 can include flared edge 2702, opening 2704, and body 2706 which correspond to the similar elements as describe with respect to FIG. 26. The cross-sectional view of FIG. 27 depicts one embodiment of a lid closure mechanism 2708 incorporated in lid 2700. The lid closure mechanism 2708 may be manually operated, automatically operated, or combinations thereof. The lid closure mechanism 2708 can comprise a magnet 2710, a rod 2712 and a spring 2714. In one embodiment the magnet 2710 may be an electromagnet. The lid closure mechanism 2708 can operate to permit the opening and closure of the opening 2704. The lid closure mechanism 2708 can be used to permit a seal (not shown) to seal the opening 2704 when the lid closure mechanism 2708 is in a closed configuration. The lid closure mechanism 2708 can be used to release the seal (not shown) to permit communication through the opening 2704 when the lid closure mechanism 2708 is in an opened configuration. In one embodiment the lid closure mechanism 2708 operates by use of an electromagnet 2710 which is permitted to attract/release the rod 2712, which is attracted to magnetism. In addition, the spring 2714 may operate to bias the electromagnet 2710 and the rod 2712.

In one embodiment, the electromagnet 2710 can attract the rod 2712 to position the seal in the closed position to seal the opening 2704. The spring 2714 would be a compression spring and compress when the electromagnet 2710 attracts the rod 2712 and moves the rod 2712 and seal to the closed and sealed position. Then the electromagnet 2710 is set to repel the rod 2714 or is turned off, the compressed spring 2714 acts between the electromagnet 2710 and the rod 2712 to move the seal to the open position to permit communication between the interior of the container and the environment through the opening 2704. In an alternative embodiment, the spring 2714 can be a tension spring and when the electromagnet 2710 is turned off can cause the rod 2712 to be moved into the closed position to seal the opening 2704. When the electromagnet 2710 is turned on to repel the rod 2712, the rod 2712 is moved to the open position and the seal is moved away from the opening 2704 and permits fluid communication through the opening 2704. Other variations are also within the scope of the disclosure, for example multiple electromagnets can operate to position the seal between the open and closed position to seal the opening 2704. In additional or alternatively, a system of springs can be used in combination to move the seal between the open and closed positions to permit/block liquid communication through the opening 2702. In addition, the lid closure mechanism 2708 may be controlled and operated automatically through a CPU or processor. The processor can receive signals from a user input of various sensors and operative conditions to cause the lid closure mechanism 2708 to move between an open and closed position. A processor is described in greater detail below.

Figure 28:
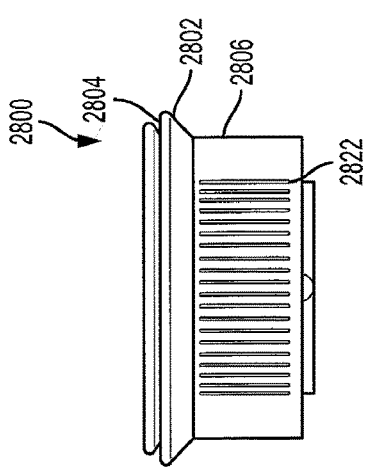
FIG. 28 illustrates a back elevation view of the container and lid of FIG. 26.
Figure 29:
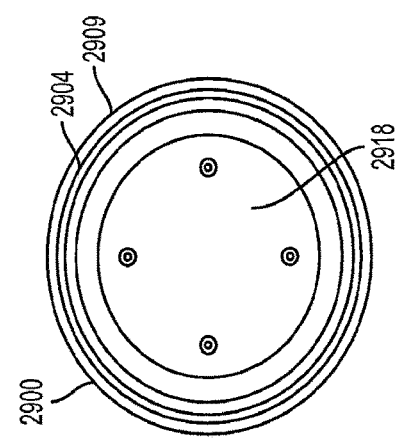
FIG. 29 illustrates a side elevation view of the container and lid of FIG. 26.

FIGS. 28 and 29 illustrate different views of the lid. The lid 2800 of FIG. 28 can comprise a flared edge 2802 and an opening 2804. The lid 2800 can include a body 2806. The body 2806 can be cylindrical, oval, square, or other shape. The shape of the body 2806 of the lid 2800 can correspond to the shape of the container of vessel that the lid 2800 is configured to correspond with. The body 2800 may also include grooves or friction grips 2822. The grooves 2822 may be used to facilitate the grip of a user when attaching the lid 2600 to a container. The grooves 2822 may also assist the user when detaching the lid 2800 from a container by permitting the user to have a better grip of the lid 2800. In additional, or alternatively, the corresponding container may have grooves or friction grips to facilitate the attachment and detachment of the container and lid 2800. FIG. 29 depicts a top plan view of lid 2900. The lid 2900 of may include flared edge 2909, opening 2904 and a top portion 2918. The top portion 2918 may be flat, concave, convex, ridged or grooved. The shape of the top portion 2918 may facilitate the operation of the lid and allow for a more ergonomic operation. In addition, the top portion 2918 may comprise various sensors, for example proximity sensors or capactivity sensors to detect a users input and interaction. The various sensors that may be included in the top portion 2918 and other portions of the lid 2900 are discussed throughout the application.

Figure 31:
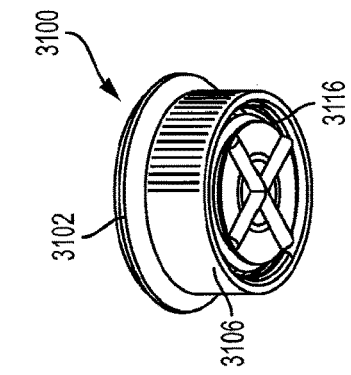
FIG. 31 illustrates a top plan view of the container and lid of FIG. 26.
Figure 30:
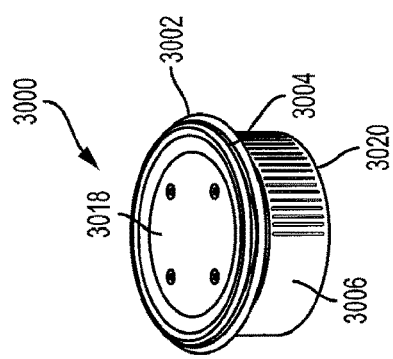
FIG. 30 illustrates a side elevation view of the container and lid of FIG. 26.

FIGS. 30 and 31 depict other views of the lid 2600 depicted in FIG. 22. The lid 3000 of FIG. 30 comprises a flared edge 3002, opening 3004 and cylindrical body 3006. In one embodiment, the lid 3000 may comprise a top portion 3018 and a beveled portion 3020. The beveled portion 3020 may facilitate to communication of fluid between the internal cavity of a bottle and the exterior environment, for example a user's mouth. The beveled portion 3020 can operate similar to a funnel or spout and be used to direct the contents of the container in a particular manner or direction. The lid 3100 of FIG. 31 comprises flared edge 3102 and cylindrical body 3106. The lid 3100 also includes a threaded connection 3116. The threaded connection 3116 may correspond to the threaded connection of a bottle, container or vessel.

FIGS. 32-49 illustrate various embodiments of lids, seals, and lid closure mechanisms. The various embodiments discussed in FIGS. 32-49 may comprise openings for the contents of a container, i.e. liquids, to be removed or poured out of the container. In one embodiment, the container may be a drink container and a drink may be poured out of the container through an opening in the container. The opening may be located on various parts of the container, for example, the lid, the side, or the bottom of the container. Thus, the location of where the liquid is expelled from the container may be at various locations throughout the container body and lid. In addition or in the alternative, the lid may be located at various locations along the container and may be separate or integral to the container. In one embodiment, a drink container may have an opening that can be closed and opened, and the opening can be located anywhere on the drink container.

In addition, or in the alternative, the container and lid assemblies may use various mechanisms and means for sealing and opening the various openings of the embodiments. In one embodiment, the opening may be sealed by a lid closure mechanism using horizontal seals. In another embodiment the lid closure mechanism may be sealed using vertical seals. In another embodiment, the lid closure mechanism may utilize a combination of vertical and horizontal seals to seal the openings. Additionally, the openings and seals may be located on various parts of the lid and container assembly. In one embodiment, horizontal and vertical seals may be mounted on a top lid to a drink container and the drink container may have one or more openings. In one embodiment, a vertical seal may be used to seal a single opening into the internal cavity of the container. However, the single opening may have fluid communication to one, two, or more user drink openings where the user can drink the liquid contents from the container. In one embodiment, the container or lid may have two opposite openings, one for the user to drink and another that will act as air intake/vent while drinking. This will provide the user with a consistent flow of liquid from the container and prevent a vapor lock within the container which could disrupt the flow of liquid. When two openings are present, the user may rotate the lid to the one side or the other and alternate between which opening is the air intake or the drink opening. This may also allow the user to share the liquid contents of the container without sharing a drink opening with another.

The lid closure mechanisms may operate through various means. In one embodiment, and electromechanical solution can be used to operate the seal and openings. In other embodiments, springs, actuators, motors, temperature gradients, sensors, and other mechanisms may be used to operate and or trigger the lid closure mechanisms. The lid closure mechanisms may also be manually operated by the user or they may operate automatically upon the happening of conditions or sequences of conditions.

Figure 32:
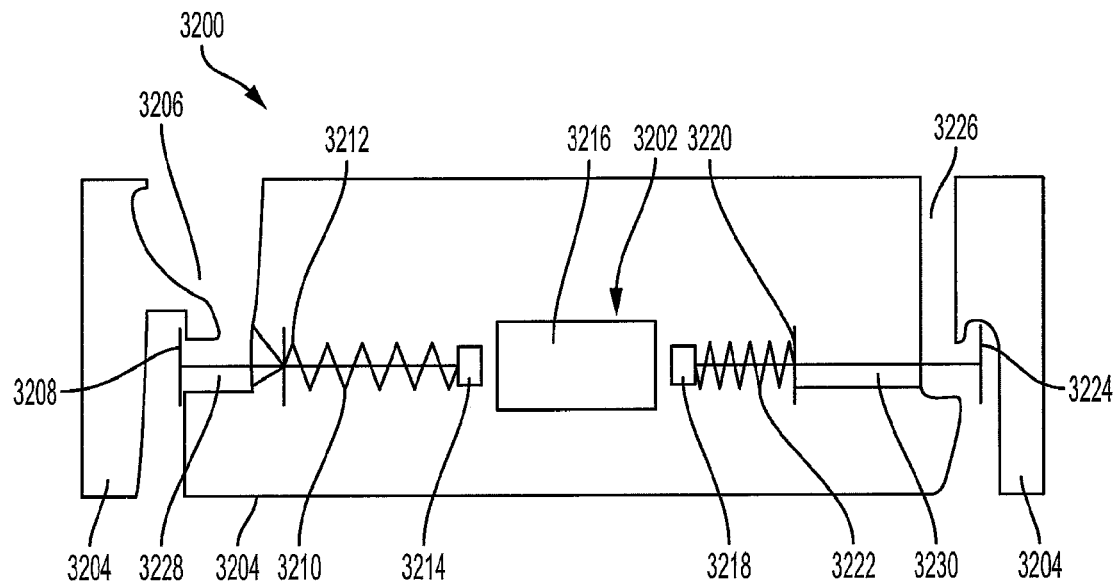
FIG. 32 illustrates a side view of a horizontal opening and seal of a drink container.

FIG. 32 illustrates an embodiment of a lid 3200 having a horizontal lid closing/sealing mechanism 3202. The lid 3200 may comprise a body 3204 which may be integrally formed or may be formed of various pieces. The body 3204 may be produced through various methods from injection molding to 3D printing. The lid 3200 may include a first opening 3206, which may act as a refill opening. The first opening may be sealed by a first seal 3208 or a refill seal. The lid 3200 may also comprises a first spring 3210 or refill spring and a first support 3212 or a refill support. The lid 3200 may also comprises a first magnet 3214 or refill magnet. The lid 3200 may also comprises a first rod 3228 or refill rod. The first rod 3228 directs the forces of the first magnet 3214, first spring 3210, first seal 3208, and first support 3212. The various elements labeled as first or refill may cooperate permit the sealing and opening of the first opening 3206. In addition, or in the alternative, the lid 3200 may include may include a second opening 3226, which may act as a user drinking opening. The second opening may be sealed by a second seal 3224 or a drink seal. The lid 3200 may also comprises a second spring 3222 or drink spring and a second support 3220 or a drink support. The lid 3200 may also comprises a second magnet 3218 or drink magnet. The lid 3200 may also comprises a second rod 3230 or refill rod. The second rod 3230 directs the forces of the second magnet 323218, second spring 3222, second seal 3224, and second support 3220. The various elements labeled as second or drink may cooperate permit the sealing and opening of the second opening 3226. In addition, the lid 3200 may comprise an electromagnet 3216. The electromagnet may interact with the first and second magnets 3214, 3218 to open and close the first and second seals 3208, 3224 which in turn open and close the first and second openings 3206, 3226.

The first and second seal, 3208, 3224 may operate together or independently. In one embodiment, when a user interacts with the lid to cause a set condition to occur, i.e. capacitivity with interaction with the user's lips, capacitivity with the user's hand, a degree in which the lid is angled or a fingerprint or pressure sensor, a power source may pass energy through the electromagnet 3216 in a first direction. The first direction of current through the circuit may cause the first seal 3208 to remain closed and the second seal 3224 to open an permit fluid communication through the second opening 3226. In an alternative embodiment, when the user condition(s) is/are met, the electricity in the circuit may flow in a first direction and cause both the first seal 3208 and the second seal 3224 to open within their respective first and second openings, 3206, 3226 which will permit the internal cavity of the container to co have communication with the outside environment. When the electricity is switched to flow in the revers direction or alternatively turned off, the first and second springs 3210, 3222 may operate to force the seals to close their respective openings and block fluid communication between the internal cavity and the external environment.

In a general aspect, the lid closure mechanism 3202 of lid 3200 operates through magnetic repulsion and spring compression. When in a closed state, the first seal 3208 is in a position to seal the first opening 3206. The first seal 3208 is positioned in the closed state by the compression of the first spring 3210. The first spring 3210 acts against the first support 3212 and the first magnet 3214 to hold the first spring 3208 in a sealed position within opening 3206. When the electrical current is applied to the electromagnet 3216 is a first direction, the electromagnet 3216 attracts the first magnet 3214, which strengthens the first seal's 3208 closure of the first opening 3206. When the electrical current is applied to the electromagnet 3216 is a second direction, the electromagnet 3216 repels the first magnet 3214 and overcomes the compression forces of the first spring 3210, which moves the first seal 3208 from the sealed position to the open position to permit fluid to flow through the first opening 3206. In a similar manner, the second opening 3226 and corresponding seal, magnet, and spring may operate in a similar manner.

In one embodiment, the first seal 3208 and the second seal 3226 may both be in the sealed or closed position when no current is supplied to the electromagnet. In addition, or in the alternative, the first and second seals 3208, 3226 may both be moved to an open position when current is supplied to the electromagnet in a first direction. In addition, or in the alternative, the first seal 3208 may be moved to an open position when current is supplied to the electromagnet in a first direction and the second seal 3224 may remain in a sealed position. In addition, or in the alternative, the second seal 3224 may be moved to an open position when current is supplied to the electromagnet in a first direction, and the first seal 3208 may remain in a sealed position. In addition, or in the alternative, the first and second seals 3208, 3226 may both be moved to an open position when current is supplied to the electromagnet in a second direction. In addition, or in the alternative, the first seal 3208 may be moved to an open position when current is supplied to the electromagnet in a second direction and the second seal 3224 may remain in a sealed position. In addition, or in the alternative, the second seal 3224 may be moved to an open position when current is supplied to the electromagnet in a second direction, and the first seal 3208 may remain in a sealed position.

Figure 33:
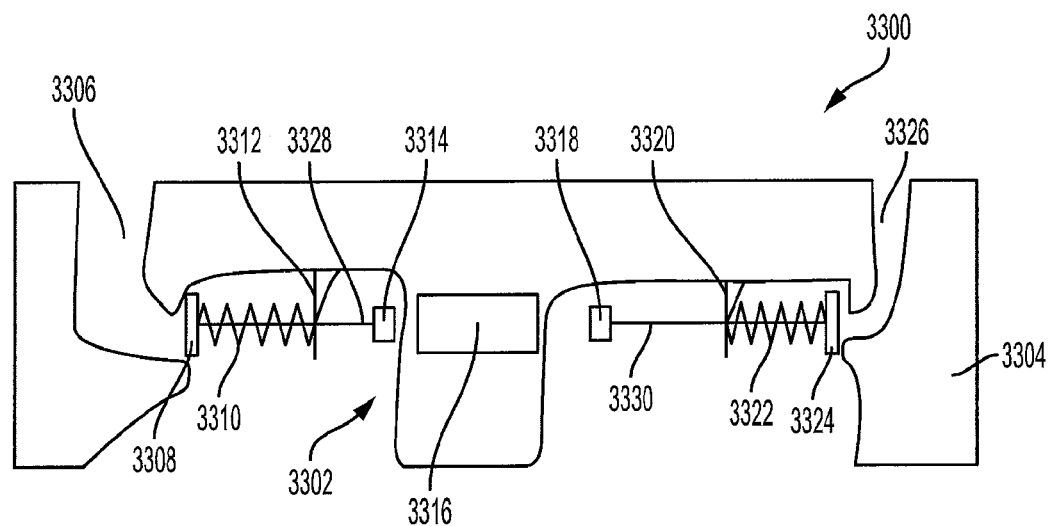
FIG. 33 illustrates a side view of an alternative horizontal opening and seal of a drink container.

FIG. 33 depicts an alternative lid closure mechanism design. FIG. 33 illustrates an embodiment of a lid 3300 having a horizontal lid closing/sealing mechanism 3302. The lid 3300 may comprise a body 3304 which may be integrally formed or may be formed of various pieces. The body 3304 may be produced through various methods from injection molding to 3D printing. The lid 3300 may include a first opening 3306, which may act as a refill opening. The first opening may be sealed by a first seal 3308 or a refill seal. The lid 3300 may also comprises a first spring 3310 or refill spring and a first support 3312 or a refill support. The lid may also comprises a first magnet 3314 or refill magnet. The lid 3300 may also comprises a first rod 3328 or refill rod. The first rod 3328 directs the forces of the first magnet 3314, first spring 3310, first seal 3308, and first support 3312. The various elements labeled as first or refill may cooperate permit the sealing and opening of the first opening 3306. In addition, or in the alternative, the lid 3300 may include may include a second opening 3326, which may act as a user drinking opening. The second opening may be sealed by a second seal 3324 or a drink seal. The lid 3300 may also comprises a second spring 3322 or drink spring and a second support 3320 or a drink support. The lid may also comprises a second magnet 3318 or drink magnet. The lid 3300 may also comprises a second rod 3330 or refill rod. The second rod 3330 directs the forces of the second magnet 3318, second spring 3322, second seal 3324, and second support 3320. The various elements labeled as second or drink may cooperate permit the sealing and opening of the second opening 3326. In addition, the lid 3300 may comprise an electromagnet 3316. The electromagnet may interact with the first and second magnets 3314, 3318 to open and close the first and second seals 3308, 3324 which in turn open and close the first and second openings 3306, 3326.

The first and second seal, 3308, 3324 may operate together or independently. In one embodiment, when a user interacts with the lid to cause a set condition to occur, i.e. capacitivity with interaction with the user's lips, capacitivity with the user's hand, a degree in which the lid is angled or a fingerprint or pressure sensor, a power source may pass energy through the electromagnet 3316 in a first direction. The first direction of current through the circuit may cause the first seal 3308 to remain closed and the second seal 3324 to open an permit fluid communication through the second opening 3326. In an alternative embodiment, when the user condition(s) is/are met, the electricity in the circuit may flow in a first direction and cause both the first seal 3308 and the second seal 3324 to open within their respective first and second openings, 3306, 3326 which will permit the internal cavity of the container to co have communication with the outside environment. When the electricity is switched to flow in the revers direction or alternatively turned off, the first and second springs 3310, 3322 may operate to force the seals to close their respective openings and block fluid communication between the internal cavity and the external environment.

In a general aspect, the lid closure mechanism 3302 of lid 3300 operates through magnetic attraction/repulsion and spring compression. When in a closed state, the first seal 3308 is in a position to seal the first opening 3306. The first seal 3308 is positioned in the closed state by the compression of the first spring 3310. The first spring 3310 acts against the first support 3312 and the first seal 3308 to hold the first spring 3308 in a sealed position within opening 3306. When the electrical current is applied to the electromagnet 3316 is a first direction, the electromagnet 3316 repels the first magnet 3314, which strengthens the first seal's 3308 closure of the first opening 3306. When the electrical current is applied to the electromagnet 3316 is a second direction, the electromagnet 3316 attracts the first magnet 3314 and overcomes the compression forces of the first spring 3310, which moves the first seal 3308 away from the sealed position to the open position to permit fluid to flow through the first opening 3306. In a similar manner, the second opening 3326 and corresponding seal, magnet, and spring may operate in a similar manner.

In one embodiment, the first seal 3308 and the second seal 3326 may both be in the sealed or closed position when no current is supplied to the electromagnet. In addition, or in the alternative, the first and second seals 3308, 3326 may both be moved to an open position when current is supplied to the electromagnet in a first direction. In addition, or in the alternative, the first seal 3308 may be moved to an open position when current is supplied to the electromagnet in a first direction and the second seal 3324 may remain in a sealed position. In addition, or in the alternative, the second seal 3324 may be moved to an open position when current is supplied to the electromagnet in a first direction, and the first seal 3308 may remain in a sealed position. In addition, or in the alternative, the first and second seals 3308, 3326 may both be moved to an open position when current is supplied to the electromagnet in a second direction. In addition, or in the alternative, the first seal 3308 may be moved to an open position when current is supplied to the electromagnet in a second direction and the second seal 3324 may remain in a sealed position. In addition, or in the alternative, the second seal 3324 may be moved to an open position when current is supplied to the electromagnet in a second direction, and the first seal 3308 may remain in a sealed position.

Figure 34:
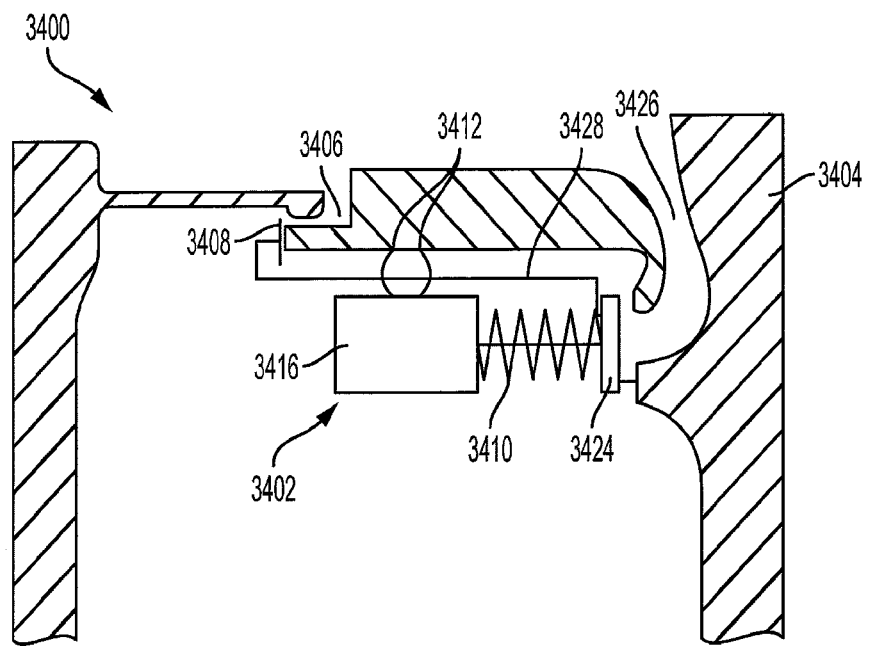
FIG. 34 illustrates a side view of an alternative horizontal opening and seal of a drink container.

FIG. 34 depicts an embodiment of a lid 3400 and a lid closure mechanism 3402. The lid 3400 includes a body portion 3404, a first opening 3406 and a second opening 3426. The first opening 3406 may be sealed by the first seal 3408. The second opening 3426 may be sealed by the second seal 3424. The lid closure mechanism comprises a rod 3428, or seal connector member, a biasing member 3410 or spring, and a mechanical means 3416 or actuator. The mechanical means 3416 may comprise an electromagnet, a hydraulic actuator, an electric actuator or motor, or other mechanical means. The mechanical means may be attached to the body portion 3404, through a support 3412, or alternatively may be an integral portion of the body portion 3404 of the lid 3400. The biasing member 3410 or spring, may be configured to bias the first and second seals 3408, 3424 in a closed position. In an alternative embodiment, the biasing member 3410 or spring, may be configured to bias the first seal 3408 in a closed position and the second seal 3424 in an open position. In an alternative embodiment, the biasing member 3410 or spring, may be configured to bias the second seal 3424 in a closed position and the first seal 3408 in an open position. The biasing member 3410 or spring, may be configured to bias the first and second seals 3408, 3424 in an open position. Conversely, the mechanical means 3416 may operate to counter the biasing member 3410 and move the first and second seals 3408, 3424 from their initial position to either the closed or open position.

Figure 35:
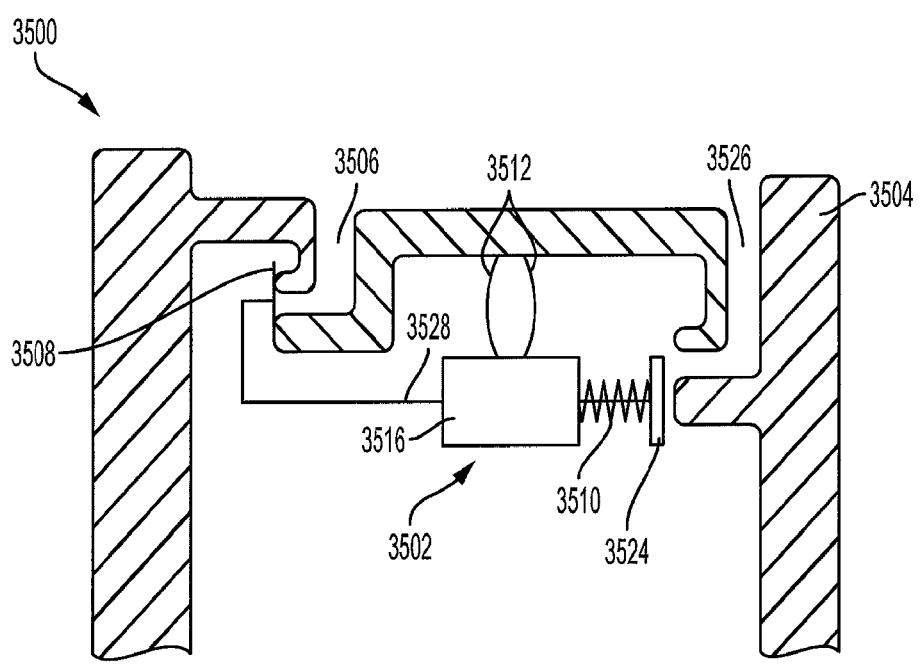
FIG. 35 illustrates a side view of an alternative horizontal opening and seal of a drink container.

FIG. 35 depicts an embodiment of a lid 3500 and a lid closure mechanism 3502. The lid 3500 includes a body portion 3504, a first opening 3506 and a second opening 3526. The first opening 3506 may be sealed by the first seal 3508. The second opening 3526 may be sealed by the second seal 3524. The lid closure mechanism comprises a rod 3528, or seal connector member, a biasing member 3510 or spring, and a mechanical means 3516 or actuator. The mechanical means 3516 may comprise an electromagnet, a hydraulic actuator, an electric actuator or motor, or other mechanical means. The mechanical means may be attached to the body portion 3504, through a support 3512, or alternatively may be an integral portion of the body portion 3504 of the lid 3400. The biasing member 3510 or spring, may be configured to bias the first and second seals 3508, 3524 in a closed position. In an alternative embodiment, the biasing member 3510 or spring, may be configured to bias the first seal 3508 in a closed position and the second seal 3524 in an open position. In an alternative embodiment, the biasing member 3510 or spring, may be configured to bias the second seal 3524 in a closed position and the first seal 3508 in an open position. The biasing member 3510 or spring, may be configured to bias the first and second seals 3508, 3524 in an open position. Conversely, the mechanical means 3516 may operate to counter the biasing member 3510 and move the first and second seals 3508, 3524 from their initial position to either the closed or open position.

Figure 36:
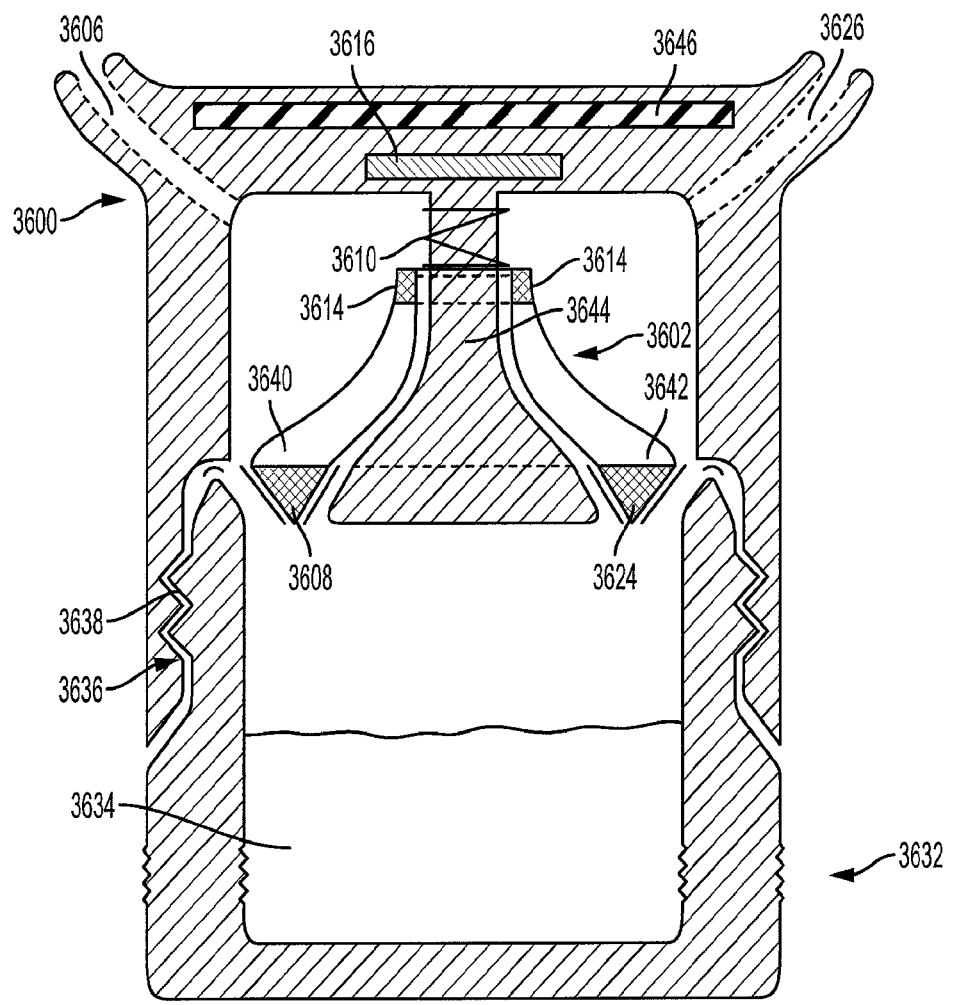
FIG. 36 illustrates a cross-sectional view of an alternative drink container and lid.

FIG. 36 depicts another embodiment of a container 3632, a lid 3600, and a lid closure mechanism 3602. The container 3632 may contain a liquid 3634. The lid 3600 can comprise a lid closure mechanism 3602. The lid closure mechanism can include a first seal 3608 and a second seal 3624. The lid 3600 can include a connection 3636 to matingly interact with the container 3632. The connection 3636 may be threaded, snap fit, magnetic, clasped or other type of connection. The connection 3636 can have a connection seal 3638 or an interface comprised of sealing material to seal between the lid 3600 and the container 3632. The sealing material may be a silicon or elastomer compound that can provide the desired sealing capabilities. The lid 3600 can include also include a first channel 3606 and a second channel 3626. A single channel and additional numbers of channels are also within the scope of the disclosure, such a three, four, five, six, seven, eight, or nine channels. Multiple smaller channels may be grouped together in an area that permits the user to drink from the lid. This may be useful where the user wants to keep ice inside the container 3632 or it may also offer a filtration effect. The channels may also include a screen. The lid closure mechanism 3602 can include a spring 3610, magnets 3614 or magnetic material, and a first and second sealing arms 3640, 3642. The lid closure mechanism 3602 can include a central support portion 3644. The first and second sealing arms 3640, 3642, and the magnet 3614 may surround the central support portion 3644 and move along the central support portion 3644. In the present embodiment, the first and second arms 3640, 3642 and the magnet 3614 can be attached to the spring 3610 and move up and down along the central support portion 3644. The central support portion 3644 may be a rod shape or have a tapered shape. The central support portion 3644 may be an integral portion of the lid 3600 or may be removed. The first and second sealing arms, 3640, 3642 the first and second seals 3608, 3624, the magnet, and the electromagnet can cooperate to move the seals from a closed position, where the first and second openings 3606, 3626 are blocked to an open position where the first and seconds openings 3606, 3626 are open and can permit the liquid 3634 to be poured from the container 3632.

In one embodiment, the first and second sealing arms 3640, 3642 and magnet 3614 are biased by the spring 3610 or biasing member into a closed configuration. When the user activates a condition in the sensor 3646, such as a proximity sensor, pressure sensor, temperature sensor, capactivity or capacitance sensor, the lid closure mechanism 3602 sends a current to the electromagnet 3616 and the electromagnet attracts the magnets which counteracts the biasing member 3610 and moves the first and second sealing arms 3640, 3642 and first and second seals 3608, 3624 to an open condition. Conversely, the electromagnet 3616 and spring can operate in the opposite configuration where the spring 3610 is a tension spring and the electromagnet 3616 repels the magnet 3614.

Figure 37:
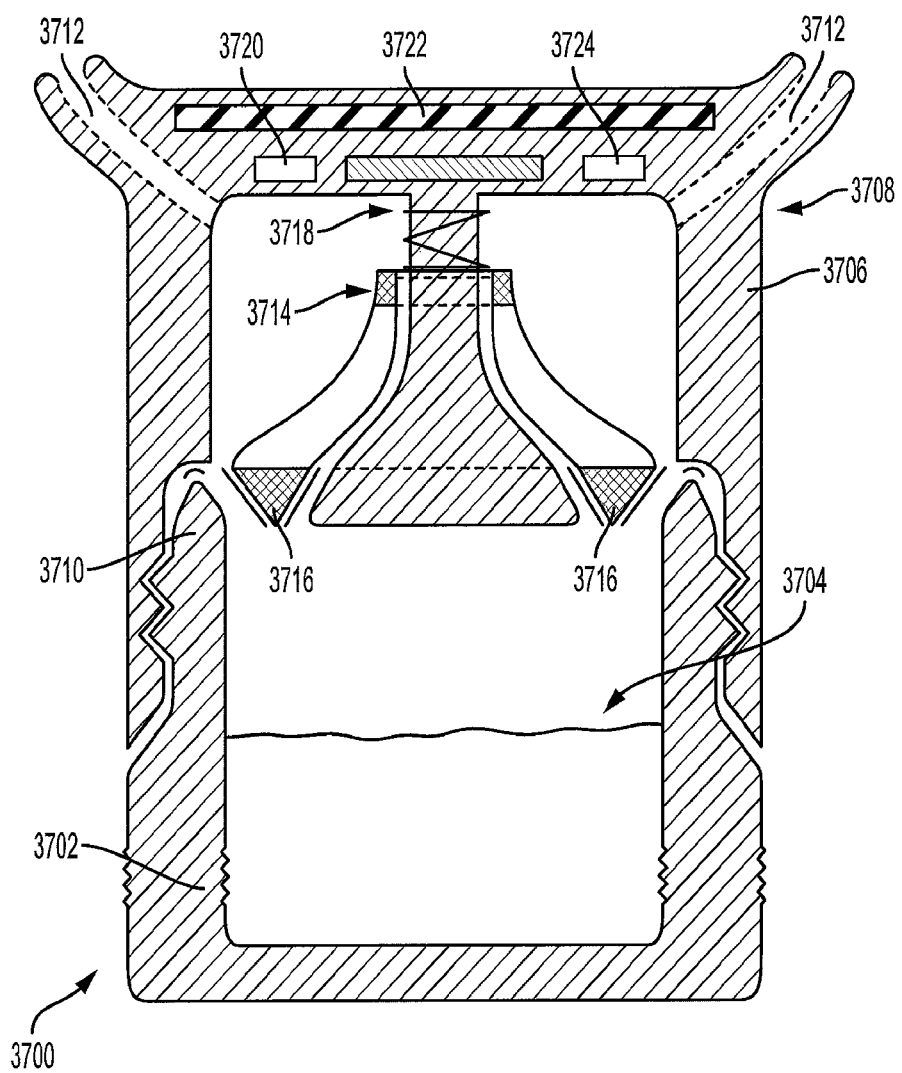
FIG. 37 illustrates a cross-sectional view of an alternative drink container and lid.

FIG. 37 discloses a container 3700 for storing liquid therein. The container 3700 comprises a body portion 3702 defining an internal cavity 3704 configured to store and retain a liquid therein, the body portion 3702 comprises a top portion 3706. A lid portion 3708 is configured to fit on the top portion 3710 of the body portion 3702. The lid portion 3708 defines an orifice 3712 which permits flow of the liquid in the body portion 3702 out of the container 3700. The lid portion further comprises a lid closure mechanism 3714. The lid closure mechanism comprises a seal 3716 to seal the orifice 3712, wherein the seal 3716 is movable between a closed position to block the flow of the liquid from the body portion 3702 out of the container 3700 and an open position to permit flow of the liquid from the body portion 3702 out of the container 3700. The container comprises a mechanical actuator 3718 to locate the seal 3716 between the closed position and the open position. The container 3700 also comprises a power source 3720 to actuate the mechanical actuator 3718. The container 3700 also comprises a at least one sensor 3722 to transmit a sensor signal to the lid closure mechanism 3714, wherein the sensor signal comprises information regarding a sensed condition of the container 3700. Upon receiving the first signal, the lid closure mechanism 3714 is configured to cause the mechanical actuator 3718 to actuate the seal 3716 between the closed position and the open position.

In one embodiment, the sensor 3722 may be a sensor to detect the angle of the container 3700. In another embodiment, the sensor 3722 may comprises a touch sensor to detect a user's contact with the sensor 3722. The at least one sensor 3722 may be located within the internal cavity of the container 3700 or other location(s) on the container 3700 as appropriate. The sensor 3722 may be a temperature sensor to detect the temperature of the contents of the internal cavity 3704. The mechanical actuator 3718 may comprise an electromagnet. The container 3700 may further comprise a processor 3724 to control the lid closure mechanism 3714. The processor 3724 may be configured to operate the lid closure mechanism 3714. The sensor 3722 may transmit a sensor signal to the processor 3724, wherein the sensor signal comprises information regarding a sensed condition of the container 3700. The processor 3724 is configured to operate the lid closure mechanism 3714 upon receiving the first signal to cause the mechanical actuator 3718 to actuate the seal 3716 between the closed position and the open position. The processor 3724 is configured to operate the lid closure mechanism 3714 from the closed position to the open position upon receiving the first signal from the sensor 3722. The container 3700 may further comprise an override, wherein the override causes the processor 3724 to forego operation of the lid closure mechanism 3714 upon receiving the first signal. The container 3700 may also comprise a display. In one embodiment, the sensor 3722 comprises a temperature sensor, and when the processor 3724 receives the sensed signal from the temperature sensor, the processor 3724 determines a temperature corresponding to the sensed signal and causes the temperature to be displayed on the display. The information regarding the sensed condition of the container 3700 may comprise angular information regarding an angular position of the container 3700 in relation to a level position. The seal 3716 may comprise a deformable material. The sensor 3722 may be positioned to be in thermal communication with an internal cavity 3704 of the container 3700 when the lid portion 3708 is positioned on the container 3700. The sensor 3722 may comprise a capacitance sensor. The mechanical actuator 3718 may comprises a magnet and a spring. The sensor may also comprise a plurality of sensors. The plurality of sensors may comprise a second sensor. The processor 3724 upon receiving the first signal causes the mechanical actuator 3718 to actuate the seal 3716 from the closed position to the open position, and wherein the processor 3724 upon no longer receiving the first signal causes the mechanical actuator 3718 to actuate the seal 3716 from the open position to the closed position.

Figure 38:
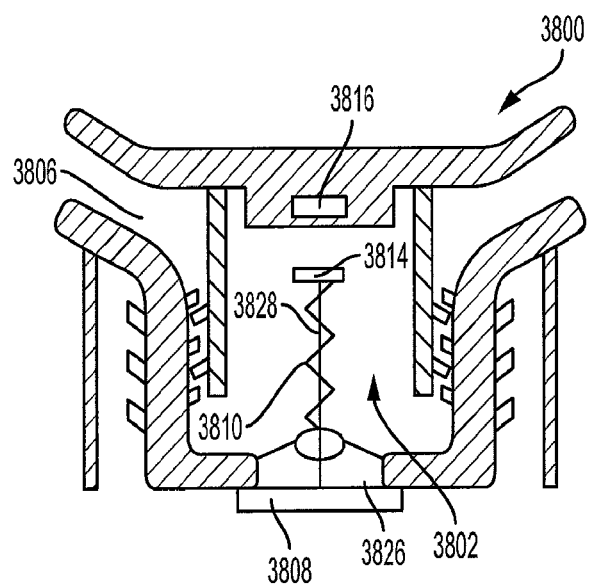
FIG. 38 illustrates a cross-sectional view of a variable opening and seal of a drink container.

FIG. 38 illustrates a lid 3800 that includes a lid closure mechanism 3802. In the present embodiment, the lid closure mechanism 3802 facilitates the opening and closure of the opening 3806. The opening 3806 can have a variable size, which can be controlled based upon a predetermined or user selected condition. For example, the opening 3806 may have a variable size opening based upon the temperature of the liquid, the amount of liquid within the container, the viscosity of the liquid, or other physical property of the liquid within the container. These conditions can be determined from the various sensors that are a part of the lid 3800 or container. The opening 3806 can have a variable opening diameter, width, or height which can restrict the flow out of the container. The biasing member 3810, magnet 3814, and the seal 3808 can be connected through the rod 3828. The biasing member 3810 or spring can position the seal 3808 in place to seal the opening 3826. When a condition is met, the lid closure mechanism 3802 can power the electromagnet to repel the magnet 3814 and cause the seal 3808 to move away from the opening 3826. In an alternative embodiment, the biasing member may bias the seal 3808 away from the opening 3826. When the electromagnet 3816 is activated, the electromagnet 3816 can attract the magnet 3814 and cause the seal 3808 to move in a sealing relationship with the opening 3826.

FIG. 38 illustrates a lid 3800 that includes a lid closure mechanism 3802. In the present embodiment, the lid closure mechanism 3802 facilitates the opening and closure of the opening 3806. The opening 3806 can have a variable size, which can be controlled based upon a predetermined or user selected condition. For example, the opening 3806 may have a variable size opening based upon the temperature of the liquid, the amount of liquid within the container, the viscosity of the liquid, or other physical property of the liquid within the container. These conditions can be determined from the various sensors that are a part of the lid 3800 or container. The opening 3806 can have a variable opening diameter, width, or height which can restrict the flow out of the container. The biasing member 3810, magnet 3814, and the seal 3808 can be connected through the rod 3828. The biasing member 3810 or spring can position the seal 3808 in place to seal the opening 3826. When a condition is met, the lid closure mechanism 3802 can power the electromagnet to repel the magnet 3814 and cause the seal 3808 to move away from the opening 3826. In an alternative embodiment, the biasing member may bias the seal 3808 away from the opening 3826. When the electromagnet 3816 is activated, the electromagnet 3816 can attract the magnet 3814 and cause the seal 3808 to move in a sealing relationship with the opening 3826.

Figure 39:
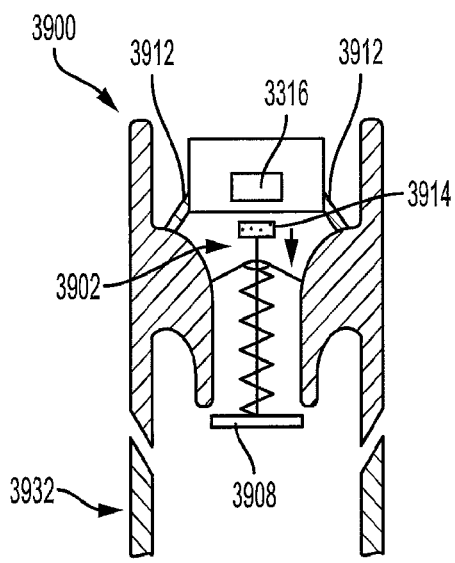
FIG. 39 illustrates a side view of a vertical opening and seal of a drink container.
Figure 40:
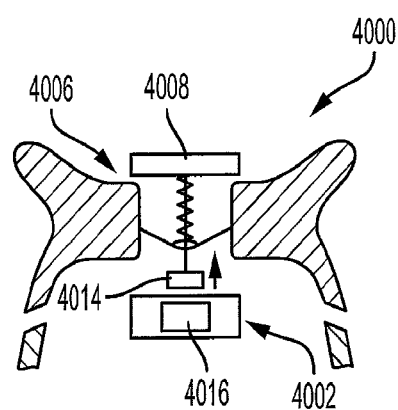
FIG. 40 illustrates a side view of a horizontal opening and seal of a drink container of FIG. 39.
Figure 41:
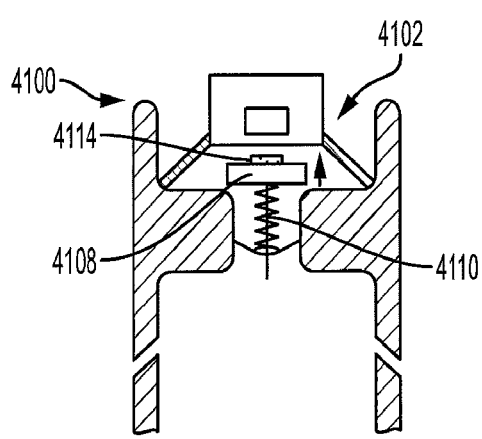
FIG. 41 illustrates a side view of a horizontal opening and seal of a drink container of FIG. 39.
Figure 42:
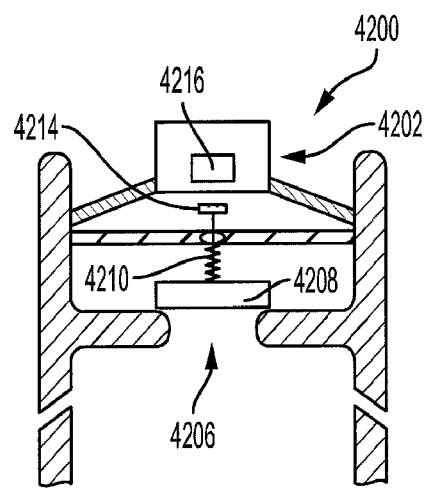
FIG. 42 illustrates a side view of a horizontal opening and seal of a drink container of FIG. 39.

FIGS. 39-42 depict various configurations of lids including lid closure mechanisms. FIG. 39 illustrates a lid 3900 having a lid closure mechanism 3902. In this embodiment, when the electromagnet is powered, the magnet 3914 is repelled and the seal 3908 is moved from a sealed position to an open position. FIG. 39 depicts a container 3932 matingly connected with the lid 3900. The support structures 3912 support the electromagnet 3316 and the liquid can flow around the supports. FIG. 40 depicts a lid 4000 having a lid closure mechanism 4002. In this embodiment, the electromagnet 4016 operates to repel the magnet 4014 and move the seal 4008 away from the opening 4006. FIG. 41 depicts a lid 4100 having a lid closure mechanism 4102. In the present embodiment, the electromagnet attracts the magnet 4114 to move the seal from the sealed position to the open position. The spring 4110 acts a tension spring to cause the seal 4108 to be held in the closed position. FIG. 42 depicts a lid 4200 having a closure mechanism 4202. The electromagnet 4216 of the lid closure mechanism 4202 attracts the magnet 4214 to move the seal 4208 away from the opening 4206. The spring 4210 acts as a compression spring to hold the seal 4208 in the sealed condition when the electromagnet 4216 is not activated.

In FIGS. 39-42, the various depictions of lid closure mechanisms may also have the electromagnets and the magnets inverted or their locations swapped. In the alternative, the electromagnets and the springs can be given different responsibilities. For example, the electromagnet and the magnet may act as the primary force to keep the seal in a closed or sealed position. When the electromagnet is deactivated, or the polarity of the electromagnet is switched, the repulsion force can attract the magnet and the attraction force would then repel the magnet. In addition, the spring may operate to move the seal from the sealed position to the open position.

In addition, or alternatively, the electromagnet may be replaced by other actuation means. For example, an electric actuator, a temperature gradient driven actuator, a hydraulic actuator, an electric motor, a physical user interaction, or other means may help assist or replace the electromagnet. In addition, or alternatively, the lid closure mechanisms described through the specification, may have a manual override where the lid closure mechanisms can be opened by the user manually. In addition, or alternatively, the lid closure mechanism can include a lockout feature that can prevent the user from unlocking the lid closure mechanism.

Figure 53:
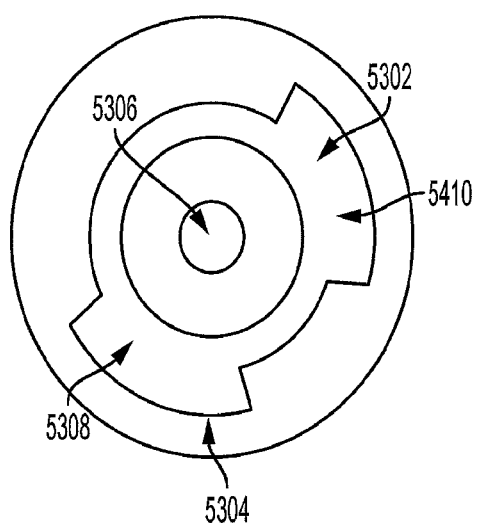
FIG. 53 illustrates a top plan view of a magnet.
Figure 54:
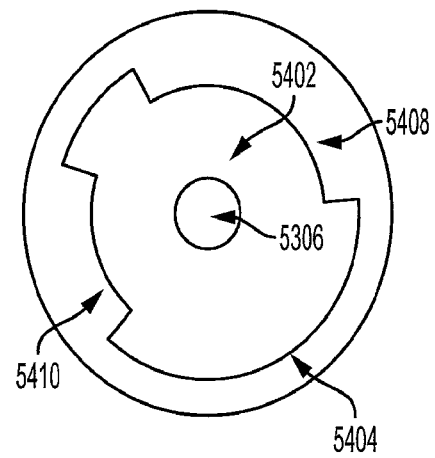
FIG. 54 illustrates a top plan view of an alternative magnet.

FIGS. 53 and 54 illustrate magnets 5302 and 5402, respectively. Theses magnets, 5302 and 5402 may be designed to provide specific magnet fields, 5304 and 5404. These magnets, 5302 and 5402 can be design to have specific magnet fields 5304, 5404. In one embodiment, the magnet fields 5304 and 5404 can be complementary to one another, such that when the magnets 5302 and 5402 are placed on a rod through holes 5306 and 5406, the magnets will rotate until their magnet fields line up. For example, the magnetic field portion 5308 of magnet 5302 will rotate to correspond with magnetic field portion 5408 of magnet 5402. In addition, the magnetic field portion 5310 of magnet 5302 will rotate to correspond with magnetic field portion 5410 of magnet 5402. When these corresponding magnet filed portions align, the magnets 5302 and 5404 will attract and close. The magnets 5302 and 5402 can be permanent magnets or electromagnets. The magnets 5302 and 5403 can be used in the lid to container seal, the lid closure mechanism or for changing the sizing of the opening for a user to drink out of. When the magnets 5302 and 5402 are twisted, they can locked together when their magnetic fields 5304 and 5404 line up and cause their corresponding portions to lock and act as a latch. The magnets 5302 and 5404 may be referred to a precision magnet pair.

Using two precision tailored magnets, such as a spring/latch, the magnets can lock at a specific angle relative to each other. There are other precision tailored magnets that work as a spring until they get close enough then they attract each other instead. These functionalities of the magnets can be used to close the inner seal or to close a lid to a drink container.

Figure 52:
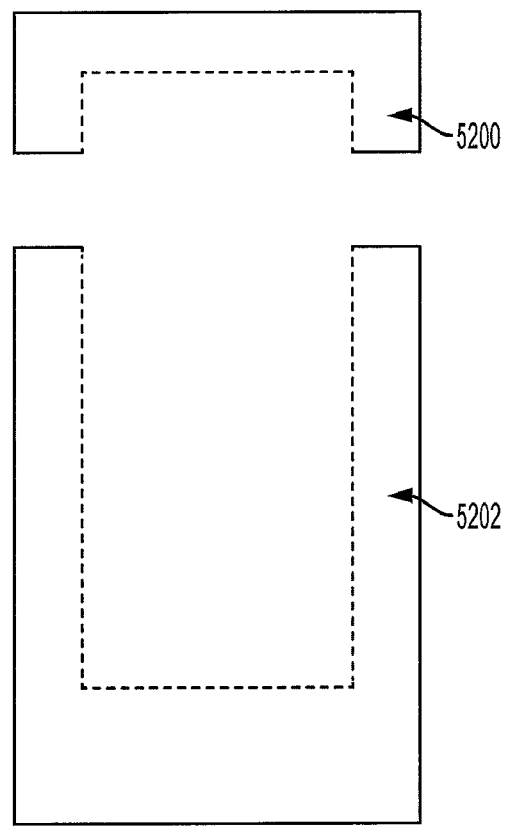
FIG. 52 illustrates a side view of a drink container and lid.

FIG. 52 illustrates a lid 5200 and container 5202. The lid and container assembly can be attached through various mechanisms, such as a threaded connection, a snap fit connection, or with a precision magnet pair, as described in FIGS. 53 and 54 above. The internal opening, the lid connection and the lid closure mechanism (also known as a valve) can be controlled using spring/latch magnets such as the ones discussed in FIGS. 53 and 54. These precision magnet pairs can function as a spring when the pattern of the magnet fields do not match and when one or both of the magnets are rotated to align their magnetic fields, the magnet pair closes and they attract one another. The rotation of the magnets and the lids can be done by a servo, or a magnet to push and pull a rotational arm connected one of the magnets. The precision magnet pair may be fixably attached the corresponding lid or container portion or may connected to their corresponding container/lid through a rotational or pivotable connection which allows the container and lid to remain stationary (rotationally speaking) while the precision magnets are rotated to lock or latch the lid.

Figure 43:
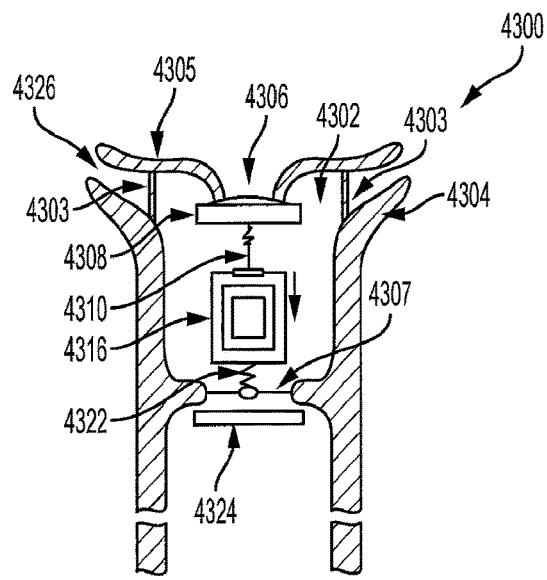
FIG. 43 illustrates a side view of an alternative vertical opening and seal of a drink container.

FIG. 43 depicts an embodiment of a lid 4300 configured for use with a container such as those disclosed herein. The lid 4300 comprises a body portion 4304 defining a drink opening 4326 for drinking from the container, an exposed, refill opening 4306 for refilling the container, and an inner, two-way opening 4307 for drinking from the container and refilling the container. The drink opening 4326 is defined by an upper portion 4305 of the body portion 4304 which is supported by the supports 4304. The supports 4303 allow liquid to pass there through. The lid 4300 further comprises a closure, or sealing, mechanism 4302 configured to seal and unseal the refill opening 4306 and seal and unseal the inner two-way opening 4307 depending on the state of lid 4300. The closure mechanism 4302 comprises an electromagnet assembly 4316, an upper seal 4308 for sealing the refill opening 4306 and coupled to the electromagnet assembly via a connection member 4310 such as a spring, or rod, and a lower seal 4324 for sealing the two-way opening 4307 and coupled to the electromagnet assembly 4316 via a connection member 4322 such as a spring, or rod.

Each seal 4308, 4324 comprises a neutral position when the lid 4300 is in a neutral state. The neutral position of the seal 4308 seals the refill opening 4306 and the neutral position of the seal 4324 seals the two-way opening 4307 to prevent liquid and/or the liquid's energy, from exiting the container to which the lid 4300 is attached. This can prevent inadvertent spilling of the liquid inside the container. To fill the container employing the lid 4300, the seal 4308 may be manually, or automatically, opened. For example, a user may press down on the seal 4308 to separate the seal 4308 from the upper portion 4305. When pressing on the seal 4308, a sensor disposed on or near 4308 such as a pressure sensor, for example, can sense that the seal 4308 is being pushed toward an unsealed configuration and send a signal to an onboard processor to power the electromagnet assembly 4316. When powered, the electromagnet assembly 4316 will pull the seal 4308 into the desired unsealed configuration. Simultaneously, the physical displacement of the seal 4308 can cause vertical displacement of the electromagnet assembly 4316 and, as a result, cause vertical displacement of the two-way seal 4324 to place the two-way seal into an unsealed configuration. Another option is to repel the two way seal 4324 with the powered electromagnet assembly 4316 to unseal the opening 4307. Both openings 4306, 4307 are then open allowing for the container to be refilled.

In addition to, or in lieu of, a pressure sensor, a temperature sensor may be employed on the seal 4306, for example. The temperature sensor can detect if liquid is in contact with the seal 4306 which could indicate that a user is attempting to refill the container. Once detected, power can be delivered to the electromagnet assembly 4316 as discussed above to unseal both openings 4306, 4307. A proximity sensor may also be employed on the top of the electromagnet assembly 4316. When the seal 4308 is pressed and assumes a position to trigger the proximity sensor, the proximity sensor can trigger power delivery to the electromagnet. To re-seal the opening 4306, any one of the sensors can detect a reseal condition such as a temperature change indicating the seal 4308 no longer has liquid on it, a pressure change indicating a second press to reseal, and/or a displacement change indicating the seal 4308 is even closer to the proximity sensor on the top of the electromagnet assembly indicating a second press to reseal. Any of these signals may de-power the electromagnet assembly 4316 to reseal the openings 4307, 4308. The two-way seal 4324 may be resealed via upward displacement of the electromagnet assembly 4316 and/or via spring bias to pull the seal 4324 upward to reseal the opening 4307.

Figure 44:
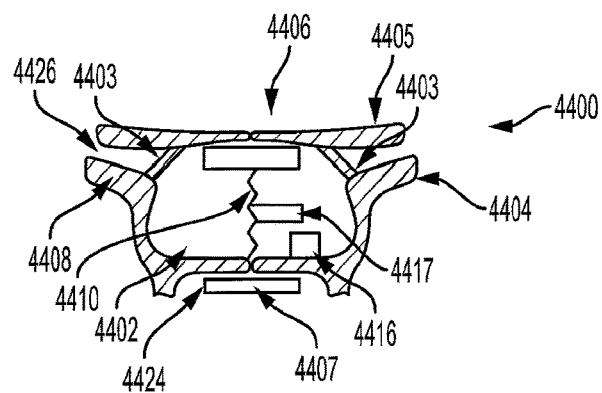
FIG. 44 illustrates a side view of an alternative horizontal opening and seal of a drink container of FIG. 43.

FIG. 44 depicts another embodiment of a lid 4400. The lid 4400 may be similar to the lid 4300 in many respects. The lid 4400 comprises a body portion 4404 defining a drink opening 4426 for drinking from the container, an exposed, refill opening 4406 for refilling the container, and an inner, two-way opening 4407 for drinking from the container and refilling the container. The drink opening 4326 is defined by an upper portion 4405 of the body portion 4404 which is supported by the supports 4404. The supports 4403 allow liquid to pass there through. The lid 4400 further comprises a closure, or sealing, mechanism 4402 configured to seal and unseal the refill opening 4406 and seal and unseal the inner two-way opening 4407 depending on the state of lid 4400. The closure mechanism 4302 comprises an electromagnet assembly 4416 positioned on the side of the mechanism 4416, an upper seal 4408 for sealing the refill opening 4306 and coupled to the electromagnet assembly via a connection member 4410 such as a spring, or rod, and a lower seal 4424 for sealing the two-way opening 4407 and coupled to the connection member 4410. The mechanism 4402 further comprises a trigger portion 4417 attached to the connection member 4410. The trigger portion 4417 is configured to interact with the electromagnet assembly 4416 to seal and unseal the openings 4406, 4408. The lid 4400 can utilize similar sensor configurations to the ones discussed above. The electromagnet assembly 4416 and seals 4408, 4424 can function similarly as the electromagnet assembly 4416 and seals 4308, 4324 discussed above.

Figure 45:
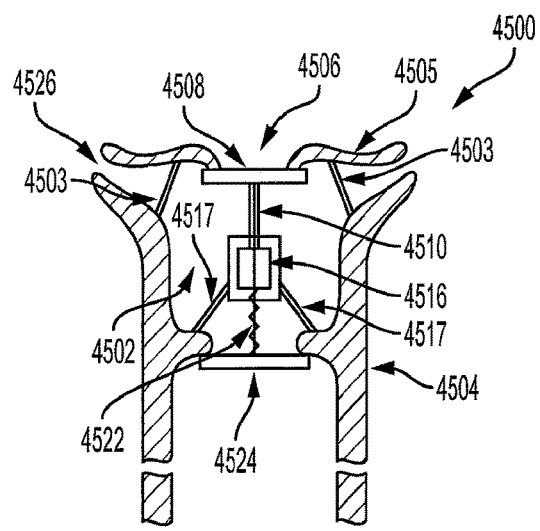
FIG. 45 illustrates a side view of an alternative horizontal opening and seal of a drink container of FIG. 43.

FIG. 45 depicts another embodiment of a lid 4500. In this embodiment, the lid 4500 is anchored to the body portion 4504 via connection, or support, members 4517. The support members 4517 can permit liquid to pass there through. The lid 4500 may be similar to the lids 4300, 4400 in many respects. The lid 4500 comprises a body portion 4504 defining a drink opening 4526 for drinking from the container, an exposed, refill opening 4506 for refilling the container, and an inner, two-way opening 4507 for drinking from the container and refilling the container. The drink opening 4526 is defined by an upper portion 4505 of the body portion 4504 which is supported by the supports 4504. The supports 4503 allow liquid to pass there through. The lid 4500 further comprises a closure, or sealing, mechanism 4502 configured to seal and unseal the refill opening 4506 and seal and unseal the inner two-way opening 4507 depending on the state of lid 4500. The closure mechanism 4502 comprises an electromagnet assembly 4516, an upper seal 4508 for sealing the refill opening 4506 and coupled to the electromagnet assembly via a connection member 4510 such as a rod, and a lower seal 4524 for sealing the two-way opening 4507 and coupled to the electromagnet assembly 4516 via the connection member 4510. The mechanism 4502 may further comprise a spring between the electromagnet assembly 4516 and the seal 4524. The seals 4508, 4524 and the electromagnet assembly 4516 can share a common rod, or spring, extending through the electromagnet assembly 4516. In this instance, only a portion of rod 4510 can be configured for engagement with the electromagnet assembly. The lid 4500 can utilize similar sensor configurations to the ones discussed above. The electromagnet assembly 4516 and seals 4508, 4524 can function similarly as the electromagnet assembly 4316 and seals 4308, 4324 discussed above.

Figure 46:
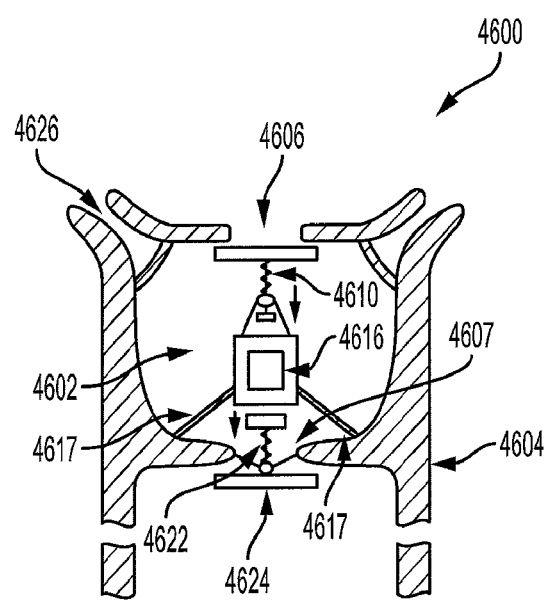
FIG. 46 illustrates a side view of an alternative vertical opening and seal of a drink container.

FIG. 46 depicts another embodiment of a lid 4600. In this embodiment, the lid 4600 is anchored to the body portion 4604 via connection, or support, members 4617. The support members 4617 can permit liquid to pass there through. The lid 4600 may be similar to the lids 4300, 4400, 4500 in many respects. The lid 4600 comprises a body portion 4504 defining a drink opening 4626 for drinking from the container, an exposed, refill opening 4606 for refilling the container, and an inner, two-way opening 4607 for drinking from the container and refilling the container. The drink opening 4626 is defined by an upper portion 4605 of the body portion 4504 which is supported by the supports 4604. The supports 4603 allow liquid to pass there through. The lid 4600 further comprises a suspended, or independent, closure, or sealing, mechanism 4602 configured to seal and unseal the refill opening 4606 and seal and unseal the inner two-way opening 4607 depending on the state of lid 4600.

The closure mechanism 4602 comprises an electromagnet assembly 4616, an upper seal 4608 for sealing the refill opening 4606 and coupled to the electromagnet assembly via a suspension mechanism 4610, and a lower seal 4624 for sealing the two-way opening 4607 and coupled to the electromagnet assembly 4616 via another suspension mechanism 4622. The suspension mechanisms can allow for attraction and repulsion of the seals 4608, 4624 in a similar fashion to those discussed above with respect to the lids 4300, 4400, 4500. The lid 4600 can utilize similar sensor configurations to the ones discussed above. The electromagnet assembly 4616 and seals 4608, 4624 can function similarly as the electromagnet assembly 4316 and seals 4308, 4324 discussed above.

Figure 47:
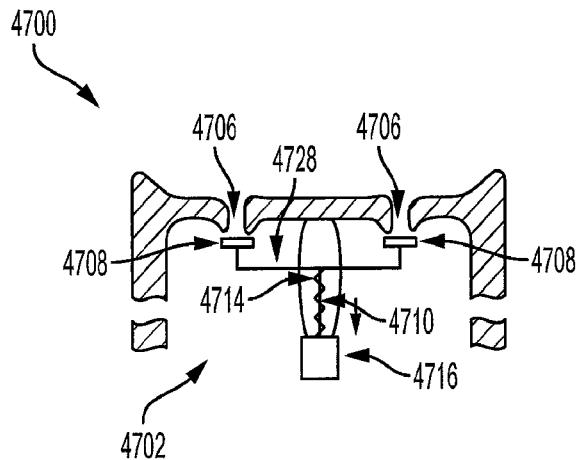
FIG. 47 illustrates a side view of an alternative vertical opening and seal of a drink container.
Figure 48:
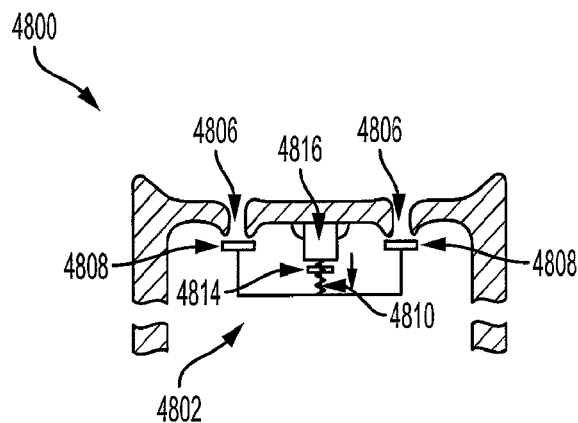
FIG. 48 illustrates a side view of an alternative horizontal opening and seal of a drink container of FIG. 47.
Figure 49:
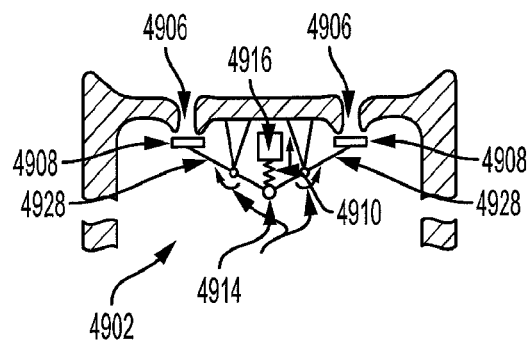
FIG. 49 illustrates a side view of an alternative horizontal opening and seal of a drink container of FIG. 47.

FIGS. 47-49 depict various embodiments of lids having lid closure mechanisms. These embodiments may operate similar to the embodiments discussed above in greater detail. FIG. 47 depicts a lid 4700 having a lid closure mechanism 4702. The openings 4706 can be arranged in various shapes. For example, the openings 4706 can be arranged in the top of the lid in a triangle pattern, a square pattern, a pentagon pattern, a hexagon pattern and a star pattern. The lid closure mechanism 4702 can include a rod 4728, a magnet 4714, and an electromagnet 4716, a spring 4710 and seals 4708. When the seals 4708 are in the closed configuration, the spring 4710 pushes the seals 4708 in sealing relationship with the openings 4706. When the electromagnet 4716 is activated, the electromagnet 4716 attracts the magnet 4714 and moves the seals 4708 from the closed condition to the open condition. FIG. 48 illustrates an alternative embodiment of a lid 4800 and a lid closure mechanism 4802. The lid closure mechanism 4802 can include a rod 4838, a magnet 4814, and an electromagnet 4816, a spring 4810 and seals 4808. When the seals 4808 are in the closed configuration, tension in the spring 4810 pulls the seals 4808 in sealing relationship with the openings 4806. When the electromagnet 4816 is activated, the electromagnet 4816 repels the magnet 4814 and moves the seals 4808 from the closed condition to the open condition. FIG. 49 illustrates an alternative embodiment of a lid 4900 and lid closure mechanism 4902. The lid closure mechanism 4902 can include an electromagnet 4916, rods 4928, spring 4910, magnet 4914 and 4708s 4708. The seals 4908 can be configured to seal the openings 4906. The springs 4910 can be rotational springs that can hold the seals 4908 in the closed configuration. When the electromagnet 4916 is activated, the electromagnet 4916 can interact with the magnet 4914 and cause the rods 4928 and seals 4908 to rotate to an open condition to permit fluid from pouring out of the lid 4900.

Figure 50:
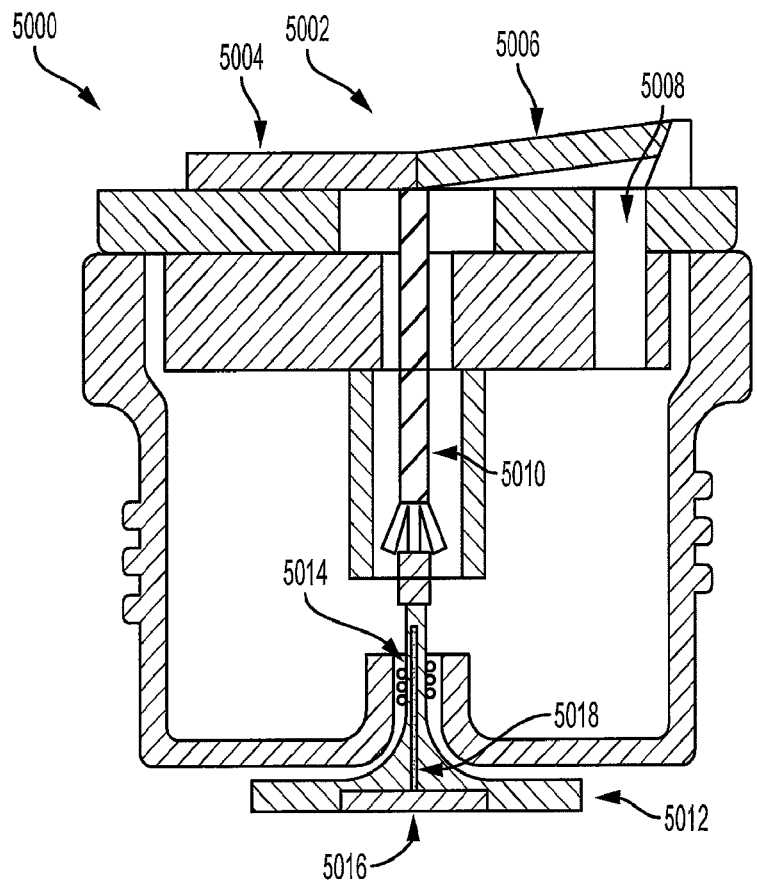
FIG. 50 illustrates a cross-sectional view of an alternative lid.
Figure 51:
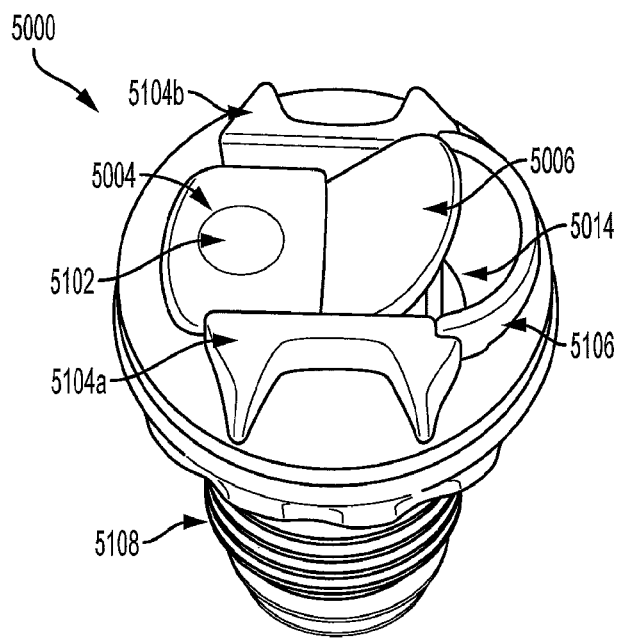
FIG. 51 illustrates a top perspective view of an alternative lid.

FIGS. 50 and 51 disclose an embodiment of a lid 5000. More specifically, FIG. 50 displays a cross-sectional view of lid 5000, while FIG. 51 displays a top perspective view of lid 5000. The lid can attach to a container or other vessel. The lid may be attached to a container through various means, for example, a friction lock, a threaded connection, or a magnetic connection, just to name a few. As can be seen in FIG. 51, the lid 5000 may comprise a series of ribs 5108 that engage with corresponding ribs on a container to attach the two pieces together. The lid 5000 can include an activation assembly 5002 configured to facilitate movement of fluid contained in an attached container out of the opening 5008 in the top of the lid 5000. The activation assembly 5002 can include two tabs 5004, 5006 configured to buckle at a midpoint pivot hinge. Upon application of downward pressure by a user on a first tab 5004, the second tab 5006 can tilt or pivot up to expose an opening 5008 on the top of the lid 5000. In addition to the two tabs 5004, 5006, the activation assembly 5002 can also include a rod 5010 attached to the tabs at the midpoint pivot hinge. On the other end of the rod 5010, a seal 5012 can be attached to help keep the liquid from the attached container out of the lid 5000 when not in use. The seal 5012 prevents leakage of fluid from the lid 5000 and the attached container by maintaining close physical contact with an opening 5014 on the bottom of the lid 5000. Upon application of pressure onto the first tab 5004, the rod 5010 pushes downwards and releases the sealing relationship between the opening 5014 on the bottom of the lid 5000 and the seal 5012. When this seal is broken, fluid from the container can flow through the opening 5014 on the bottom of the lid 5000 into the hollow internal structure of the lid and out the opening 5008 on the top of the lid 5000. When the user wishes to stop the flow of fluid out of the lid 5000, the user will apply pressure down on the second tab 5006. When the second tab 5006 is pushed down, the first tab 5004 is also moved back to its original position, pulling the rod 5010 up and recreating the physical contact between the seal 5012 and the opening 5014 on the bottom of the lid 5000. The seal 5012 can include a sensor 5016. The sensor 5016 may be located on an exterior surface of the seal 5012 or can alternatively be partially or completely embedded with the seal 5012. If the sensor 5016 is located on an exterior surface of the seal 5012, all surfaces of the sensor 5016 will be in direct contact with the fluid in the container except for one surface. If the sensor 5016 is partially embedded within the seal 5012, only one exterior surface of the sensor 5016 will come into direct contact with the fluid in the container. If the sensor 5016 is entirely embedded within the seal 5012, no portion of the sensor 5016 will be in direct contact with the fluid in the container. The sensor 5016 may be located in the center of the seal 5012. The sensor 5016 may be a temperature sensor to monitor the temperature of the fluid contained within the container. Alternatively, the sensor 5016 may be a pressure sensor. With the information detected by the pressure sensor, the level of fluid remaining in the container can be calculated and monitored by an external device or the user. After sensing such information, the sensor 5012 can be configured to communicate the information to an external location, such as a control unit or the Internet through either wired or wireless connections, for user interpretation. The seal 5012 may also include an antenna 5018 to facilitate wireless communication. Additionally, the sensor 5012 could individually be capable of monitoring numerous conditions, such as sensing both temperature and pressure. Various power sources are envisioned for the sensor 5012 and may include various batteries, heat sinks, kinetic energy systems, and solar cells, just to name a few. Recharging of the battery may be completed through various means such as wired and wireless charging, for example inductive charging or through a USB cable. Turning to FIG. 51, the first tab 5004 of the lid 5000 may include an indentation 5102 to direct users where to apply downward pressure. Additionally, the lid 5009 may include a pair of guides 5104a, 5104b to ensure the tabs 5004, 5006 travel in the appropriate directions when pressure is applied. The lid may also contain a mouthpiece 5106 in order to facilitate the flow of the fluid out of the opening 5014 in the top of the lid 5000.

Figure 55:
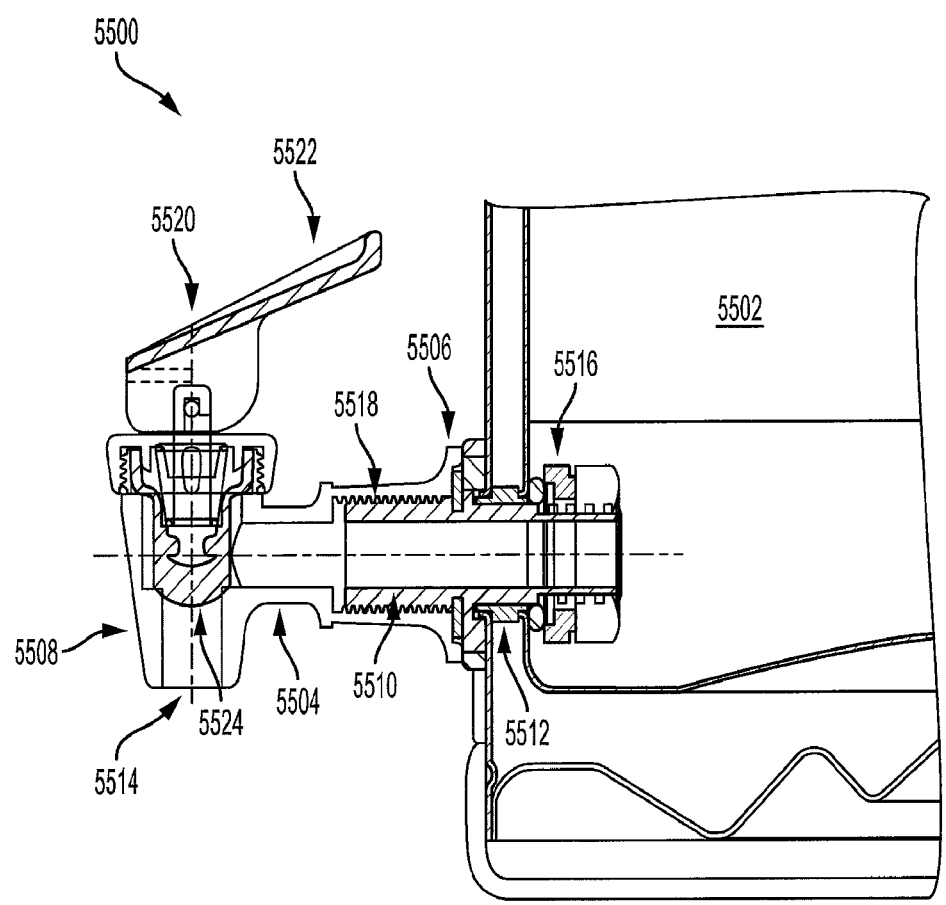
FIG. 55 illustrates a cross-sectional view of a container tap.

FIG. 55 discloses an embodiment of a fluid delivery system 5500. The fluid delivery system can include a main container 5502 containing a liquid. A hollow member 5504 configured to facilitate fluid delivery can be attached to a main container 5502 at a first end 5506. The hollow member 5504 can be connected to a main container 5502 through a connector 5510. The main container can contain an opening 5512 to be engaged by the connector 5510. Fluid flows out of the opening 5512 of the main container into the connector 5510 and hollow member 5504. Fluid exits the fluid delivery system 5500 out of the opening 5514 of the hollow member. The connector 5510 can comprise a connection means on a first end which may matingly corresponds to a connection means 5516 on the opening 5512 of the main container. The connector may be attached to a container through various means, for example, a friction lock, a threaded connection, or a magnetic connection just to name a few. The connector 5510 can comprise a threaded edge 5516 on a second end which may matingly correspond to a threaded edge on the first end 5506 of the hollow member 5504. The connector may be attached to the hollow member through various means, for example, a friction lock, a threaded connection, or a magnetic connection just to name a few. In alternative embodiments, the hollow member 5504 can be directly connected to a main container 5502 without the use of a connector. At a second end 5508 the hollow member can have an opening 5514 which may be used to permit a liquid held within the container to be poured into another vessel, container, or onto the ground. In the illustrated embodiment, the opening 5514 can be configured to release liquid when a user activates a valve assembly 5520 through use of a handle 5522. When the valve assembly 5520 is activated, a stopper 5524 can be moved so as to not inhibit the flow of fluid from the main container 5502 through the connector 5510 and the hollow member 5504. When fluid flow is no longer desired, the stopper 5524 can be moved back into a position where it blocks the fluid path from the main container into the connector and the hollow member. The valve assembly 5520 can alternatively be operated without manual operation by communication from an external device or server, or could operate in both fashions. Additionally, the valve assembly 5520 can be configured to open in stages to facilitate various flow rates of the fluid from the main container 5502.

Figure 56:
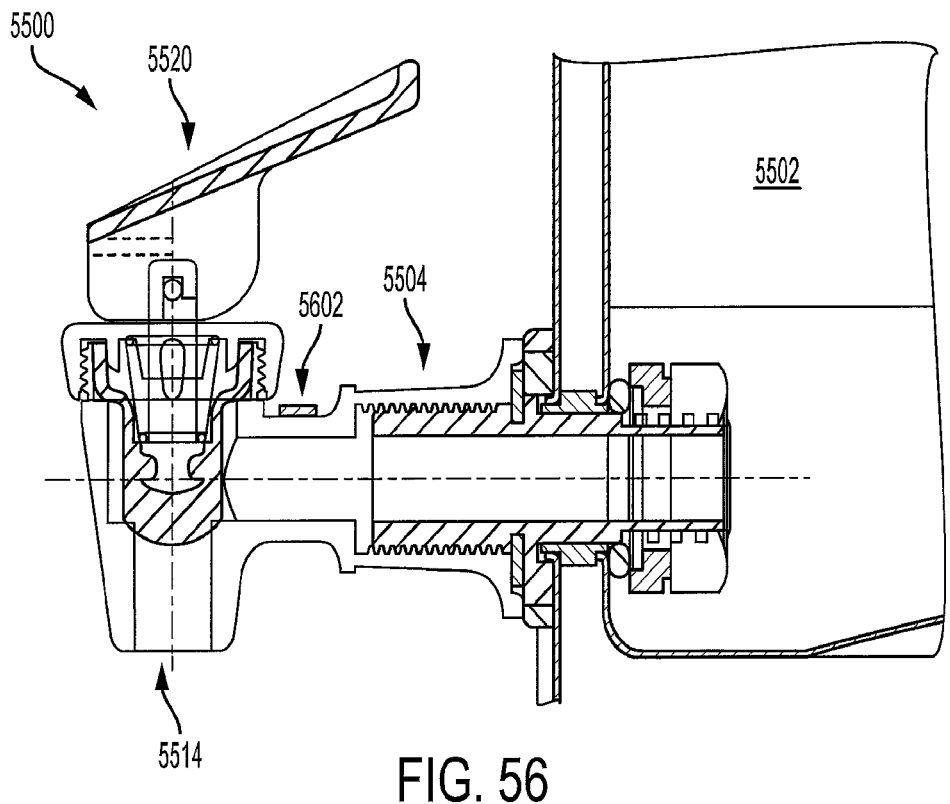
FIG. 56 illustrates a cross-sectional view of an alternative container tap.

FIG. 56 illustrates the fluid delivery system 5500 of FIG. 55 with the addition of a sensor 5602. The sensor 5602 may be located on an exterior surface of the hollow member 5504. Alternatively, the sensor 5602 may be located on an interior surface of the hollow member 5504. The sensor 5602 could also be entirely embedded within the wall of the hollow member 5504. When the sensor 5602 is located on an interior surface of the hollow member 5504, the sensor 5602 may be partially embedded within the interior wall of the hollow member 5504 so as to only have one external surface of the sensor 5602 contacting the fluid. Alternatively, the sensor 5602 may be affixed to the interior surface of the hollow member, allowing three sides of the sensor 5602 to be in contact with the flowing fluid. The sensor 5602 may be located close to the second end of the hollow member 5504. The sensor 5602 may be a temperature sensor to monitor the temperature of the room where the fluid delivery system 5500 is located, the fluid within the hollow member, or the sensor 5602 may monitor the temperature of the hollow member 5504 itself to determine the overall temperature of the fluid traveling through the hollow member. The close proximity that the sensor 5602 may have to the opening 5514 of the hollow member can allow a user to know the temperature of the fluid just prior to dispensing. Alternatively, the sensor 5602 may be located closer to the opening 5512 of the main container to gauge, for example, the temperature of the fluid in the main container 5502. In an alternative embodiment, the sensor 5602 may be a pressure sensor, configured to sense the pressure of the fluid flowing through the hollow member 5504. With the information detected by the pressure sensor, the level of fluid remaining in the main container can be calculated and monitored by an external device or the user. After sensing such information, the sensor 5602 can be configured to communicate the information to an external location, such as a control unit or the Internet through either wired or wireless connections, for user interpretation. The sensor 5602 could alternatively be configured to detect various factors such as humidity. Additionally, the sensor 5602 could individually be capable of monitoring numerous conditions, such as sensing both temperature and pressure. In one embodiment, the sensor 5602 could be a fingerprint sensor used to control which users are capable of opening or closing the valve assembly 5520. In an additional embodiment, the sensor 5602 could be configured to communicate with a corresponding sensor located on the vessel or container to which the fluid is being transferred. When a user brings the additional vessel or container close to the fluid delivery system 5500, the sensor 5602 on the hollow member 5504 could facilitate opening of the valve assembly 5520 to allow dispensing of the fluid. As the additional vessel or container is moved away from the fluid delivery system 5500, the sensor 5602 could trigger closing of the valve assembly 5520, concluding fluid flow to the outside environment. Various power sources are envisioned for the sensor 5602 and may include various batteries, heat sinks, kinetic energy systems, and solar cells, just to name a few. Recharging of the battery may be completed through various means such as wired and wireless charging, for example inductive charging or through a USB cable.

Figure 57:
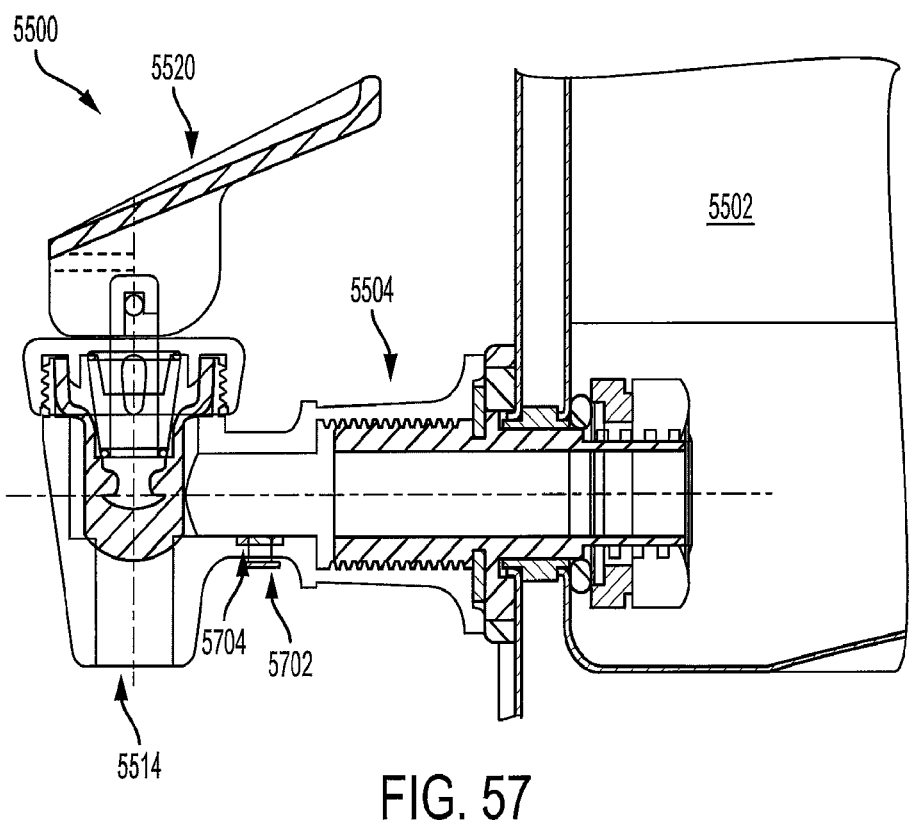
FIG. 57 illustrates a cross-sectional view of an alternative container tap.

As illustrated in FIG. 57, two sensors 5702, 5704 may be placed near the opening 5514 of the hollow member. A first sensor 5702 may be located on an exterior surface of the hollow member 5504 while a second sensor 5704 may be located on an interior surface of the hollow member 5504. Alternatively, both sensors 5702, 5704 could be located on an exterior surface of the hollow member 5504, or both sensors 5702, 5704 may be located on an interior surface of the hollow member 5504. When the sensor 5704 is located on an interior surface of the hollow member, the sensor 5704 may be partially embedded within the interior wall of the hollow member so as to only have one external surface of the sensor 5704 contacting the fluid. The sensor 5704 could also be entirely embedded within the wall of the hollow member. Alternatively, the sensor may be affixed to the interior surface of the hollow member, allowing all but one surface of the sensor to be in direct contact with the flowing fluid. The sensors 5702, 5704 may both be the same type of sensor, or a first sensor 5702 could detect a different condition than the condition detected by a second sensor 5704. The sensors 5702, 5704 may both be temperature sensors to monitor the temperature of the room where the fluid delivery system 5500 is located, the fluid within the hollow member, or the sensors 5702, 5704 may monitor the temperature of the hollow member 5504 itself to determine the overall temperature of the fluid traveling through the hollow member. Alternatively, a first sensor 5702 may detect the temperature of the room in which the fluid delivery system is located, and a second sensor 5704 may detect the temperature of the fluid within the hollow member 5504 or main container 5502. Upon detection of these two different temperatures, the sensors 5702, 5704 can communicate this information to an external server which can inform the user of an expected time until the liquid cools down or heats up to a desired temperature. The close proximity that one or both of the sensors 5702, 5704 may have to the opening 5514 of the hollow member 5504 can allow a user to know the temperature of the fluid just prior to dispensing. Alternatively, the sensors 5702, 5704 may be located closer to the opening 5512 of the main container 5502 to gauge, for example, the temperature of the fluid in the main container 5502. In an alternative embodiment, one or both of the sensors 5702, 5704 could be pressure sensors to detect the pressure within the hollow member 5504 as fluid from the main container 5502 flows through it. The detection of pressure can allow for an external device or the user to calculate the amount of fluid remaining in the main container 5502. Additionally, fluid volume could be monitored for dispensing specific serving sizes of liquid. After a certain amount of fluid is dispensed, as detected by the sensor, the valve assembly 5520 could be triggered to close, cutting off the supply of fluid to the outside environment. After sensing such information, the sensors 5702, 5704 can be configured to communicate the information to an external location, such as a control unit or the Internet through either wired or wireless connections, for user interpretation. The sensors 5702, 5704 could alternatively be configured to detect various factors such humidity. Additionally, the sensors 5702, 5704 could individually be capable of monitoring numerous conditions, such as sensing both temperature and pressure. In one embodiment, one or both of the sensors 5702, 5704 could be fingerprint sensors used to control which users are capable of opening or closing the valve assembly 5520. In an additional embodiment, one or both of the sensors 5702, 5704 could be configured to communicate with a corresponding sensor located on the vessel or container to which the fluid is being transferred. When a user brings the additional vessel or container close to the fluid delivery system 5500, one or both of the sensors 5702, 5704 could facilitate the opening of the valve assembly 5520 to allow dispensing of the fluid. As the additional vessel or container is moved away from the fluid delivery system 5500, the sensors 5702, 5704 could trigger closing of the valve assembly 5520, concluding fluid flow to the outside environment. Various power sources are envisioned for the sensors 5702, 5704 and may include various batteries, heat sinks, kinetic energy systems, and solar cells, just to name a few. Recharging of the battery may be completed through various means such as wired and wireless charging, for example inductive charging or through a USB cable.

Figure 58:
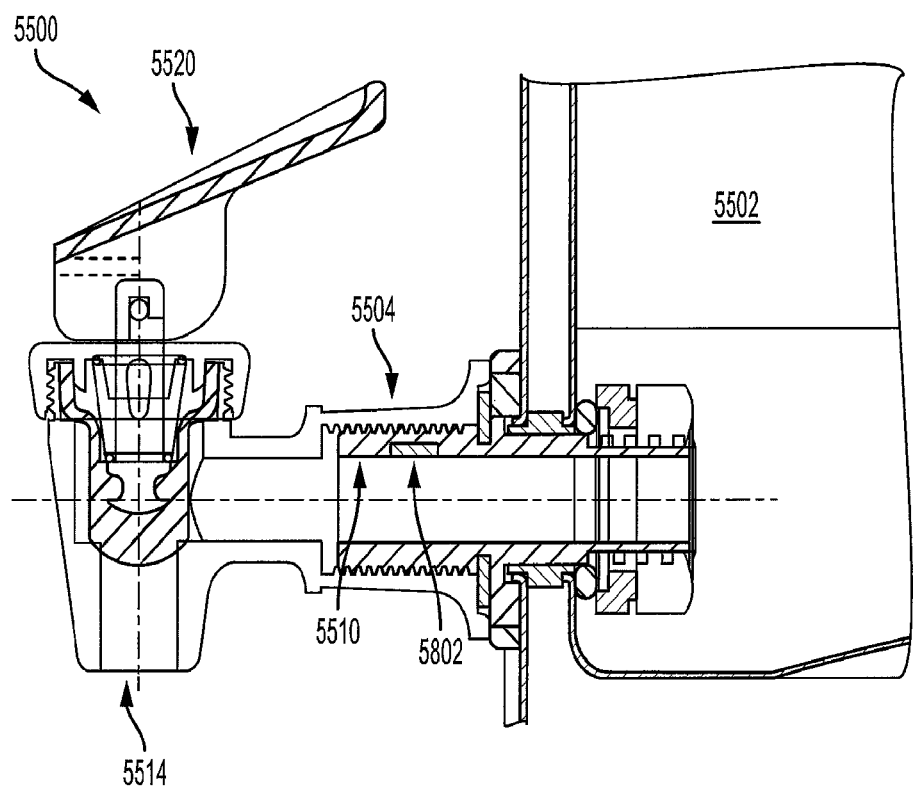
FIG. 58 illustrates a cross-sectional view of an alternative container tap.

FIG. 58 illustrates the possibility for a sensor 5802 to be located on the connector instead of the hollow member 5504. With the sensor 5802 located on the connector 5510, the sensor 5802 can have a close spatial relationship with the main container 5502. Alternatively, the sensor 5802 may be located on the connector 5510 in a position close to the opening 5514 of the hollow member. The sensor 5802 may be located on an interior surface of the connector 5510. When the sensor 5802 is located on an interior surface of the connector, the sensor may be embedded within the interior wall of the connector so as to only have one external surface of the sensor 5802 contacting the fluid. Alternatively, the sensor 5802 may be affixed to the interior surface of the connector, allowing maximum contact with the flowing fluid. The sensor 5802 may be a temperature sensor to monitor the temperature of the room where the fluid delivery system 5500 is located, the fluid within the connector, or the sensor 5802 may monitor the temperature of the connector 5510 itself to determine the overall temperature of the fluid traveling through the connector and the hollow member. The close proximity that the sensor 5802 may have to the opening 5514 of the hollow member can allow a user to know the temperature of the fluid just prior to dispensing. Alternatively, the sensor 5802 may be located closer to the opening 5512 of the main container to gauge, for example, the temperature of the fluid in the main container 5502. In an alternative embodiment, the sensor 5802 may be a pressure sensor, configured to sense the pressure of the fluid flowing through the connector. With the information detected by the pressure sensor, the level of fluid remaining in the main container 5502 can be calculated and monitored by an external device or the user. After sensing such information, the sensor 5802 can be configured to communicate the information to an external location, such as a control unit or the Internet through either wired or wireless connections, for user interpretation. The sensor 5802 could alternatively be configured to detect various factors such as humidity. Additionally, the sensor 5802 could individually be capable of monitoring numerous conditions, such as sensing both temperature and pressure. The sensor 5802 could be configured to communicate with a corresponding sensor located on a vessel or container to which the fluid is being transferred. When a user brings the additional vessel or container close to the fluid delivery system 5500, the sensor 5802 could facilitate the opening of the valve assembly 5520 to allow dispensing of the fluid. As the additional vessel or container is moved away from the fluid delivery system 5500, the sensor 5802 could trigger closing of the valve assembly 5520, concluding fluid flow to the outside environment. Various power sources are envisioned for the sensor 5802 and may include various batteries, heat sinks, kinetic energy systems, and solar cells, just to name a few. Recharging of the battery may be completed through various means such as wired and wireless charging, for example inductive charging or through a USB cable.

Figure 59:
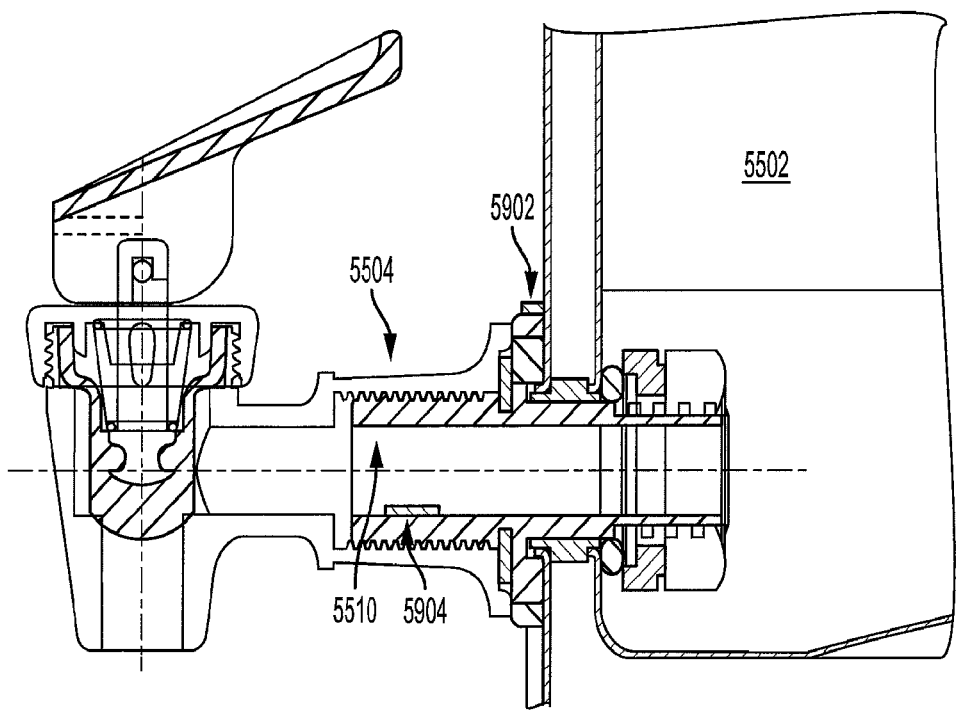
FIG. 59 illustrates a cross-sectional view of an alternative container tap.
Figure 60:
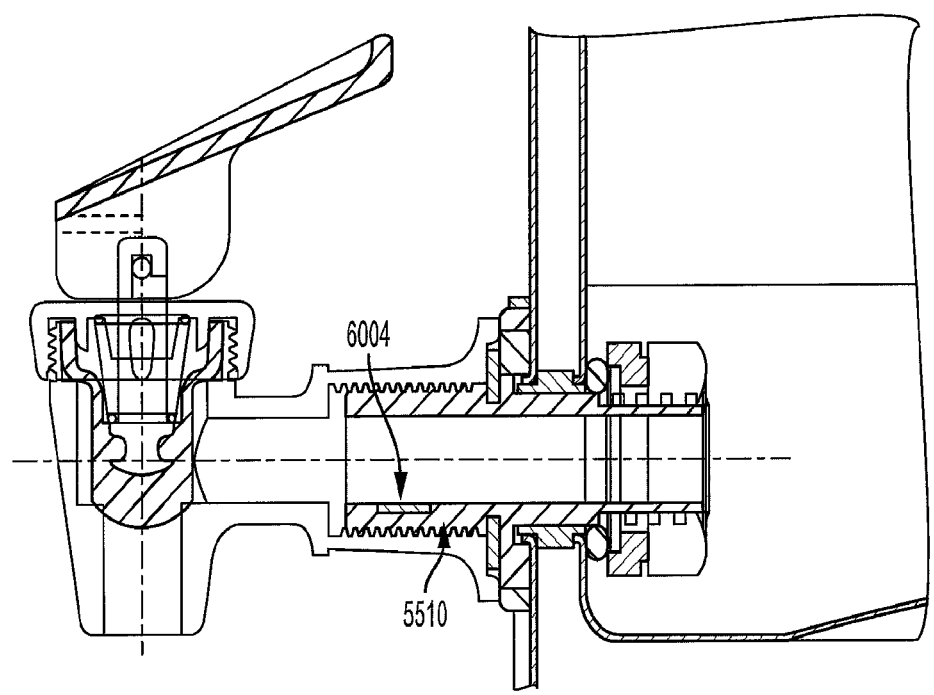
FIG. 60 illustrates a cross-sectional view of an alternative container tap.
Figure 61:
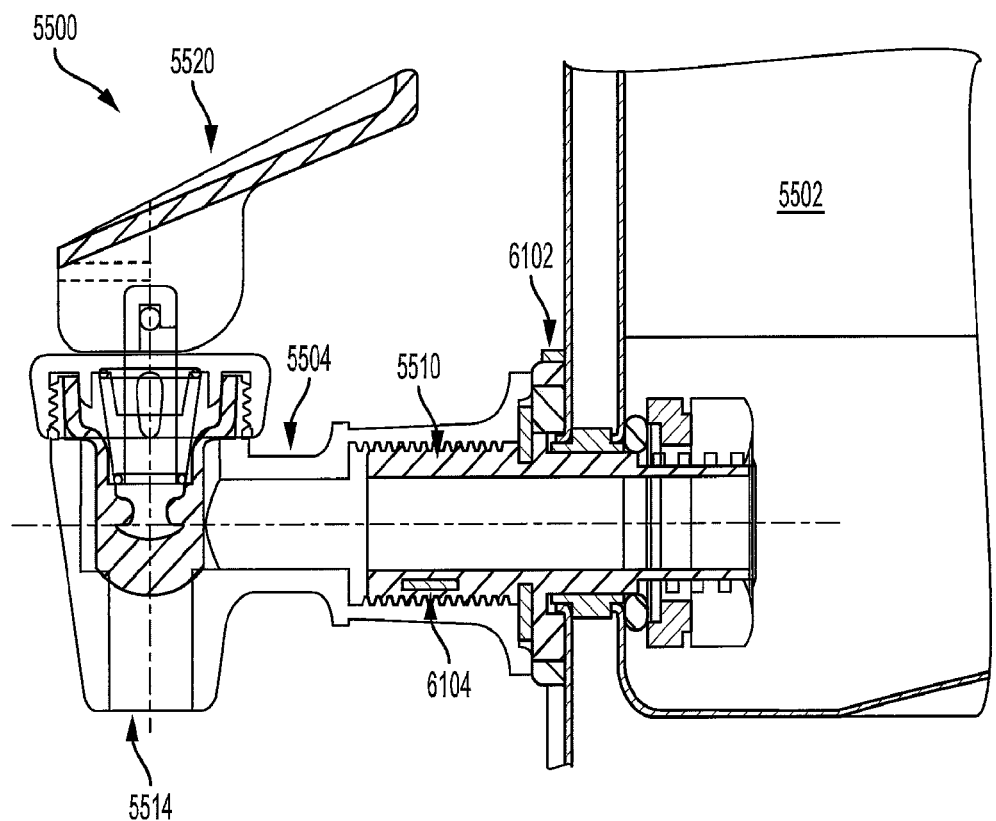
FIG. 61 illustrates a cross-sectional view of an alternative container tap.

Referring now to FIGS. 59-61, sensors can be located in various arrangements to more closely monitor and detect various conditions regarding the fluid held in the main container and the fluid flowing through the connector and hollow member. FIG. 59 discloses an arrangement of sensors 5902, 5904 on the fluid delivery system 5500 where a first sensor 5902 is in physical contact with both the connector 5510 and the main container 5502. Additionally, a second sensor 5904 can be affixed to an interior wall of the connector 5510, placing all but one surface of the second sensor 5904 in direct contact with the flowing fluid. Alternatively, as can be seen in FIG. 60, the second sensor 6004 can be partially embedded within the wall of the connector 5510 so that one surface remains directly in contact with the flowing fluid. An additional example of sensor placement is illustrated in FIG. 61, as the second sensor 6104 is entirely embedded within the wall of the connector 5510. The second sensor 6104 in this case has no direct contact with the flowing fluid in the connector 5510 and hollow member 5504. The sensors 6102, 6104 may both be the same type of sensor, or a first sensor 6102 could detect a different condition than the condition detected by a second sensor 6104. The sensors 6102, 6104 may both be temperature sensors to monitor the temperature of the room where the fluid delivery system 5500 is located, the fluid within the connector, or the sensors 6102, 6104 may monitor the temperature of the connector 5510 itself to determine the overall temperature of the fluid traveling through the connector. Alternatively, a first sensor 6102 may detect the temperature of the room in which the fluid delivery system 5500 is located, and a second sensor 6104 may detect the temperature of the fluid within the connector or main container. Upon detection of these two different temperatures, the sensors 6102, 6104 can communicate this information to an external server which can inform the user of an expected time until the liquid cools down or heats up to a desired temperature. The sensors 6102, 6104 may be located closer to the opening 5512 of the main container to gauge, for example, the temperature of the fluid in the main container 5502. In an alternative embodiment, one or both of the sensors 6102, 6104 could be pressure sensors to detect the pressure within the connector 5510 as fluid from the main container 5502 flows through it. The detection of pressure can allow for an external device or the user to calculate the amount of fluid remaining in the main container. Additionally, fluid volume could be monitored for dispensing specific serving sizes of liquid. After a certain amount of fluid is dispensed, as detected by the sensor, the valve assembly 5520 could be triggered to close, cutting off the supply of fluid to the outside environment. In addition, one or both of the sensors 6102, 6104 could detect the amount of fluid remaining in the main container 5502 to alert the user to refill or replace the main container. After sensing such information, the sensors 6102, 6104 can be configured to communicate the information to an external location, such as a control unit or the Internet through either wired or wireless connections, for user interpretation. The sensors 6102, 6104 could alternatively be configured to detect various factors such humidity. Additionally, the sensors 6102, 6104 could individually be capable of monitoring numerous conditions, such as sensing both temperature and pressure. In one embodiment, one or both of the sensors 6102, 6104 could be fingerprint sensors used to control which users are capable of opening or closing the valve assembly 5520. In an additional embodiment, one or both of the sensors 6102, 6104 could be configured to communicate with a corresponding sensor located on the vessel or container to which the fluid is being transferred. When a user brings the additional vessel or container close to the fluid delivery system 5500, one or both of the sensors 6102, 6104 on the hollow member 5504 could facilitate the opening of the valve assembly 5520 to allow dispensing of the fluid. As the additional vessel or container is moved away from the fluid delivery system 5500, the sensors 6102, 6104 could trigger closing of the valve assembly 5520, concluding fluid flow to the outside environment. Various power sources are envisioned for the sensors 6102, 6104 and may include various batteries, heat sinks, kinetic energy systems, and solar cells, just to name a few. Recharging of the battery may be completed through various means such as wired and wireless charging, for example inductive charging or through a USB cable.

Figure 62:
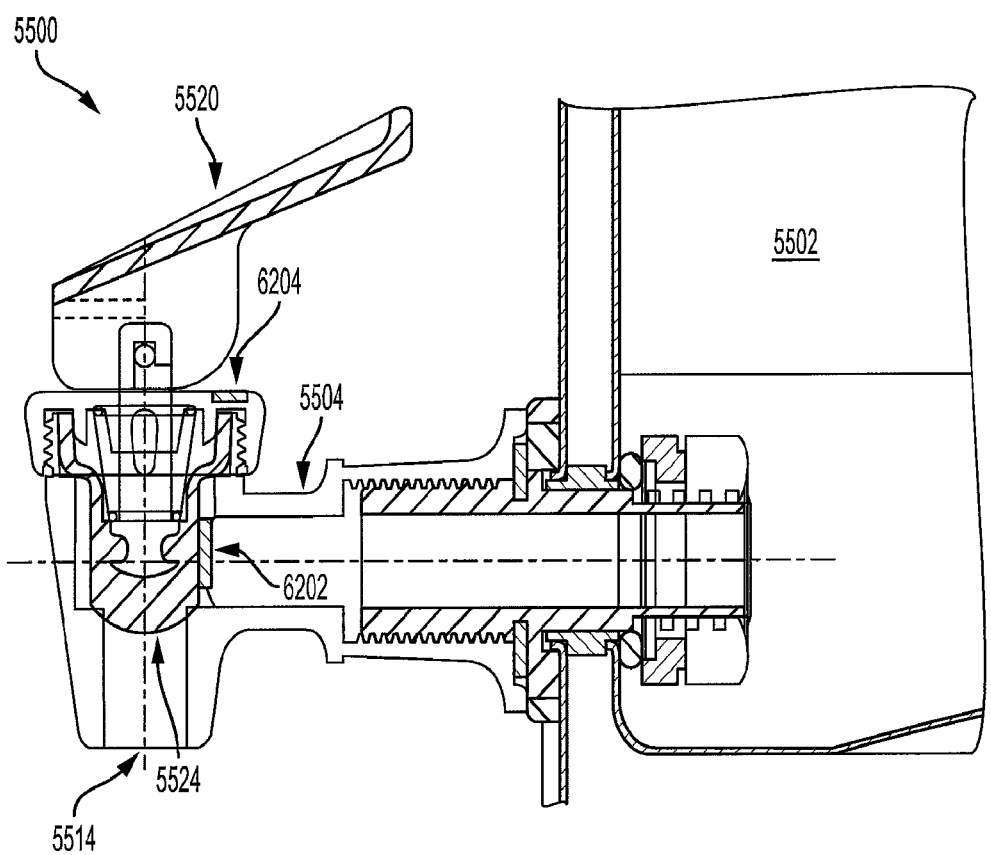
FIG. 62 illustrates a cross-sectional view of an alternative container tap.

FIG. 62 illustrates an exemplary placement of sensors 6202, 6204 in the valve assembly 5520 attached to the hollow member 5504. A first sensor 6202 can be located on a stopper 5524 of the valve assembly 5520, and a second sensor 6204 can be located on an outer wall of the valve assembly 5520 near the opening 5514 of the hollow member. Alternatively, both sensors 6202, 6204 could be located on an exterior surface of the valve assembly 5520, or both sensors may be located on an interior surface of the stopper 5524. When the sensor 6202 is located on an interior surface of the stopper 5524, the sensor 6202 may be partially embedded within the interior wall of the stopper 5524 so as to only have one external surface of the sensor 6202 contacting the fluid stream. The sensor 6202 could also be entirely embedded within the wall of the stopper 5524. Alternatively, the sensor 6202 may be affixed to the interior surface of the stopper 5524, allowing all but one surface of the sensor 6202 to be in direct contact with the flowing fluid. Alternatively, both sensors 6202, 6204 could be located on an exterior surface of the valve assembly 5520. When the sensor 6204 is located on an exterior surface of the valve assembly 5520, the sensor 6204 may be partially embedded within the wall of the valve assembly 5520 so as to only have one external surface of the sensor 6204 exposed to the outer environment. The sensor 6204 could also be entirely embedded within the wall of the valve assembly 5520. The sensors 6202, 6204 may both be the same type of sensor, or a first sensor 6202 could detect a different condition than the condition detected by a second sensor 6204. The sensors 6202, 6204 may both be temperature sensors to monitor the temperature of the room where the fluid delivery system 5500 is located, the fluid within the hollow member 5504, or the sensors 6202, 6204 may monitor the temperature of the valve assembly 5520 of the hollow member 5504 itself to determine the overall temperature of the fluid traveling through the hollow member 5504. Alternatively, a second sensor 6204 may detect the temperature of the room in which the fluid delivery system 5500 is located, and a first sensor 6202 may detect the temperature of the fluid within the hollow member 5504 or main container 5502. Upon detection of these two different temperatures, the sensors can communicate this information to an external server which can inform the user of an expected time until the liquid cools down or heats up to a desired temperature. The close proximity that one or both of the sensors 6202, 6204 may have to the opening 5514 of the hollow member can allow a user to know the temperature of the fluid just prior to dispensing. In an alternative embodiment, one or both of the sensors 6202, 6204 could be pressure sensors to detect the pressure within the hollow member 5504 as fluid from the main container 5502 flows through it. The detection of pressure can allow for an external device or the user to calculate the amount of fluid remaining in the main container 5502. Additionally, fluid volume could be monitored for dispensing specific serving sizes of liquid. After a certain amount of fluid is dispensed, as detected by a sensor, the valve assembly could be triggered to close, cutting off the supply of fluid to the outside environment. After sensing such information, the sensors 6202, 6204 can be configured to communicate the information to an external location, such as a control unit or the Internet through either wired or wireless connections, for user interpretation. The sensors 6202, 6204 could alternatively be configured to detect various factors such humidity. Additionally, the sensors 6202, 6204 could individually be capable of monitoring numerous conditions, such as sensing both temperature and pressure. In one embodiment, one or both of the sensors 6202, 6204 could be fingerprint sensors used to control which users are capable of opening or closing the valve assembly 5520. In an additional embodiment, one or both of the sensors 6202, 6204 could be configured to communicate with a corresponding sensor located on the vessel or container to which the fluid is being transferred. When a user brings the additional vessel or container close to the fluid delivery system 5500, one or both of the sensors 6202, 6204 on the hollow member could facilitate the opening of the valve assembly 5520 to allow dispensing of the fluid. As the additional vessel or container is moved away from the fluid delivery system 5500, the sensors 6202, 6204 could trigger closing of the valve assembly 5520, concluding fluid flow to the outside environment. Various power sources are envisioned for the sensors 6202, 6204 and may include various batteries, heat sinks, kinetic energy systems, and solar cells, just to name a few. Recharging of the battery may be completed through various means such as wired and wireless charging, for example inductive charging or through a USB cable.

Figure 63:
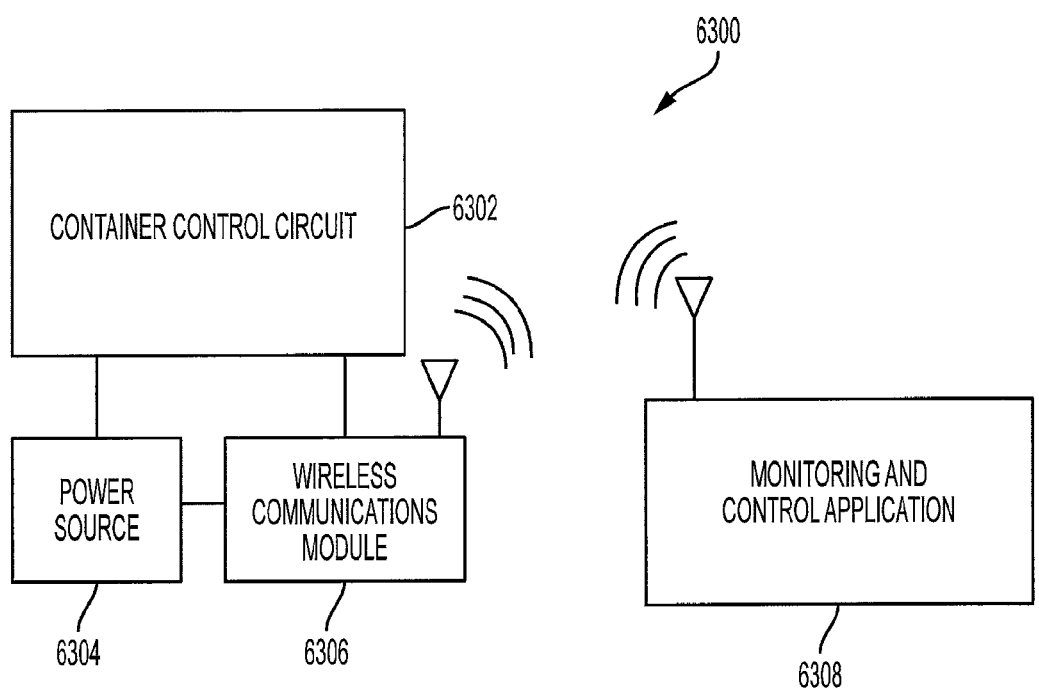
FIG. 63 is a diagram of an embodiment of a container control system according to the present disclosure.

As shown in FIG. 63, in one embodiment a container control system 6300 comprises a container control circuit 6302, a power source 6304, and a wireless communications module 6306. The power source 6304 provides power to the container control circuit 6302 and the wireless communications module 6306 as appropriate. Further, the container control system 6300 also comprises a monitoring and control application 6308 that is configured to be in communication with the container control circuit 6302 via the wireless communications module 6306. The monitoring and control application 6308 may be run on a computer device that remote from the container control circuit 6302 such as a mobile device, for example a smartphone or tablet. According to embodiments, the container control circuit 6302, power source 6304, and wireless communications module 6306 may be formed as a unit having a form factor for placing onto or into a container as described herein.

The wireless communications module 6306 may be, for example, a low power RF integrated circuit, so that the wireless communications module 6306 is enabled to communicate with the monitoring and control application 6308. In one embodiment, the wireless communications module 6306 is activated only when certain conditions are met. The activation may comprise the closure of a switch in a circuit that then allows power to be applied to the wireless communications module 6308 from the power source 6304. The container control system 6300 may be configured such that activation of the wireless communications module 6306 takes place only when a fluid within a container meets a predetermined threshold temperature.

In addition, the power source 6304 may comprise an electrical connection, a battery, or an electrical power generation device, also called an energy harvester, or a combination of these. The power source 6304 also may comprise any suitable components based on the location and application. For example, the power source 6304 may provide electricity based on wireless charging, such as via RF energy. In one embodiment, the power source may comprise 6304 an energy harvester that is configured to generate electrical energy derived from heat from a liquid within the container.

Figure 64:
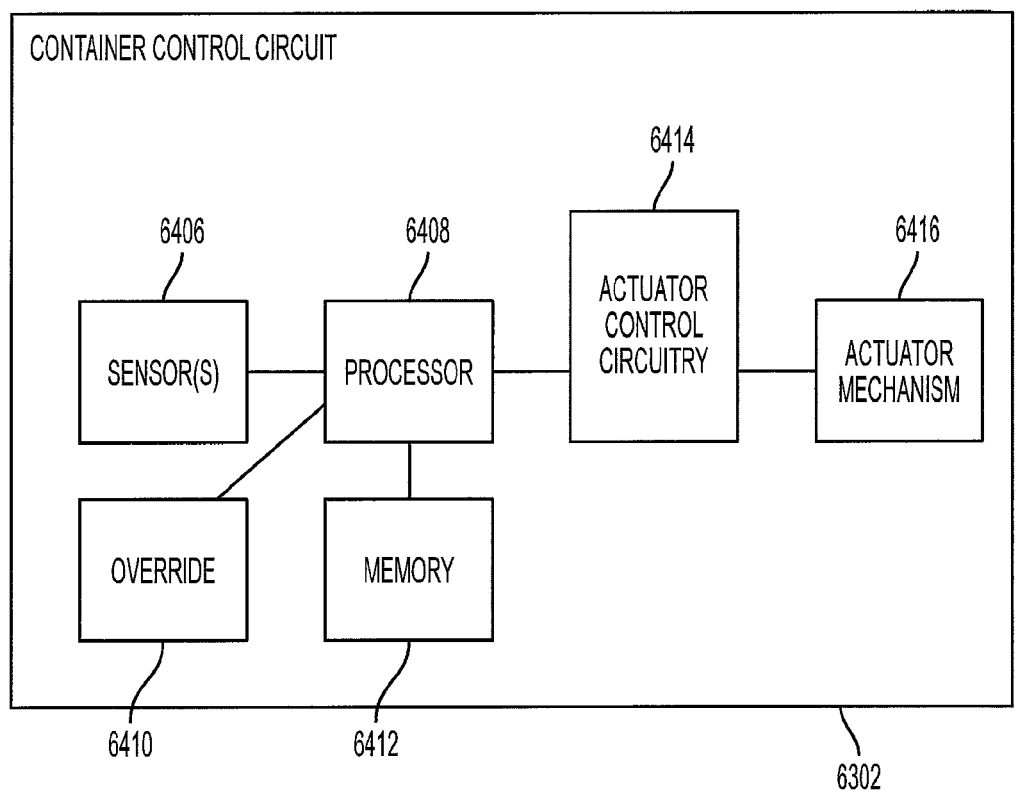
FIG. 64 is a diagram of an embodiment of a container control circuit according to the present disclosure.

As shown in FIG. 64, the container control circuit may include an antenna 6402, a transceiver 6404, at least one sensor 6406, a processor 6408, an override component 6410, a memory unit 6412, actuator control circuitry, and an actuator mechanism 6416. The processor 6408 may be in communication with the at least one sensor 6406, and sensor may be any sensor that detects a condition as described herein. In one embodiment, the at least one sensor may be connected to the processor 6408 via an Analog to Digital (A/D) conversion module that allows a reading from the sensor 6406 to be passed to other components. The memory unit 6412, or non-transitory computer readable medium, is in communication with processor 6408 and may include instructions stored therein for execution by the processor 6408. The instructions may cause the processor to activate the actuator control circuitry 6414 and hence the actuator mechanism 6416 based on predetermined conditions of the container or substance contained in the container. Further, the override component 6410 may be a switch or other device that overrides a preset condition by which the processor 6408 may cause the actuator control circuitry 6414 to activate the actuator mechanism 6416. The override component 6410 may be implemented as a circuit, which may include a software component. The actuator mechanism 6416 may be any form of mechanical, electro-mechanical, or other form of actuator described herein as appropriate. The processor 207 and control circuitry 203 allow computational functions to be modified and carried out within the flow sensor 103 based on commands or instructions received from other components of the flow control system 100 shown in FIG. 1. Information that is the subject of the computational functions can then be stored in the memory device 209 for further processing or transmission to other components. As described further below, the processor 207 also may be located remotely from but in communication with the flow sensor 103.

Figure 65:
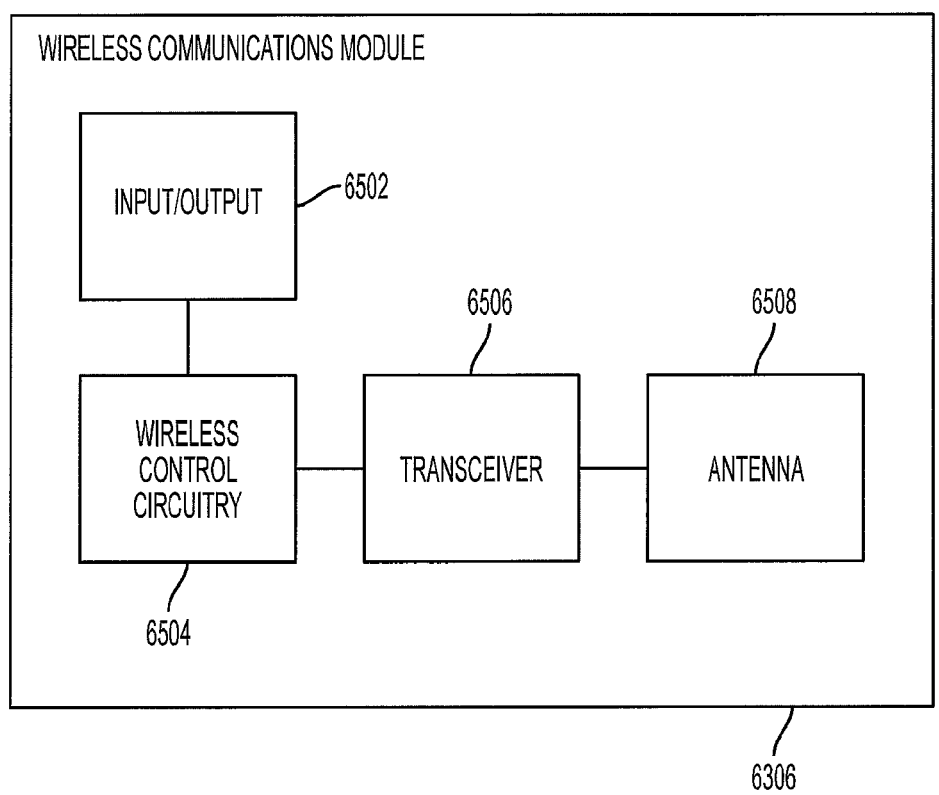
FIG. 65 is a diagram of an embodiment of a wireless communications module according to the present disclosure.

As shown in FIG. 65, the wireless communications module 6306 comprises an input/output section 6502, control circuitry 6504, a transceiver 6506, and an antenna 6508. The wireless communications module 6306 may be designed and configured to communicate via a short range wireless communication connection that enables communication between the wireless communications module 6306 and at least one other remote system or communications device. The control circuitry 6504 and transceiver 6506 enable the wireless communications module 6306 to transmit and receive, to provide commands to other components and/or systems or to be commanded by components and/or systems, and to receive programming for the container control circuit 6302. The antenna 6508 may be operationally connected or coupled to the transceiver 6506 and converts electric power into radio waves, and vice versa. The wireless communications module 6306 may be configured to transmit information to and receive information from the remotely located monitoring and control application 6308 109 as shown in FIG. 63. This may include, for example, transmitting information indicating a calculated volume, temperature, or other parameter of a fluid in a container or receiving a configuration command that provides a predetermined condition for opening a lid portion of the container. In a preferred embodiment, the wireless communications module 6306 is a Wi-Fi embedded microchip and it may be located at least partially on an exterior of a container. In another preferred embodiment, the power source 6304 is configured to energize the wireless communications module 6306 intermittently. As such, the wireless communications module 6306 can be configured to transmit a wireless signal associated with a condition of the container only when the condition exceeds a predetermined threshold value.

Figure 66:
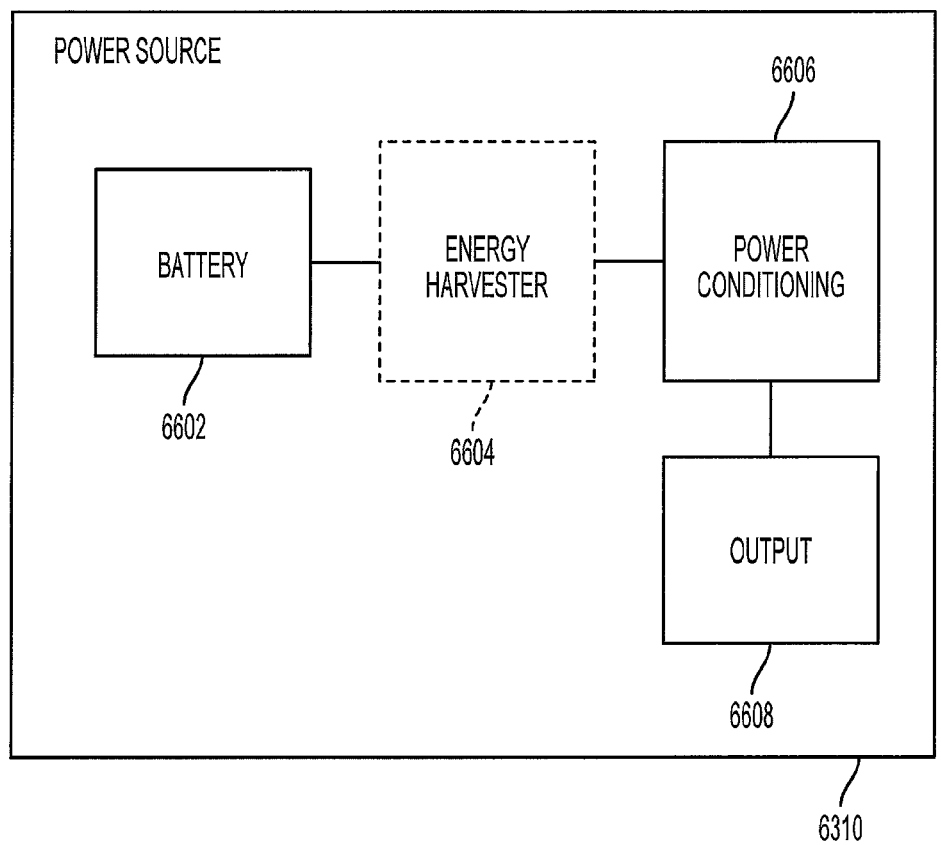
FIG. 66 is a diagram of an embodiment of a power source according to the present disclosure.

With reference to FIG. 66, the power source 6310 includes at least one battery 6602. Additionally or alternatively, the power source 6310 may include energy harvester 6604, which is configured to generate electrical energy derived from heat from the container. The battery 6602 and/or energy harvester 6604 may be connected to a power conditioning section 6606 and then a power output section 6608, which allows electricity to be provided to the components of container control circuit 6302 and the wireless communications module 6306, as shown in FIG. 63. Further, a power storage device may included in the absence of or in addition to the battery, where the power storage device is a capacitor, rechargeable battery, or other electricity storage element, among others, and may be connected to the energy harvester and/or the battery. In embodiments, the power source 6310 may be a battery that is replaceable and/or rechargeable.

Additionally, the monitoring and control application 6308 may be configured to receive a wireless signal from the wireless communication module 6306 and container control circuit 6302. The wireless signal may be associated with a sensed condition of a sensor of the container upon which the container control circuit 6302, power source 6304, and wireless communication module 6306 are located.

The examples presented herein are intended to illustrate potential and specific implementations of the present disclosure. It can be appreciated that the examples are intended primarily for purposes of illustration of the disclosure for those skilled in the art. No particular aspect or aspects of the examples are necessarily intended to limit the scope of the present disclosure. For example, those skilled in the art will appreciate that the fasteners described herein (e.g., screws) may be replaced or supplemented by other suitable fastening means including a variety of other types of mechanical fastening devices (e.g., nails, rivets, magnets, or others). In another example, a particular choice of construction material (e.g., aluminum, plastic, steel, etc.) may be replaced or supplemented by another type of material which is suitable for the same or similar structure or function.

Any element expressed herein as a means for performing a specified function is intended to encompass any way of performing that function including, for example, a combination of elements that performs that function. Furthermore the disclosure, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

It will be appreciated that, for convenience and clarity of disclosure, terms describing relative orientation or spatial positioning such as "proximal," "distal," "vertical," "horizontal," "up," "down," "top," "front," "back," "bottom," "upward," or "downward" may be used at times herein with respect to the drawings and text description in association with various embodiments of the disclosure. However, such terms are primarily used for illustrative purposes and are not necessarily intended to be limiting in nature.

It is to be understood that the figures and descriptions of the present disclosure have been simplified to illustrate elements that are relevant for a clear understanding of the present disclosure, while eliminating, for purposes of clarity, other elements. Those of ordinary skill in the art will recognize, however, that these and other elements may be desirable. However, because such elements are well known in the art, and because they do not facilitate a better understanding of the present disclosure, a discussion of such elements is not provided herein. It should be appreciated that the figures are presented for illustrative purposes and not as construction drawings. Omitted details and modifications or alternative embodiments are within the purview of persons of ordinary skill in the art. For example, there may be variations to these diagrams or the operations described herein without departing from the spirit of the disclosure.

It can be appreciated that, in certain aspects of the present disclosure, a single component may be replaced by multiple components, and multiple components may be replaced by a single component, to provide an element or structure or to perform a given function or functions. Except where such substitution would not be operative to practice certain embodiments of the present disclosure, such substitution is considered within the scope of the present disclosure.

While various embodiments of the disclosure have been described herein, it should be apparent, however, that various modifications, alterations and adaptations to those embodiments may occur to persons skilled in the art with the attainment of some or all of the advantages of the present disclosure. The disclosed embodiments are therefore intended to include all such modifications, alterations and adaptations without departing from the scope and spirit of the present disclosure as claimed.

What is claimed is:

1. A container for storing liquids therein, the container comprising:
a body portion defining an internal cavity configured to store and retain a liquid therein, the body portion comprising a top portion;
a lid portion configured to fit on the top portion of the body portion, wherein the lid portion defines an orifice to permit flow of the liquid in the body portion out of the container, the lid portion further comprising:
a lid closure mechanism, comprising:
a seal to seal the orifice, wherein the seal is movable between a closed position to block the flow of the liquid from the body portion out of the container and an open position to permit the flow of the liquid from the body portion out of the container; and
a mechanical actuator to motivate the seal between the closed position and the open position;
a power source to actuate the mechanical actuator; and
a plurality of sensors comprising a fingerprint sensor to transmit a sensor signal to the lid closure mechanism, wherein the sensor signal comprises user-identifying information, and wherein the lid closure mechanism causes the mechanical actuator to motivate the seal from the closed position to the open position based on the user-identifying information comprised by the sensor signal.

2. The container of claim 1, wherein the plurality of sensors comprises a sensor configured to detect an angle of the container.

3. The container of claim 1, wherein the plurality of sensors comprises a touch sensor to detect a user's contact with the touch sensor.

4. The container of claim 1, wherein at least one of the plurality of sensors is located within the internal cavity.

5. The container of claim 4, wherein the plurality of sensors comprises a temperature sensor to detect the temperature of the liquid retained in the internal cavity.

6. The container of claim 1, wherein the mechanical actuator comprises an electromagnet.

7. The container of claim 1, further comprising:
a processor to control the lid closure mechanism, wherein the processor is configured to operate the lid closure mechanism, wherein the fingerprint sensor is configured to transmit the sensor signal to the processor, and wherein the processor is configured to operate the lid closure mechanism upon receiving the sensor signal to cause the mechanical actuator to motivate the seal between the closed position and the open position.

8. The container of claim 7, further comprising an override, wherein the override causes the processor to forego operation of the lid closure mechanism upon receiving the sensor signal.

9. The container of claim 7, further comprising a display, wherein the plurality of sensors comprises a temperature sensor, and wherein when the processor receives a sensor signal from the temperature sensor, the processor determines a temperature corresponding to the sensor signal and causes the temperature to be displayed on the display.

10. The container of claim 1, wherein the sensor signal further comprises information regarding a sensed condition of the container, and wherein the information comprises angular information regarding an angular position of the container in relation to a level position.

11. A device, comprising:
a lid portion configured to fit on a container, wherein the container comprises contents stored therein, wherein the lid portion defines an orifice to permit the flow of the contents therethrough, the lid portion further comprising:
a lid closure mechanism, comprising:
a seal to seal the orifice, wherein the seal is configurable in a closed position and an open position, wherein the seal blocks the flow of the contents through the orifice when the seal is in the closed position, wherein the seal permits the flow of the contents through the orifice when the seal is in the open position; and
a mechanical actuator to motivate the seal between the closed position and the open position;

a power source to power the lid closure mechanism;
a processor to control the lid closure mechanism, wherein the processor is configured to operate the lid closure mechanism; and
a first sensor to transmit a first signal to the processor, wherein the first sensor comprises a fingerprint sensor, wherein the first signal comprises user-identifying information regarding a first condition of the container, wherein the processor is configured to operate the lid closure mechanism upon receiving the first signal to cause the mechanical actuator to motivate the seal between the closed position and the open position, and wherein the processor operates the lid closure mechanism based on the user-identifying information comprised by the first signal.

12. The device of claim 11, wherein the seal comprises a deformable material.

13. The device of claim 11, further comprising a second sensor, wherein the second sensor is configured to be in thermal communication with an internal cavity of the container when the lid portion is positioned on the container.

14. The device of claim 11, further comprising a second sensor, wherein the second sensor comprises a capacitance sensor.

15. The device of claim 11, wherein the mechanical actuator comprises a magnet and a spring.

16. The device of claim 11, wherein the processor upon receiving the first signal causes the mechanical actuator to actuate the seal from the closed position to the open position, and wherein the processor upon no longer receiving the first signal causes the mechanical actuator to actuate the seal from the open position to the closed position.

17. The device of claim 11, further comprising a second sensor to transmit a second signal to the processor, wherein the second sensor comprises information regarding a second condition of the container, and wherein the processor is configured to operate the lid closure mechanism to actuate the seal between the closed position and the open position.

18. The device of claim 11, wherein the power source is rechargeable.

19. A container, comprising:
a body portion defining an internal cavity configured to store and retain a liquid therein, the body portion comprising a top portion;
a lid portion configured to fit on the top portion of the body portion, wherein the lid portion defines an orifice to permit flow of the liquid in the body portion out of the container, the lid portion further comprising:
a lid closure mechanism, comprising:
a seal to seal the orifice, wherein the seal is movable between a closed position to block the flow of the liquid from the body portion out of the container and an open position to permit the flow of the liquid from the body portion out of the container; and
a mechanical actuator to locate the seal between the closed position and the open position;
a power source to actuate the mechanical actuator;
a processor to control the lid closure mechanism, wherein the processor is configured to operate the lid closure mechanism;
a first sensor to transmit a first signal to the processor, wherein the first sensor comprises a fingerprint sensor, wherein the first signal comprises user-identifying information regarding a first condition of the container; and
a second sensor to transmit a second signal to the processor, wherein the second signal comprises information regarding a second condition of the container, wherein the processor is configured to operate the lid closure mechanism upon receiving the first signal and the second signal to cause the mechanical actuator to locate the seal between the closed position and the open position, and wherein a position of the seal is based on the first signal and the second signal.

20. The container of claim 7, wherein the lid closure mechanism is configured to cause the mechanical actuator to motivate the seal between the closed position and the open position based on the first signal and the second signal.

* * * * *